United States Patent
Oguro et al.

(10) Patent No.: US 6,282,366 B1
(45) Date of Patent: *Aug. 28, 2001

(54) METHOD AND APPARATUS FOR DIGITALLY RECORDING AND REPRODUCING DATA RECORDED IN THE VERTICAL BLANKING PERIOD OF VIDEO SIGNAL

(75) Inventors: Masaki Oguro, Tokyo; Ken Iizuka, Kanagawa, both of (JP)

(73) Assignee: Sony Corporation, Tokyo (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/931,188

(22) Filed: Sep. 16, 1997

Related U.S. Application Data

(63) Continuation of application No. 08/375,800, filed on Jan. 20, 1995, now abandoned.

(30) Foreign Application Priority Data

Jan. 20, 1994 (JP) ........................................ 6-019990
Jan. 20, 1994 (JP) ........................................ 6-019991

(51) Int. Cl.[7] .................................................. H04N 7/08
(52) U.S. Cl. .............................................. 386/104; 386/124
(58) Field of Search ................................ 386/39, 96–107, 386/95, 125, 126, 124; 348/423, 478; 434/307 A; H04N 7/08

(56) References Cited

U.S. PATENT DOCUMENTS

| | | | |
|---|---|---|---|
| 5,010,417 | * 4/1991 | Yoshio et al. | 358/335 |
| 5,016,113 | * 5/1991 | Yamashita et al. | 358/335 |
| 5,070,503 | * 12/1991 | Shikakura | 358/336 |
| 5,097,348 | * 3/1992 | Suetaka | 358/335 |
| 5,130,861 | * 7/1992 | Suma | 360/32 |
| 5,130,966 | * 7/1992 | Yoshio et al. | 358/342 |
| 5,270,828 | * 12/1993 | Mogi | 358/335 |
| 5,315,401 | * 5/1994 | Okada et al. | 358/337 |
| 5,335,125 | * 8/1994 | Nakatsu et al. | 360/10.3 |
| 5,336,844 | * 8/1994 | Yamauchi et al. | 358/341 |
| 5,412,514 | * 5/1995 | Kobayashi | 360/35.1 |
| 5,493,339 | * 2/1996 | Birch et al. | 348/467 |
| 5,513,010 | * 4/1996 | Kori et al. | 358/341 |
| 5,521,712 | * 5/1996 | Oguro | 358/335 |
| 5,583,654 | * 12/1996 | Oguro | 386/96 |
| 5,615,056 | * 3/1997 | Oguro | 386/95 |
| 5,687,276 | * 11/1997 | Oguro et al. | 386/97 |

* cited by examiner

Primary Examiner—Young Lee
(74) Attorney, Agent, or Firm—Frommer Lawrence & Haug LLP; William S. Frommer; Bruno Polito

(57) ABSTRACT

A video signal recording apparatus digitally records on a storage medium a video signal comprising an image signal, an audio signal, and an audio-associated information signal, the audio-associated information signal is included in a vertical blanking period of the video signal, the audio-associated information is collected, formatted, and digitally recorded in an area separate from areas where the image signal and audio signal are recorded.

16 Claims, 42 Drawing Sheets

| | ASPECT RATIO | COPY GUARD | CAPTION | OTHER PROGRAMS | OTHERS | CLOCK | NUMBER OF BITS IN ONE FRAME |
|---|---|---|---|---|---|---|---|
| CC | ○ | | ○ | ○ | | 503 kHz | 32 bits |
| EDS | ○ | | | ○ | ○ | 503 kHz | |
| VBID | ○ | ○ | | | ○ | Fsc/4 | 20 bits |
| WSS | ○ | | | | ○ | 833 kHz | 14 bits |
| CHARACTER MULTIPLEX SIGNAL | | | ○ | ○ | | 5.7272 MHz | 4480 bits |
| TELETEXT | | | ○ | ○ | | 6.9375 MHz | 11008 bits |
| MACRO-VISION SIGNAL | | ○ | | | | VARIOUS VALUES | ANALOG |
| INTER-STATION CONTROL SIGNAL | | | | | ○ | VARIOUS VALUES | ANALOG |
| WORK SIGNAL | | | | | ○ | UNKNOWN | UNKNOWN |

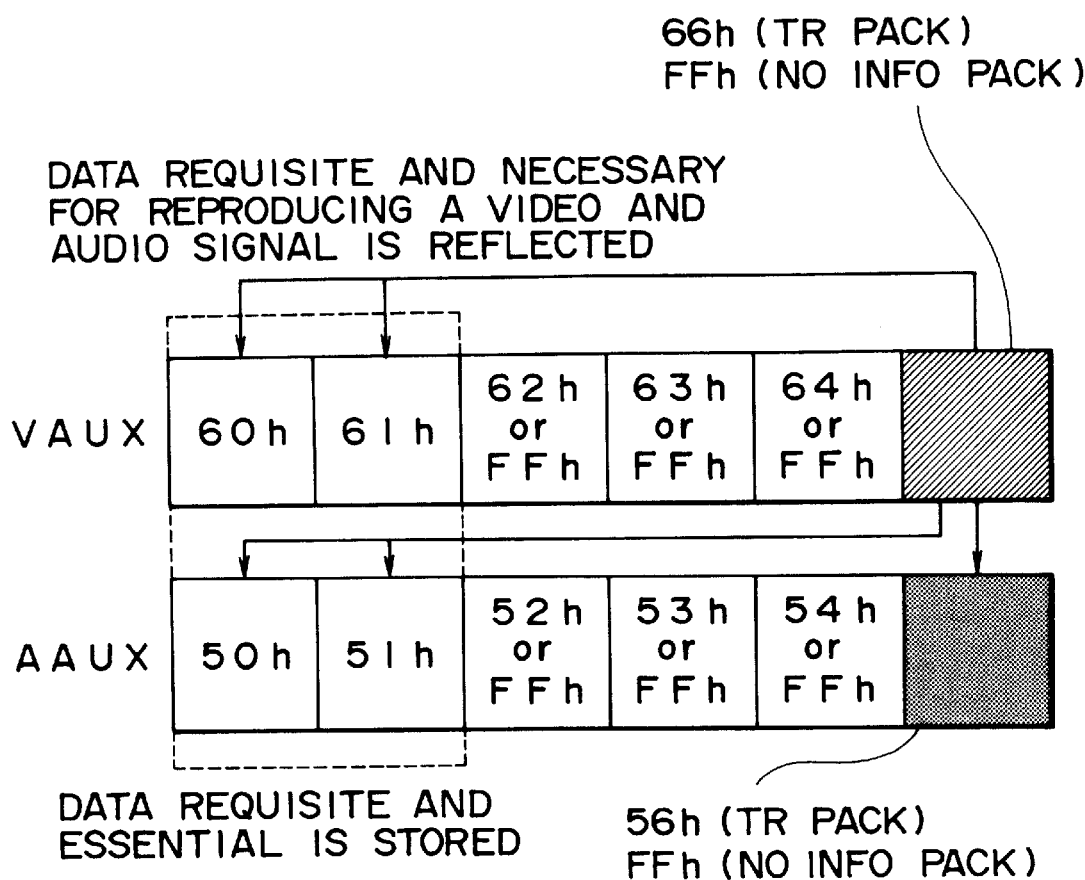

FIG. 2A

WHEN RECORDED

| TR PACK NON-CORRESPONDING VTR | IF THERE IS A CC PACK, IT IS WRITTEN |
|---|---|
| TR PACK CORRESPONDING VTR | CC PACK AND TR PACK ARE WRITTEN (CC PACK IS WRITTEN WITHOUT FAIL AT THE FINAL TWO TRACKS OF 1 VIDEO FRAME) |

FIG. 2B

WHEN REPRODUCED

| TR PACK NON-CORRESPONDING VTR | IF THERE IS A CC PACK, IT IS SUPERPOSED ON A PREDETERMINED LINE AND SENT OUT |
|---|---|
| TR PACK CORRESPONDING VTR | IF THERE ARE CC PACK AND TR PACK, THEY ARE SUPERPOSED ON PREDETERMINED LINES AND SENT OUT |
| IN BOTH TR PACK CORRESPONDING VTR AND TR PACK NON-CORRESPONDING VTR, OTHER COMPOSITE VIDEO SIGNAL ASSOCIATED INFORMATION CAN BE RECOVERED FROM 60h, 61h, 50h AND 51h PACKS ||

DATA TYPE:

0 0 0 0 = VBID
        0 0 0 1 = WSS
        0 0 1 0 = EDTV2
        0 0 1 1 = X FIELD 1
        0 1 0 0 = X FIELD 2
        OTHERS = RESERVED

FIG. 4A

| PC 0 | 0 | 1 | 1 | 0 | 0 | 1 | 1 | 0 |
|---|---|---|---|---|---|---|---|---|
| PC 1 | ←-------------------- | | | LSB | 0 | 0 | 0 | 0 |
| PC 2 | ---------------- VBID DATA ---------------- | | | | | | | |
| PC 3 | MSB -------------------- | | | | | | | |
| PC 4 | 1 | 1 | 1 | 1 | 1 | 1 | 1 | 1 |

IN THE CASE THAT VBID DATA (20 bits) IS RECORDED

FIG. 4B

| PC 0 | 0 | 1 | 1 | 0 | 0 | 1 | 1 | 0 |
|---|---|---|---|---|---|---|---|---|
| PC 1 | ←-------------------- | | | LSB | 0 | 0 | 0 | 1 |
| PC 2 | ---------------- WSS DATA ---------------- | | | | | | | |
| PC 3 | 1 | 1 | 1 | 1 | 1 | 1 | MSB | |
| PC 4 | 1 | 1 | 1 | 1 | 1 | 1 | 1 | 1 |

IN THE CASE THAT WSS DATA (14 bits) IS RECORDED

FIG. 5

| | MSB | | | | | | | LSB |
|---|---|---|---|---|---|---|---|---|
| PC 0 | 0 | 1 | 0 | 1 | 0 | 1 | 1 | 0 |
| PC 1 | ←-------------------LSB | | | | DATA TYPE | | | |
| PC 2 | ------------------- DATA ------------------- | | | | | | | |
| PC 3 | -------(UP TO MAXIMUM 28 bits)------- | | | | | | | |
| PC 4 | MSB -------------------→ | | | | | | | |

DATA TYPE :

0 0 0 0 = MISSING NUMBER
    0 0 0 1 = MISSING NUMBER
    0 0 1 0 = MISSING NUMBER
    0 0 1 1 = X FIELD 1
    0 1 0 0 = X FIELD 2
    OTHERS = RESERVED

TRACK PAIR

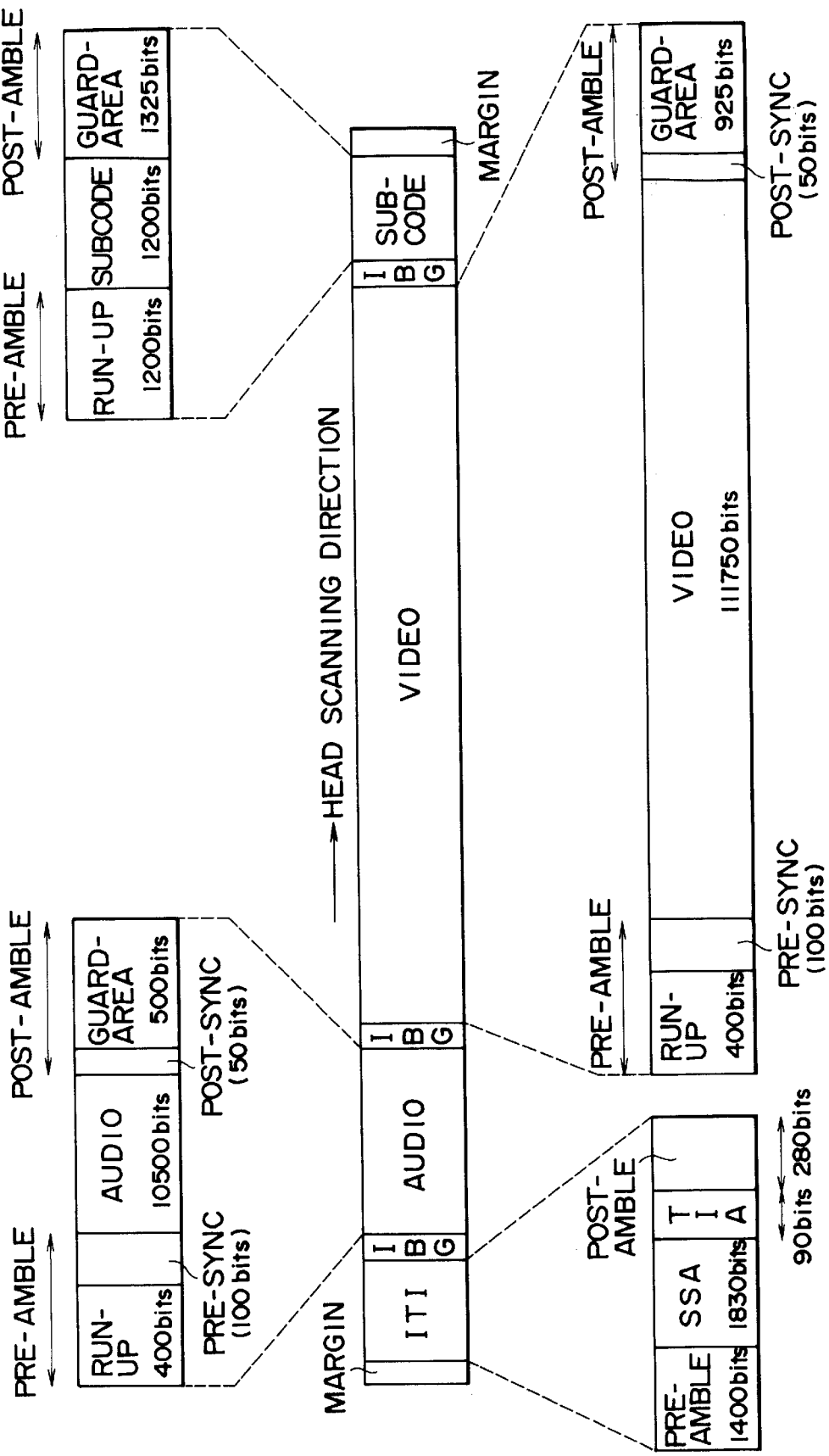

PRE-SYNC BLOCK

POST-SYNC BLOCK

[AUDIO]

▨ : AAUX

■ : VAUX

FIG. 14A

AAUX + AUDIO SYNC,
VIDEO SYNC,

|  | ID0 | ID1 |
|---|---|---|
| MSB | SEQ 3 | SYNC 7 |
|  | SEQ 2 | SYNC 6 |
|  | SEQ 1 | SYNC 5 |
|  | SEQ 0 | SYNC 4 |
|  | TRACK 3 | SYNC 3 |
|  | TRACK 2 | SYNC 2 |
|  | TRACK 1 | SYNC 1 |
| LSB | TRACK 0 | SYNC 0 |

FIG. 14B

PRE-SYNC,
POST-SYNC,
C2 PARITY SYNC,

|  | ID0 | ID1 |
|---|---|---|
| MSB | AP1/AP2 2 | SYNC 7 |
|  | AP1/AP2 1 | SYNC 6 |
|  | AP1/AP2 0 | SYNC 5 |
|  | SEQ 0 | SYNC 4 |
|  | TRACK 3 | SYNC 3 |
|  | TRACK 2 | SYNC 2 |
|  | TRACK 1 | SYNC 1 |
| LSB | TRACK 0 | SYNC 0 |

S. B. NO. : SYNC BLOCK NO.

| WORD NAME | | MSB | | | | | | LSB |
|---|---|---|---|---|---|---|---|---|
| PC0 | (ITEM) | | | | | | | |
| PC1 | | | | | | | | |
| PC2 | (DATA) | | | | | | | |
| PC3 | | | | | | | | |
| PC4 | | | | | | | | |

FIG. 17

| MSB | LSB | |
|---|---|---|
| UPPER | LOWER | |
| 0 0 0 0 | x x x x | CONTROL |
| 0 0 0 1 | x x x x | TITLE |
| 0 0 1 0 | x x x x | CHAPTER |
| 0 0 1 1 | x x x x | PART |
| 0 1 0 0 | x x x x | PROGRAM |
| 0 1 0 1 | x x x x | AAUX |
| 0 1 1 0 | x x x x | VAUX |
| 0 1 1 1 | x x x x | CAMERA |
| 1 0 0 0 | x x x x | LINE |
| 1 0 0 1 | x x x x | RESERVED |
| 1 1 1 0 | x x x x | |
| 1 1 1 1 | a a a a | SOFT MODE |
| 1 1 1 1 | 1 1 1 1 | NO INFORMATION | aaaa : 0000 ~ 1110
xxxx : 0000 ~ 1111

FIG. 18A  AAUX SOURCE

| | MSB | | | | | | | LSB |
|---|---|---|---|---|---|---|---|---|
| PC0 | 0 | 1 | 0 | 1 | 0 | 0 | 0 | 0 |
| PC1 | LF | 1 | \multicolumn{6}{c}{AF SIZE} |
| PC2 | \multicolumn{3}{c}{CH} | \multicolumn{2}{c}{PA} | \multicolumn{3}{c}{AUDIO MODE} |
| PC3 | 1 | 1 | 50/60 | \multicolumn{5}{c}{STYPE} |
| PC4 | EF | TC | \multicolumn{3}{c}{SMP} | \multicolumn{3}{c}{QU} |

FIG. 18B  AAUX SOURCE CONTROL

| | MSB | | | | | | | LSB |
|---|---|---|---|---|---|---|---|---|
| PC0 | 0 | 1 | 0 | 1 | 0 | 0 | 0 | 1 |
| PC1 | \multicolumn{2}{c}{SCMS} | \multicolumn{2}{c}{COPY SOUR.} | \multicolumn{2}{c}{COPY GENE.} | CP | CI |
| PC2 | REC ST | REC E. | REC MODE | 1 | 1 | 1 | 1 | 1 |
| PC3 | DRF | \multicolumn{7}{c}{SPEED} |
| PC4 | 1 | \multicolumn{7}{c}{GENRE CATEGORY} |

REC ST. : RECORDING START FRAME
REC E. : RECORDING END FRAME

FIG. 18C  AAUX REC DATE

| | MSB | | | | | | | LSB |
|---|---|---|---|---|---|---|---|---|
| PC0 | 0 | 1 | 0 | 1 | 0 | 0 | 1 | 0 |
| PC1 | DS | TM | \multicolumn{6}{c}{TIME ZONE} |
| PC2 | 1 | 1 | \multicolumn{6}{c}{DAY} |
| PC3 | \multicolumn{3}{c}{WEEK} | \multicolumn{5}{c}{MONTH} |
| PC4 | \multicolumn{8}{c}{YEAR} |

FIG. 18D  AAUX REC TIME

| | MSB | | | | | | | LSB |
|---|---|---|---|---|---|---|---|---|
| PC0 | 0 | 1 | 0 | 1 | 0 | 0 | 1 | 1 |
| PC1 | S2 | S1 | \multicolumn{2}{c}{TENS OF FR.} | \multicolumn{4}{c}{UNITS OF FRAMES} |
| PC2 | \multicolumn{2}{c}{S3} | \multicolumn{3}{c}{TENS OF SECONDS} | \multicolumn{3}{c}{UNITS OF SECONDS} |
| PC3 | \multicolumn{2}{c}{S4} | \multicolumn{3}{c}{TENS OF MINUTES} | \multicolumn{3}{c}{UNITS OF MINUTES} |
| PC4 | S6 | S5 | \multicolumn{2}{c}{TENS OF H.} | \multicolumn{4}{c}{UNITS OF HOURS} |

FIG. 18E  AAUX REC TIME BINARY GROUP

| | MSB | | | | | | | LSB |
|---|---|---|---|---|---|---|---|---|
| PC0 | 0 | 1 | 0 | 1 | 0 | 1 | 0 | 0 |
| PC1 | \multicolumn{4}{c}{2nd BINARY} | \multicolumn{4}{c}{1st BINARY} |
| PC2 | \multicolumn{4}{c}{4th BINARY} | \multicolumn{4}{c}{3rd BINARY} |
| PC3 | \multicolumn{4}{c}{6th BINARY} | \multicolumn{4}{c}{5th BINARY} |
| PC4 | \multicolumn{4}{c}{8th BINARY} | \multicolumn{4}{c}{7th BINARY} |

FIG. 19A  AAUX CLOSED CAPTION

| | MSB | | | | | | | LSB |
|---|---|---|---|---|---|---|---|---|
| PC 0 | 0 | 1 | 0 | 1 | 0 | 1 | 0 | 1 |
| PC 1 | 1 | 1 | MAIN AUDIO LANG. | | | | MAIN AUDIO TYPE | |
| PC 2 | 1 | 1 | 2ND AUDIO LANG. | | | | 2ND AUDIO TYPE | |
| PC 3 | 1 | 1 | 1 | 1 | 1 | 1 | 1 | 1 |
| PC 4 | 1 | 1 | 1 | 1 | 1 | 1 | 1 | 1 |

FIG. 19B  VAUX SOURCE

| | MSB | | | | | | | LSB |
|---|---|---|---|---|---|---|---|---|
| PC 0 | 0 | 1 | 1 | 0 | 0 | 0 | 0 | 0 |
| PC 1 | TENS OF TV CHANNEL | | | | UNITS OF TV CHANNEL | | | |
| PC 2 | B/W | EN | CLF | | HUNDREDS OF TV CHANNEL | | | |
| PC 3 | SOURCE CODE | | 50/60 | | STYPE | | | |
| PC 4 | TUNER CATEGORY | | | | | | | |

FIG. 19C  VAUX SOURCE CONTROL

| | MSB | | | | | | | LSB |
|---|---|---|---|---|---|---|---|---|
| PC 0 | 0 | 1 | 1 | 0 | 0 | 0 | 0 | 1 |
| PC 1 | SCMS | | COPY SOUR. | | COPY GENE. | | CP | CI |
| PC 2 | REC ST | | 1 | REC MODE | | 1 | DISP | |
| PC 3 | FF | FS | FC | IL | ST | SC | BCSYS | |
| PC 4 | 1 | GENRE CATEGORY | | | | | | |

FIG. 19D  VAUX REC DATE

| | MSB | | | | | | | LSB |
|---|---|---|---|---|---|---|---|---|
| PC 0 | 0 | 1 | 1 | 0 | 0 | 0 | 1 | 0 |
| PC 1 | DS | TM | TIME ZONE | | | | | |
| PC 2 | 1 | 1 | DAY | | | | | |
| PC 3 | WEEK | | | MONTH | | | | |
| PC 4 | YEAR | | | | | | | |

FIG. 19E  VAUX REC TIME

| | MSB | | | | | | | LSB |
|---|---|---|---|---|---|---|---|---|
| PC 0 | 0 | 1 | 1 | 0 | 0 | 0 | 1 | 1 |
| PC 1 | S 2 | S 1 | TENS OF FR. | | UNITS OF FRAMES | | | |
| PC 2 | S 3 | | TENS OF SECONDS | | UNITS OF SECONDS | | | |
| PC 3 | S 4 | | TENS OF MINUTES | | UNITS OF MINUTES | | | |
| PC 4 | S 6 | S 5 | TENS OF H. | | UNITS OF HOURS | | | |

FIG. 20A  VAUX REC TIME BINARY GROUP

| | MSB | | | | | | | LSB |
|---|---|---|---|---|---|---|---|---|
| PC 0 | 0 | 1 | 1 | 0 | 0 | 1 | 0 | 0 |
| PC 1 | 2nd BINARY | | | | 1st BINARY | | | |
| PC 2 | 4th BINARY | | | | 3rd BINARY | | | |
| PC 3 | 6th BINARY | | | | 5th BINARY | | | |
| PC 4 | 8th BINARY | | | | 7th BINARY | | | |

FIG. 20B  VAUX CLOSED CAPTION

| | MSB | | | | | | | LSB |
|---|---|---|---|---|---|---|---|---|
| PC 0 | 0 | 1 | 1 | 0 | 0 | 1 | 0 | 1 |
| PC 1 | 1ST FIELD LINE 21 UPPER BYTE | | | | | | | |
| PC 2 | 1ST FIELD LINE 21 LOWER BYTE | | | | | | | |
| PC 3 | 2ND FIELD LINE 21 UPPER BYTE | | | | | | | |
| PC 4 | 2ND FIELD LINE 21 LOWER BYTE | | | | | | | |

FIG. 21

[ AAUX PACK CONFIGURATION ]

TRACK NO. →

| PACK NO. \ TRACK NO. | 1 | 2 | 3 | 4 | 5 | 6 | 7 | 8 | 9 | 10 |
|---|---|---|---|---|---|---|---|---|---|---|
| 8 | 55 | | 55 | | 55 | | 55 | | 55 | |
| 7 | 54 | | 54 | | 54 | | 54 | | 54 | |
| 6 | 53 | | 53 | | 53 | | 53 | | 53 | |
| 5 | 52 | 55 | 52 | 55 | 52 | 55 | 52 | 55 | 52 | 55 |
| 4 | 51 | 54 | 51 | 54 | 51 | 54 | 51 | 54 | 51 | 54 |
| 3 | 50 | 53 | 50 | 53 | 50 | 53 | 50 | 53 | 50 | 53 |
| 2 | | 52 | | 52 | | 52 | | 52 | | 52 |
| 1 | | 51 | | 51 | | 51 | | 51 | | 51 |
| 0 | | 50 | | 50 | | 50 | | 50 | | 50 |

50~55 : AAUX MAIN AREA
ACTUAL DATA NUMBER IN OPTION AREA : 120 BYTES

FIG. 24

| TRACK NO. → | 0 | 1 | 2 | 3 | 4 | 5 | 6 | 7 | 8 | 9 |
|---|---|---|---|---|---|---|---|---|---|---|
| 11 | C | C | C | C | C | E | E | E | E | E |
| 10 | B | B | B | B | B | D | D | D | D | D |
| 9 | A | A | A | A | A | A | A | A | A | A |
| 8 | f | c | f | c | f | m | i | m | i | m |
| 7 | e | b | e | b | e | k | h | k | h | k |
| 6 | d | a | d | a | d | j | g | j | g | j |
| 5 | C | C | C | C | C | E | E | E | E | E |
| 4 | B | B | B | B | B | D | D | D | D | D |
| 3 | A | A | A | A | A | A | A | A | A | A |
| 2 | c | f | c | f | c | i | m | i | m | i |
| 1 | b | e | b | e | b | h | k | h | k | h |
| 0 | a | d | a | d | a | g | j | g | j | g |

SYNC BLOCK NO.

FIG. 25

| TRACK NO. → | 0 | 1 | 2 | 3 | 4 | 5 | 6 | 7 | 8 | 9 | 10 | 11 |
|---|---|---|---|---|---|---|---|---|---|---|---|---|
| 11 | C | C | C | C | C | C | E | E | E | E | E | E |
| 10 | B | B | B | B | B | B | D | D | D | D | D | D |
| 9 | A | A | A | A | A | A | A | A | A | A | A | A |
| 8 | f | c | f | c | f | c | m | i | m | i | m | i |
| 7 | e | b | e | b | e | b | k | h | k | h | k | h |
| 6 | d | a | d | a | d | a | j | g | j | g | j | g |
| 5 | C | C | C | C | C | C | E | E | E | E | E | E |
| 4 | B | B | B | B | B | B | D | D | D | D | D | D |
| 3 | A | A | A | A | A | A | A | A | A | A | A | A |
| 2 | c | f | c | f | c | f | i | m | i | m | i | m |
| 1 | b | e | b | e | b | e | h | k | h | k | h | k |
| 0 | a | d | a | d | a | d | g | j | g | j | g | j |

SYNC BLOCK NO.

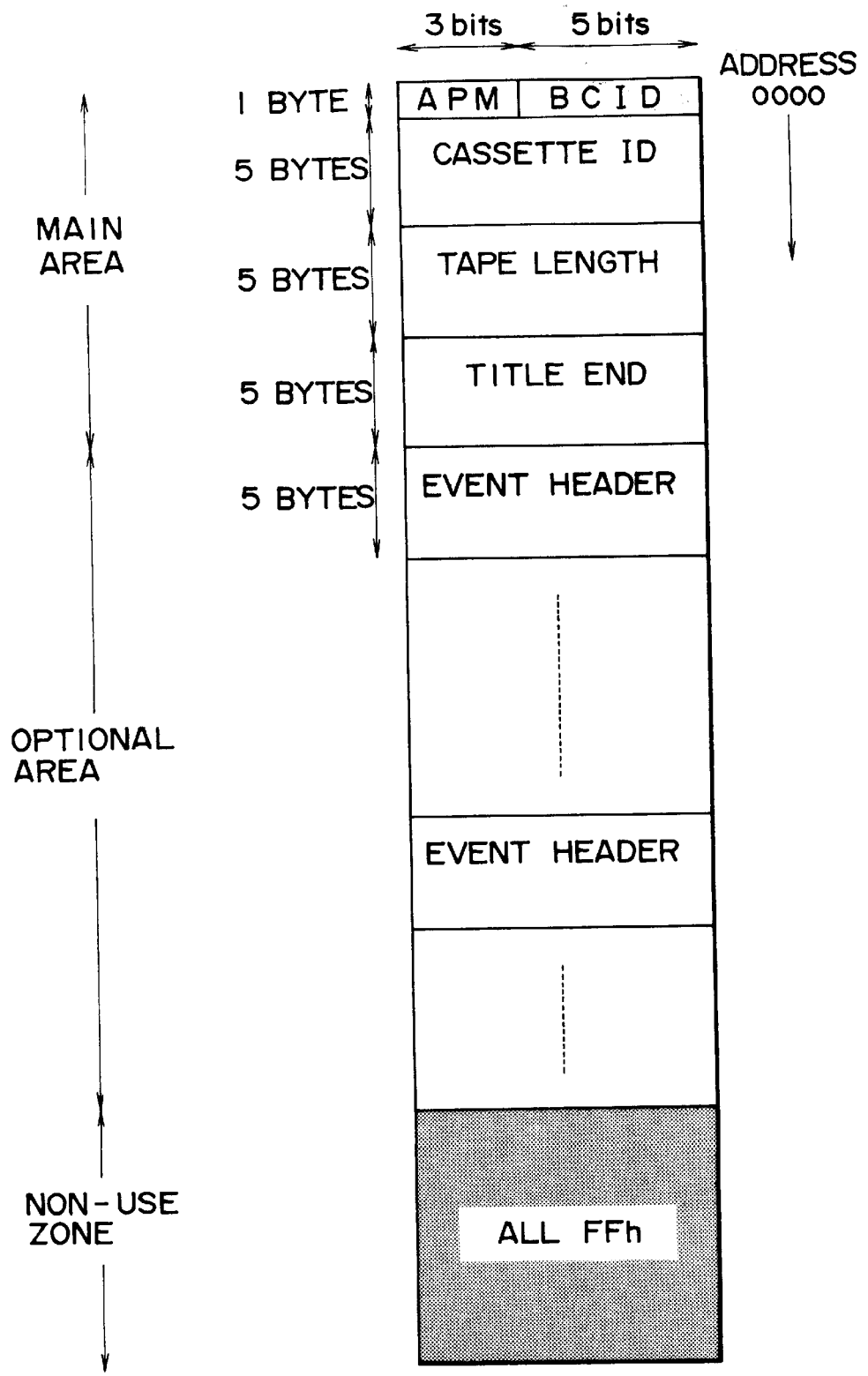

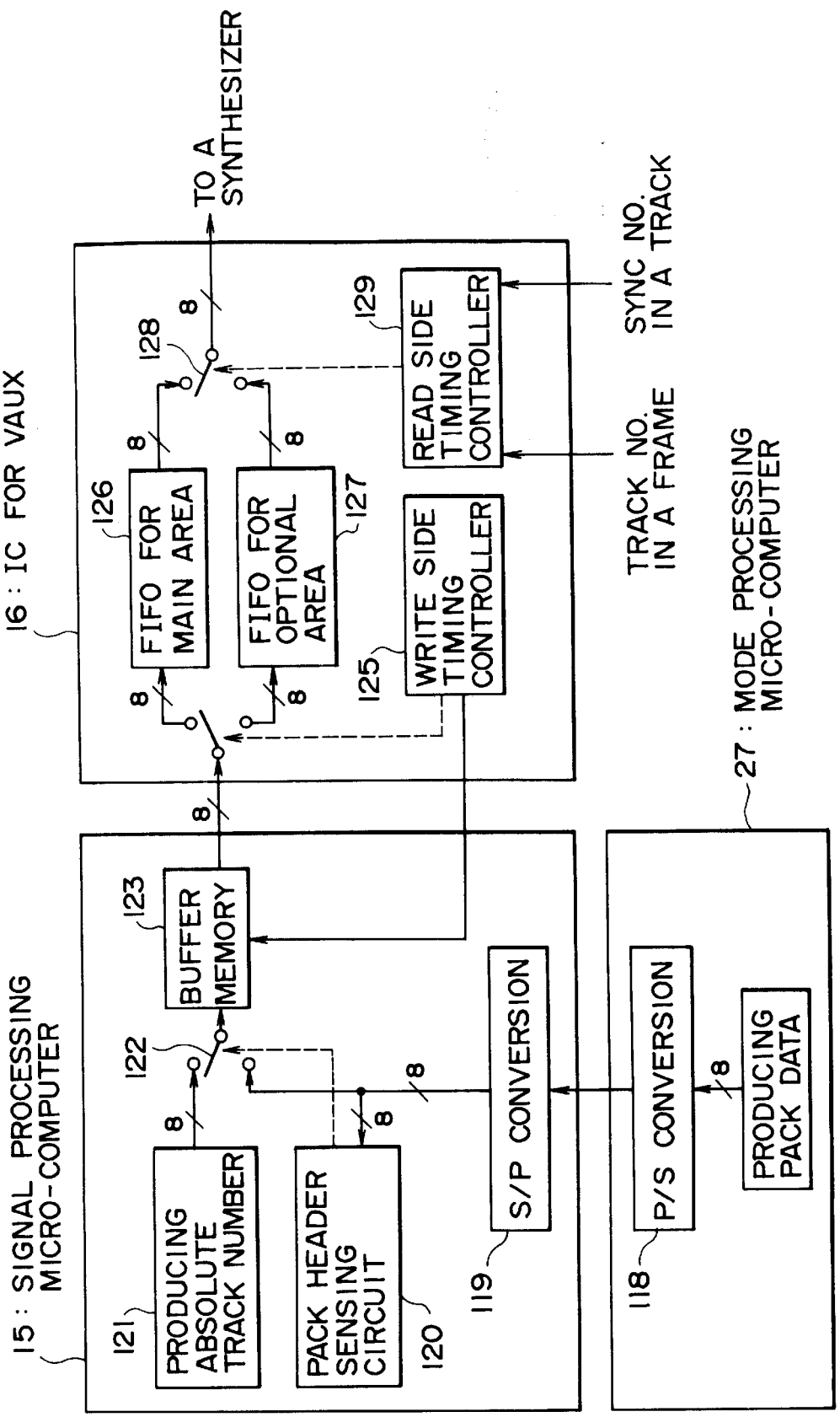

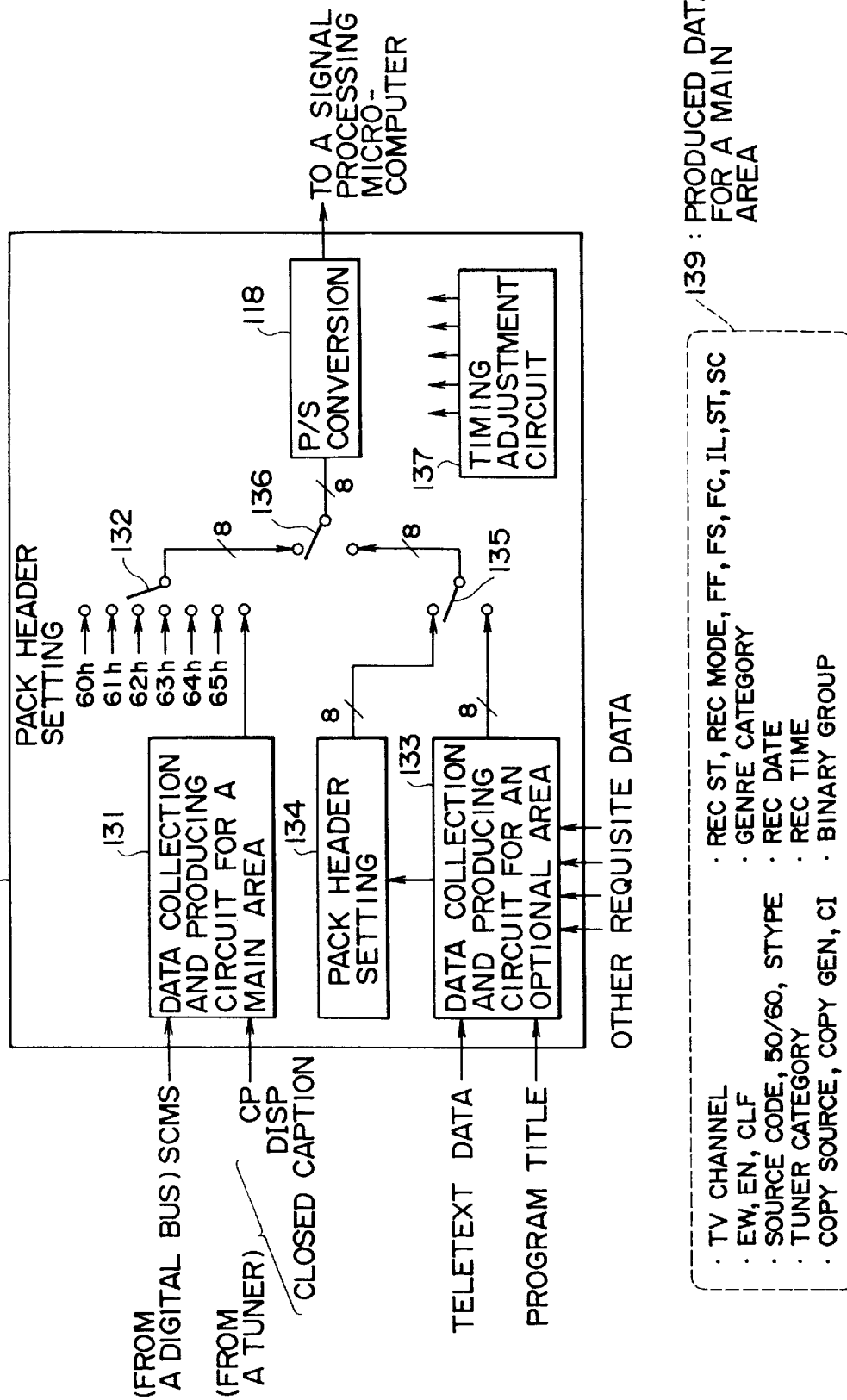

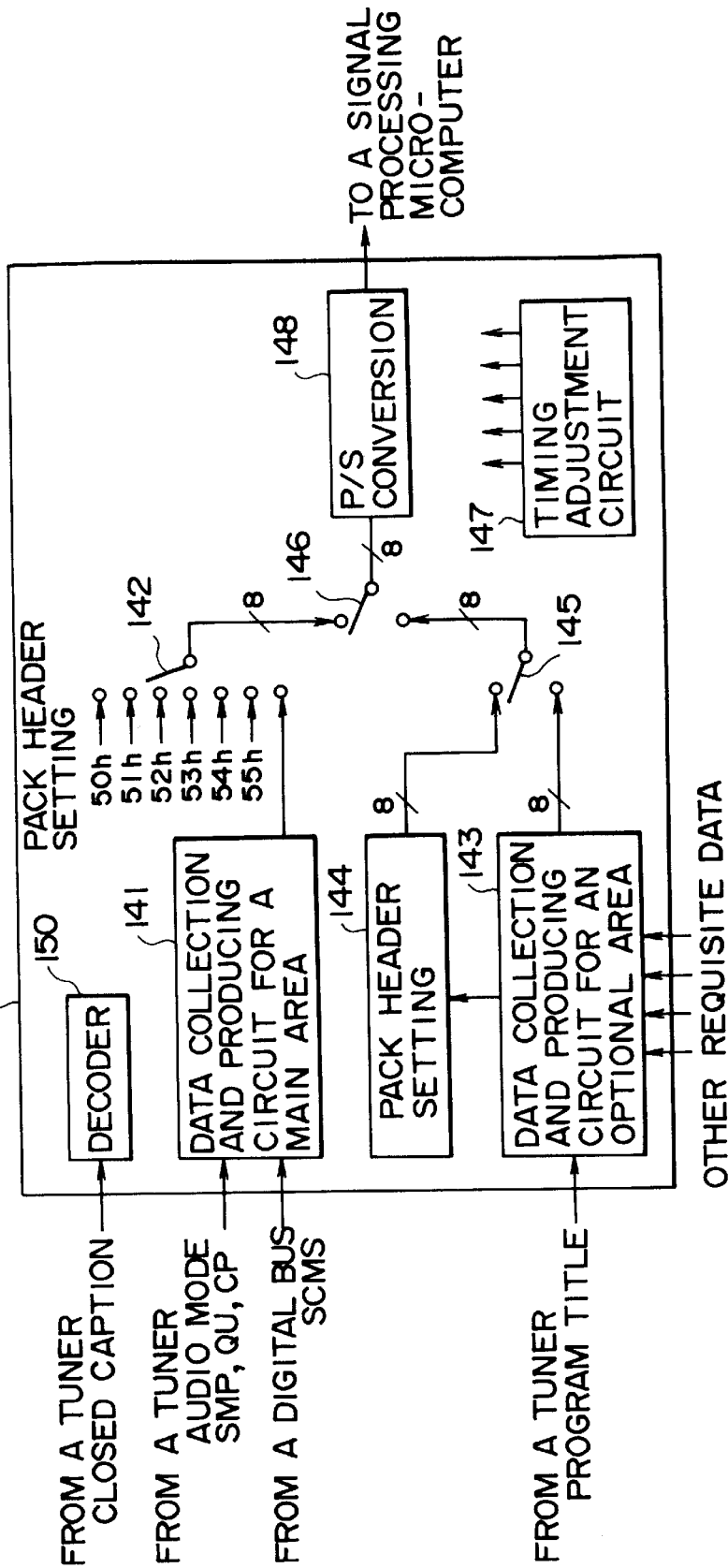

FIG. 37
FIG. 38
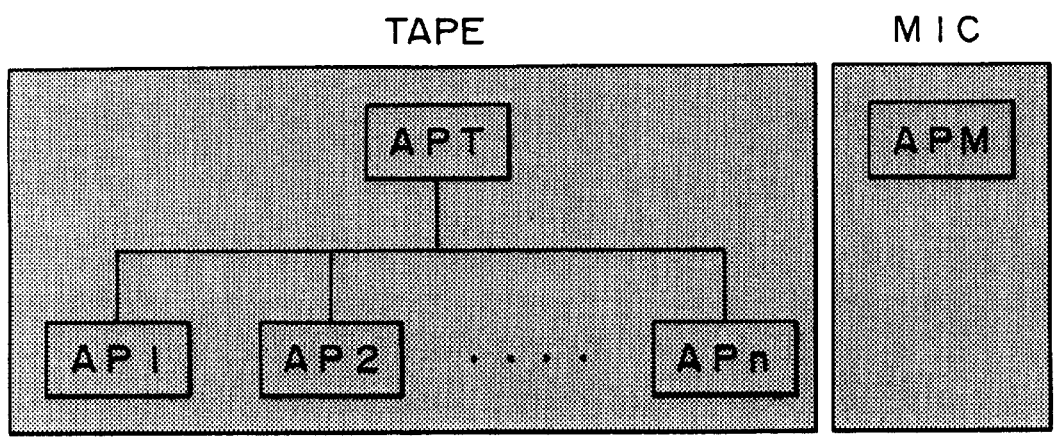
FIG. 39A   IN THE CASE OF APT=000
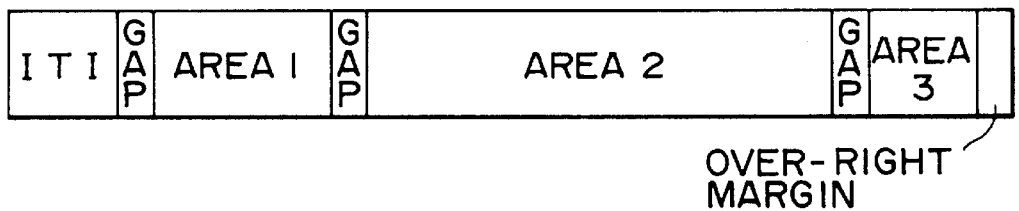
FIG. 39B   FURTHER IN THE CASE OF AP1=AP2=AP3=000
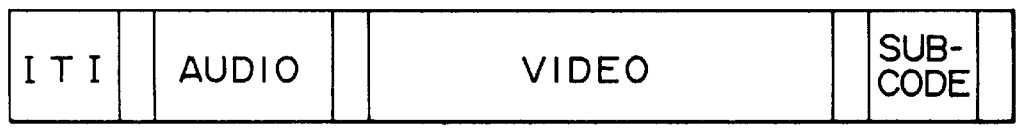

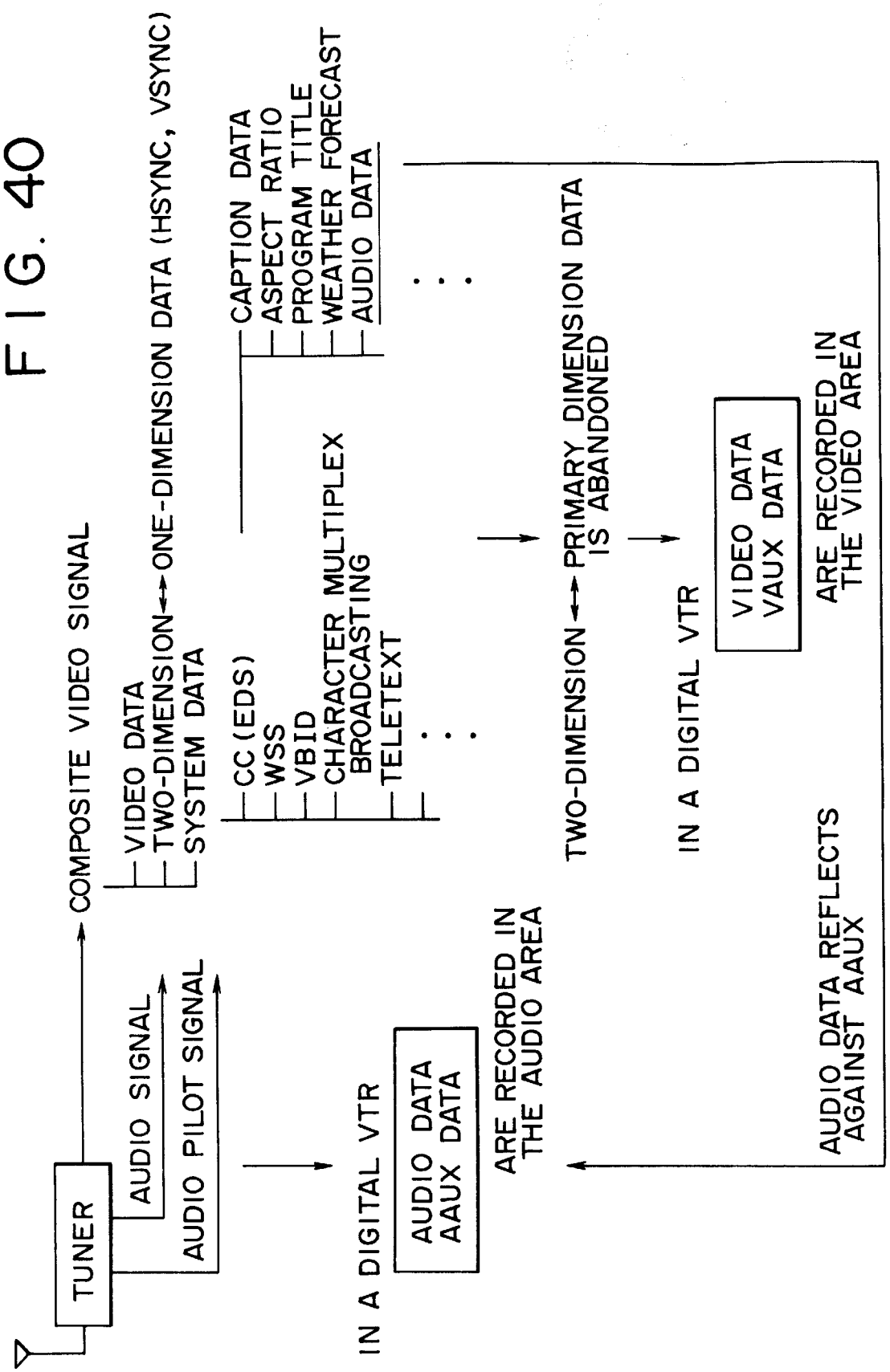

F I G. 41

| | ASPECT RATIO | COPY GUARD | CAPTION | OTHER PROGRAMS | OTHERS | CLOCK | NUMBER OF BITS IN ONE FRAME |
|---|---|---|---|---|---|---|---|
| CC | ○ | | ○ | ○ | | 503 kHz | 32 bits |
| EDS | ○ | | | ○ | ○ | 503 kHz | 20 bits |
| VBID | ○ | ○ | | | ○ | Fsc/4 | 14 bits |
| WSS | ○ | | | | ○ | 833 kHz | |
| CHARACTER MULTIPLEX SIGNAL | | | ○ | ○ | | 5.7272 MHz | 4480 bits |
| TELETEXT | | | ○ | ○ | | 6.9375 MHz | 11008 bits |
| MACRO-VISION SIGNAL | | ○ | | | | VARIOUS VALUES | ANALOG |
| INTER-STATION CONTROL SIGNAL | | | | | ○ | VARIOUS VALUES | ANALOG |
| WORK SIGNAL | | | | | ○ | UNKNOWN | UNKNOWN |

FIG. 42

MAIN AREA
- REQUISITE AND NECESSARY PACK
  (THIS IS IMPORTANT IN VIEW OF
   REPRODUCING VIDEO AND
   AUDIO SIGNALS)
  SOURCE, SOURCE, CONTROL
- OPTIONAL PACK
  REC DATE, REC TIME,
  BINARY GROUP,
  CLOSED CAPTION

| | | | | | | |
|---|---|---|---|---|---|---|
| VAUX | 60h | 61h | 62h or FFh | 63h or FFh | 64h or FFh | 65h or FFh |
| AAUX | 50h | 51h | 52h or FFh | 53h or FFh | 54h or FFh | 55h or FFh |

REQUISITE AND NECESSARY
DATA IS STORED

FIG. 47

| AUDIO TYPE OF CC PACK ||  AUDIO MODE OF A SOURCE PACK ||
| MAIN | 2ND | CH1 | CH2 |
|---|---|---|---|
| 001 | 000 | 0010 | 1110 |
|  | 001 | 0010 | 0010 |
|  | 010 | 0010 | 1110 |
|  | 011 | 0010 | 1110 |
|  | 100 | 0010 | 1110 |
|  | 101 | 0010 | 1110 |
|  | 110 | 0010 | 1110 |
|  | 111 | 0010 | 1111 |

0010 : MONO
1110 : BEYOND DISCRIMINATION
1111 : NO INFORMATION
CH1 : FIRST HALF 5 TRACKS
CH2 : SECOND HALF 5 TRACKS

METHOD AND APPARATUS FOR DIGITALLY RECORDING AND REPRODUCING DATA RECORDED IN THE VERTICAL BLANKING PERIOD OF VIDEO SIGNAL

This application is a continuation of application Ser. No. 08/375,800, filed on Jan. 20, 1995 now abandoned.

BACKGROUND OF THE INVENTION

1. Field of the Invention

This invention relates to a device for recording and reproducing a digital video signal and a digital audio signal.

2. Description of the Related Art

In a video tape recorder for recording and reproducing an analog video signal (hereinafter called as "an analog VTR") in the prior art, composite video signals to be recorded were recorded together with the content of a vertical blanking period as they were.

At this time, a base band signal of a component with 1 MHz or less was recorded in reference to an electromagnetic converting characteristic between a magnetic head and a magnetic tape and another component having a high frequency (approximately 5.7 MHz) such as a character multiplex broadcasting signal showed a blurred state, resulting in that its recording and reproducing could not be carried out.

As related technologies, the applicant has some following EPs and U.S. Patent Applications.

EP Laid-Open No. 0541029 (corresponding U.S. Patent: pending)

EP Laid-Open No. 0553650 (corresponding U.S. Patent: U.S. Pat. No. 5,349,384)

EP Laid-Open No. 0600467 (corresponding U.S. Patent: pending)

EP Laid-Open No. 0600493 (corresponding U.S. Patent: pending)

EP Laid-Open No. 0614187 (corresponding U.S. Patent: pending)

EP Laid-Open No. 0621731 (corresponding U.S. Patent: pending)

In recent years, there has been a trend that various control signals, video-associated information (information about video) or audio-associated information (information about voice) are inserted into a broadcasting electric wave or a package media within a vertical blanking of a video signal in reference to the electromagnetic converting characteristic. For example, there are CLOSED CAPTION, VBID, WSS and EDTV2 and the like. In addition, EDS (Extended Data Service) for performing various data services under a format of CLOSED CAPTION signal is defined. In this EDS, it is planned to transmit the associated information of voice of television signal (kind of languages, stereo/monoral and the like).

In addition, these format signals include information such as an aspect ratio of a video and a wide television set decodes this information to change over an aspect ratio of a screen.

In turn, in a digital VTR using a video compression technology of which development has been remarkable in recent years, either a vertical blanking period or a horizontal blanking period is eliminated in order to reduce an amount of data of recording signal. Accordingly, recording and reproducing of the video signal including aforesaid various format signals by the digital VTR using such a video compression technology had a problem that these format signals were lost.

The present invention has been invented in order to solve such problems as described above and it is an object of the present invention to enable various associated information signals inserted in the vertical blanking period of the video signal even at the digital VTR using the video compression technology.

SUMMARY OF THE INVENTION

In order to solve the aforesaid problems, the digital video and audio signal recording and reproducing device of the present invention is characterized in that there are provided:

a recording format having a first recording area (a video data recording area) for recording a coded video signal, a second recording area (an audio data recording area) for recording a coded audio signal, and a third recording area (an auxiliary data area) for recording an audio associated data constituted in pack;

means for coding a video signal and recording it in the first recording area;

means for coding an audio signal and recording it in the second recording area;

means for constituting an audio-associated information in pack inserted in a vertical blanking period of the video signal and recording it in the third recording area;

means for reproducing the coded video signal from the first recording area and decoding the video signal;

means for reproducing the coded audio signal from the second recording area and decoding the audio signal; and means for reproducing the audio-associated information constituted in pack from third recording area and reading out the associated information.

The third recording area is constituted to have a main zone and a sub-zone.

The audio-associated information is constituted in pack and recorded in the sub-zone of the third recording area and the audio-associated information having a high degree of importance is recorded in the main zone of the third recording area.

In this case, the main zone is defined as a zone in which the pack header in the preferred embodiment records packs of 50h and 51h and the sub-zone is defined as a zone in which the pack header in the preferred embodiment records the packs of 52h to 56h.

In addition, in the case that the content in the sub-zone can be understood during reproducing operation, the associated information within the sub-zone is superimposed to a vertical blanking period of a video signal and in turn in the case that the content in the sub-zone can not be understood, only the associated information having a high degree of importance in the main area is taken out and is superimposed to a vertical blanking period of the video signal.

A pair of tracks recorded by a pair of heads having different azimuth angles to each other are handled as a pair, thereby the kind of associated information recorded in one frame of the video information is increased. For example, in the device in which the video signals in one frame are recorded as ten tracks, it is possible to record five kinds of associated information.

In addition, the most preference associated information is recorded in the sub-zone of the final track pair within one frame, thereby a compatibility of this with another device having other associated information recorded in the sub-zone other than the final track pair is kept.

In order to solve the aforesaid problems, the digital video and audio signal recording and reproducing device of the present invention is characterized in that it includes:

a recording format having a first recording area (VIDEO DATA recording area) for recording coded video signals, a second recording area (AUDIO DATA recording area) for recording the coded audio signals and a third recording area (VAUX DATA recording area) for recording the video associated data constituted in pack;

means for coding a video signal and recording it in said first recording area, and means for coding an audio signal and recording it in said second recording area;

means for constituting in pack the video associated information and the audio associated information inserted in a vertical blanking period of a video signal as they are, and recording them in the third recording area;

means for reproducing the coded video signal from the first recording area and decoding the video signal;

means for reproducing the coded video signal from the second recording area and decoding the audio signal; and means for reproducing the video-associated information and the audio-associated information constituted in pack from said third recording area, reading out the associated information and superposing them to a vertical blanking period of the decoded video signal.

The video-associated information and the audio-associated information are constituted to record only the data part except a clock line or a start bit, thereby an amount of use in the third recording area can be saved.

In addition, a pack having a desired discriminating data (a pack header) is applied against the associated information inserted into a desired line, thereby it is possible that the line number is not stored in the data constituted in pack.

In addition, there is provided a fourth recording area (AAUX DATA recording area) for recording the audio-associated data so as to record the audio-associated information.

Each of the third recording area and the fourth recording area is constituted to have a main zone and a sub-zone, respectively;

the video-associated information and the audio-associated information are constituted in pack at the sub-zone of the third recording area, the video-associated information having a high degree of importance is constituted in pack in the main zone of the third recording area and recorded there; the audio-associated information is constituted in pack and recorded in the sub-zone of the fourth recording area and the audio-associated information having a high degree of importance is constituted in pack and recorded in the main zone of the fourth recording area.

The main zone of the third recording area is a zone where the pack header in the preferred embodiment records packs of 60h and 61h, the sub-zone in the third recording area is a zone where the pack header in the preferred embodiment records the packs of 62h to 66h. In addition, the main zone in the fourth recording area is a zone where the pack header in the preferred embodiment records the packs of 50h and 51h and the sub-zone in the fourth recording area is a zone where the pack header in the preferred embodiment records the packs of 52h to 56h.

In addition, in the case that the content in the sub-zone can be understood during a reproducing operation, the associated information in the sub-zone is superposed on a vertical blanking period of the video signal and in turn in the case that the content in the sub-zone can not be understood, only the associated information having a high degree of importance in the main zone is superposed on the vertical blanking period of the video signal.

In addition, a pair of tracks to be recorded by a pair of heads having a different azimuthal angle from each other are handled as pairs to cause the kind of associated information recorded in one frame of the video signal to be increased. For example, a device in which the video signal in one frame is recorded as ten tracks enables five kinds of associated information to be recorded.

In addition, the associated information having the most preference is recorded in the sub-zone of the final track pair within one frame causes a compatibility to be kept with a device in which other associated information are recorded in the sub-zone other than the final track pair.

As described above in detail, the present invention is operated such that the audio-associated information inserted in the vertical blanking period of the video signal is recorded in the recording area for the audio-associated data through a pack constitution, these associated information are read out during reproducing operation and returned back to the vertical blanking period of the video signal, so that even the video compression type digital VTR enables these associated information inserted into the vertical blanking period to be kept.

With such an arrangement as above, even if the digital VTR and the analogue VTR are connected to each other, these associated information are transmitted in a transparent manner.

In addition, the associated information which is requisite and necessary for a reproducing of the audio signal is reflected to the main zone of the associated data recording area, thereby even if the vertical blanking information is newly defined, its compatibility can be assured.

In addition, the present invention is operated such that the video signal-associated information and the audio signal-associated information are constituted in pack and recorded in the recording area of the video-associated data, these associated information are read out during a reproducing operation and returned back to the vertical blanking period of the video signal, so that even in the video compression type digital VTR, these associated information inserted in the vertical blanking period can be kept.

With such an arrangement as above, even if the digital VTR and the analogue VTR are connected to each other, these associated information are transmitted in a transparent manner.

In addition, since the audio-associated information inserted in the vertical blanking period of the video signal is also recorded in the recording area of the audio-associated data, the audio-associated information can be recovered unless the reproducing data in the recording area of the video-associated information is used. Accordingly, even in the case that the audio signal-associated information recorded in the video-associated data is lost, the audio-associated information can be recovered.

In addition, information which is requisite and necessary for reproducing a video signal and an audio signal is reflected to the main zone of the associated-data recording area, thereby their compatibility can be assured even if a vertical blanking information will be newly defined in the future.

BRIEF DESCRIPTION OF THE DRAWINGS

FIG. 1 is a view for illustrating a TR pack.

FIG. 2 is a view for illustrating a recording operation and a reproducing operation of a TR pack corresponding VTR and a TR pack non-corresponding VTR.

FIG. 4 is a view for illustrating a state in which VBID data and WSS data are stored in VAUX TR pack.

FIG. 5 is a view for illustrating a detail of AAUX TR pack.

FIG. 7 is a view for illustrating a recording format of one track in a digital VTR.

FIG. 14 is a view for illustrating a structure of an ID part in SYNC block in an audio area and a video area, respectively.

FIG. 17 is a view for illustrating a definition of a group of a pack of a large item.

FIG. 18 is a view for showing details of AAUX SOURCE pack, AAUX SOURCE CONTROL pack, AAUX REC DATE pack, AAUX REC TIME pack and AAUX REC TIME BINARY GROUP pack, respectively.

FIG. 19 is a view for showing details of AAUX CC pack, VAUX source pack, VAUX SOURCE CONTROL pack, VAUX REC DATE pack and VAUX REC TIME pack, respectively.

FIG. 20 is a view for showing details of VAUX REC TIME BINARY GROUP pack and VAUX CC pack, respectively.

FIG. 21 is a view for illustrating a constitution of AAUX zone corresponding to one frame.

FIG. 24 is a view for illustrating multiplex writing of pack data in a sub-code area in a digital VTR in 525/60 system.

FIG. 25 is a view for illustrating multiplex writing of pack data in a sub-code area in a digital VTR in 625/50 system.

FIG. 26 is a view for illustrating a memory map of an MIC.

FIG. 28 is a view for illustrating a production of pack data in a recording circuit in a digital VTR.

FIG. 30 is a view for illustrating a production of VAUX pack data in mode processing micro-computer.

FIG. 31 is a view for illustrating a production of AAUX back data in a mode processing micro-computer.

FIG. 37 is a view for illustrating a definition of a track format by APT.

FIG. 38 is a view for illustrating a layer constitution of an application ID.

FIG. 39 is a view for illustrating a format on a track in the case that an application ID is "000".

FIG. 40 is a view in which a tuner output of a television signal is analyzed.

FIG. 41 is a view for illustrating a system data inserted into a composite video signal.

FIG. 42 is a view for illustrating VAUX and AAUX main areas.

FIG. 47 is a view showing one example of a relative relation between a stored data of AAUX CC pack and AUDIO MODE of AAUX SOURCE pack.

DETAILED DESCRIPTION OF THE PREFERRED EMBODIMENTS

Figure 3:
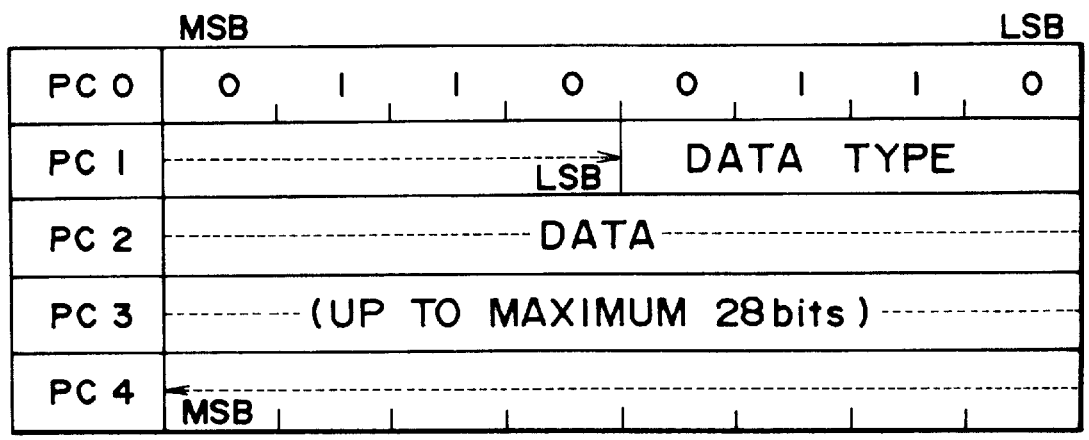
FIG. 3 is a view for showing a detail of VAUX TR pack.

Preferred embodiment of the present invention in which the present invention is applied to a helical scan type digital VTR commercially available (hereinafter called as "a digital VTR") will be described in sequence in reference to the following items.

1. Summary of the digital VTR
   [1] Recording format of the digital VTR
      (1) ITI area
      (2) Audio area
      (3) Video area
      (4) Sub-code area
      (5) Constitution of ID part
      (6) MIC
      (7) Constitution and kind of pack
      (8) Constitution of associated data recording area
   [2] A recording circuit of a digital VTR
   [3] A reproducing circuit of a digital VTR
2. Application ID system
3. Recording and reproducing of data in a vertical blanking period
   [1] Kind of data in a vertical blanking period
   [2] Recording using CLOSED CAPTION pack
   [3] Recording using a transparent pack

1. Summary of a digital VTR

At first, a summary of the digital VTR constituting the preferred embodiment will be described as follows in reference to an order of its recording format, recording circuit and reproducing circuit.

[1] Recording format of a digital VTR

In FIG. 7 is illustrated a recording format on a tape of the digital VTR of the preferred embodiment. In this figure, both ends of the track are provided with some margins. Inside the margins are arranged an ITI area for performing a positive after-recording operation, an audio area for recording an audio signal, a video area for recording the video signal, and a sub-code area for recording sub-data. Between each of the areas is arranged an inter-block gap (IBG) for assuring an area.

A detail of signals to be recorded in each of the aforesaid areas will be described as follows.

(1) ITI area

As shown at an expanded portion in FIG. 7, the ITI area is comprised of a preamble part of 1400 bits, SSA (Start-Sync Block Area), TIA (Track Information Area) of 90 bits and a post-amble of 280 bits.

In this case, the preamble has a function to provide a run-up of PLL during a reproducing operation, and the post-amble has a playing roll of getting a margin. Then, SSA and TIA are constructed with a block data of 30 bits being applied as a unit, and a desired SYNC pattern (ITI-SYNC) is recorded at the leading 10 bits of each of the block data.

At the portions of 20 bits subsequent to this SYNC pattern are recorded mainly SYNC block Nos. (0 to 60) in SSA, APT information of mainly 3 bits in TIA (APT2 to APT0), an SP/LP flag for discriminating a recording mode and a PF flag for indicating a reference frame of a servo system, respectively.

The APT is an ID data for restricting a data constitution on a track and it has a value of "000" in the digital VTR in the preferred embodiment. A detail of the APT information will be described later.

As apparent from the above description, several synchronous blocks having short code length in the ITI area are recorded at fixed locations on a magnetic tape, so that the position where the 61st SYNC pattern in SSA is detected from the reproduced data, for example, is used as a reference position for restricting an after-recording position on the track, thereby a position to be revised during an after-recording operation can be defined highly accurately and a superior after-recording operation can be carried out.

Although the digital VTR of the preferred embodiment is designed enable itself to be easily developed in its products to other various digital signal recording and reproducing devices as described later, any type of revision of the data in the specified area is required even at any digital signal recording and reproducing device, resulting in that the ITI area at an inlet of the track is arranged without fail.

(2) Audio area

As shown at the expanded portion in FIG. 7, the audio area has a preamble portion and a post amble portion before and after it, wherein the preamble portion is comprised of a run-up for drawing PLL and a pre-SYNC for pre-sensing an audio SYNC block.

The post-amble is comprised of a post SYNC for confirming a completion of an audio area and a guard area for protecting an audio area when a video data after-recording is carried out.

Figure 8A:
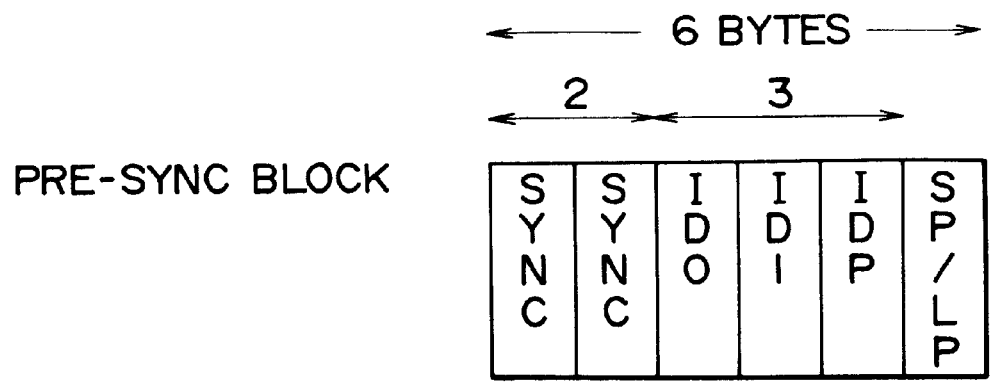
FIG. 8 is a view for illustrating structures of a pre-SYNC block and a post-SYNC block, respectively.
Figure 8B:
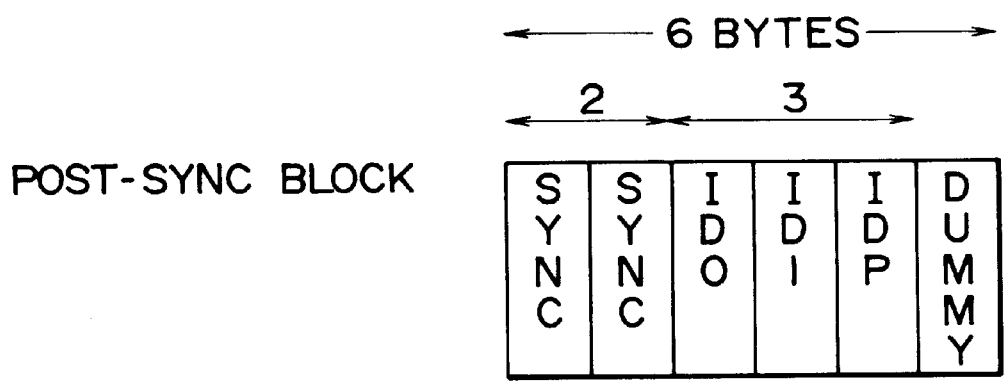

In this case, each SYNC block of a pre-SYNC and a post-SYNC is composed as shown in A and B of FIG. 8, the pre-SYNC is comprised of two SYNC blocks and the post-SYNC is comprised of one SYNC block. At the sixth byte of the pre-SYNC is recorded an identification byte of SP/LP. SP is expressed by FFh and LP is expressed by 00h, and in the case that the SP/LP flag recorded in the aforesaid ITI area can not be read, the value of the identification byte in SP/LP of the pre-SYNC is employed.

The audio data recorded in the area held between the amble areas described above is generated as follows. At first, the audio signal corresponding to one track to be recorded is A/D converted and shuffled, thereafter a framing is carried out against it and a parity bit is added.

Figure 9A:
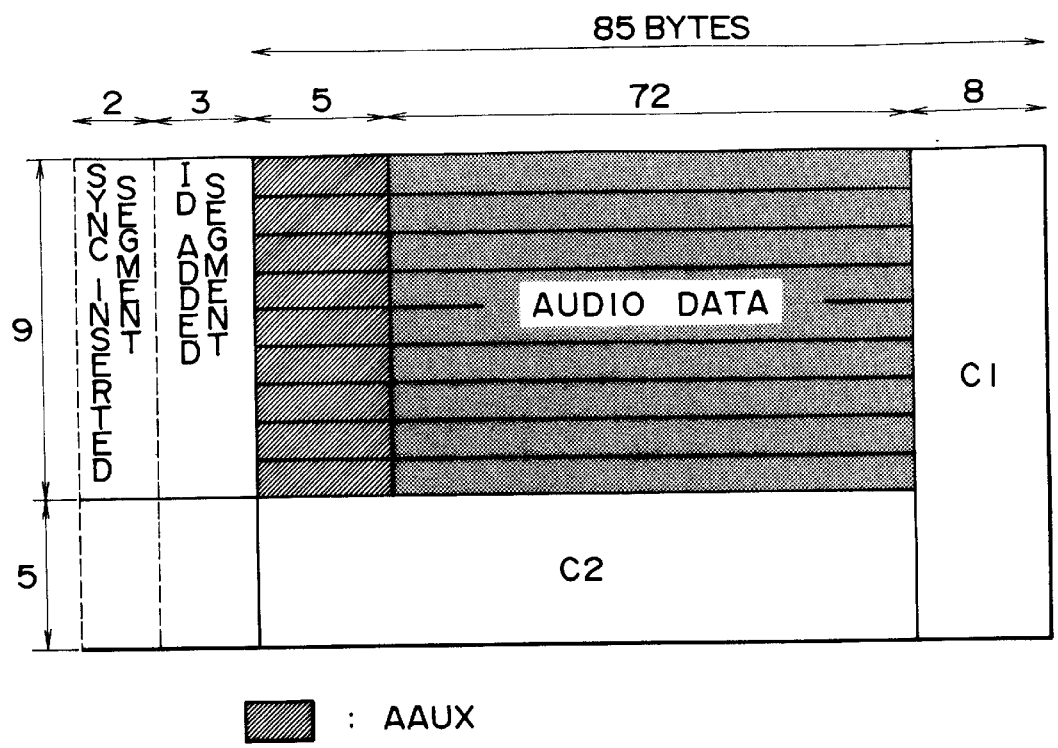
FIG. 9 is a view for illustrating structures of an audio framing format and 1SYNC block, respectively.
Figure 9B:
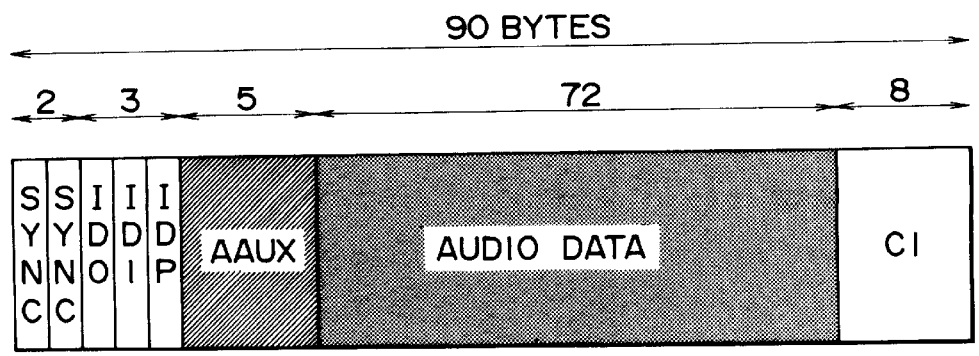

At A in FIG. 9 is shown a format in which this framing is carried out and a parity is added. In this figure, the audio-associated data (hereinafter called "AAUX" data) of 5 bytes is added to the leading end of the audio data of 72 bytes to form data of one block of 77 bytes, and then 9 blocks are piled up vertically to perform a framing and then a horizontal parity C1 of 8 bits and a vertical parity C2 corresponding to 5 blocks are added to this framing.

Data added with these parities is read out in a unit of each block, ID of 3 bytes is added to a leading side of each of the blocks and in addition, the SYNC signal of 2 bytes is inserted in a recording modulation circuit and this is formed into a signal of 1 SYNC block of a data length of 90 bytes as shown at B of FIG. 9.

(3) Video area

As shown at an expanded portion of FIG. 7, the video area has a pre-amble and a post-amble similar to the audio area. In this arrangement the guard area has a length is different from that of the guard area of the audio area. The video data held between these amble areas is formed as follows.

At first, the composite video signals to be recorded are separated into some component video signals of Y, R-Y and B-Y, thereafter A/D converted and then a data of effective scanning area corresponding to one frame is extracted from the A/D converting output.

The extracted data corresponding to one frame of the video signal in 525/60 system in respect to an A/D conversion output (DY) of a Y signal is constituted by 720 samples in a horizontal direction and 480 lines in a vertical direction, the extracted data in respect to an A/D conversion output (DR) of a R-Y signal and an A/D conversion output (DB) of a B-Y signal is constituted by 180 samples in a horizontal direction and 480 lines in a vertical direction. As indicated in FIG. 10, these extracted data are divided into blocks of 8 samples in a horizontal direction and 8 lines in a vertical direction.

Figure 10A:
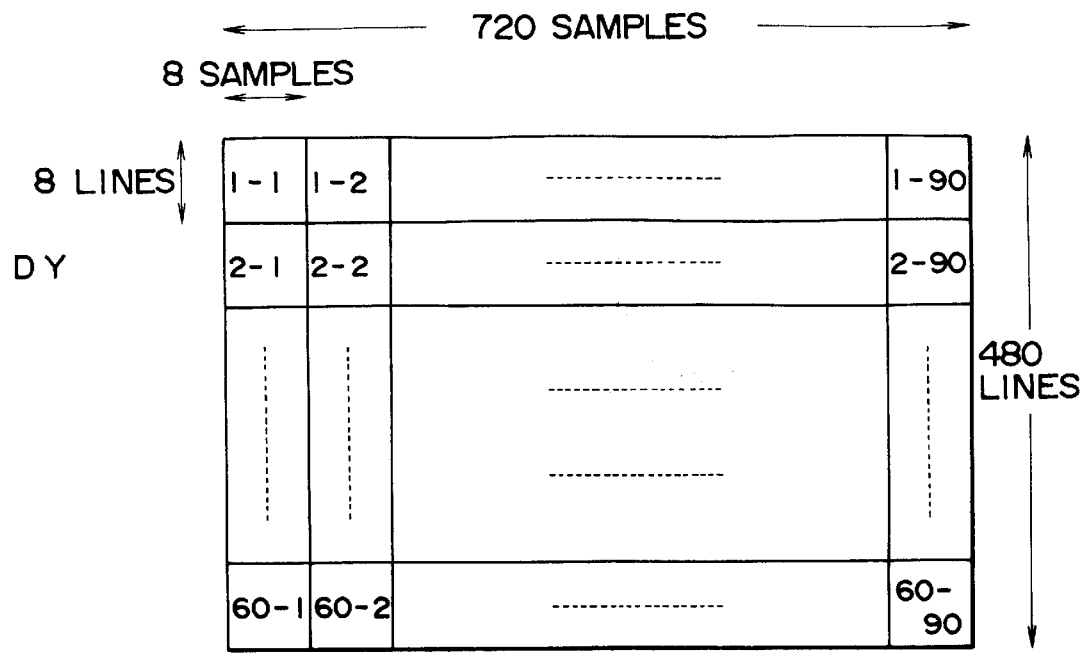
FIG. 10 is a view for illustrating a blocking of video data corresponding to one frame.
Figure 10B:
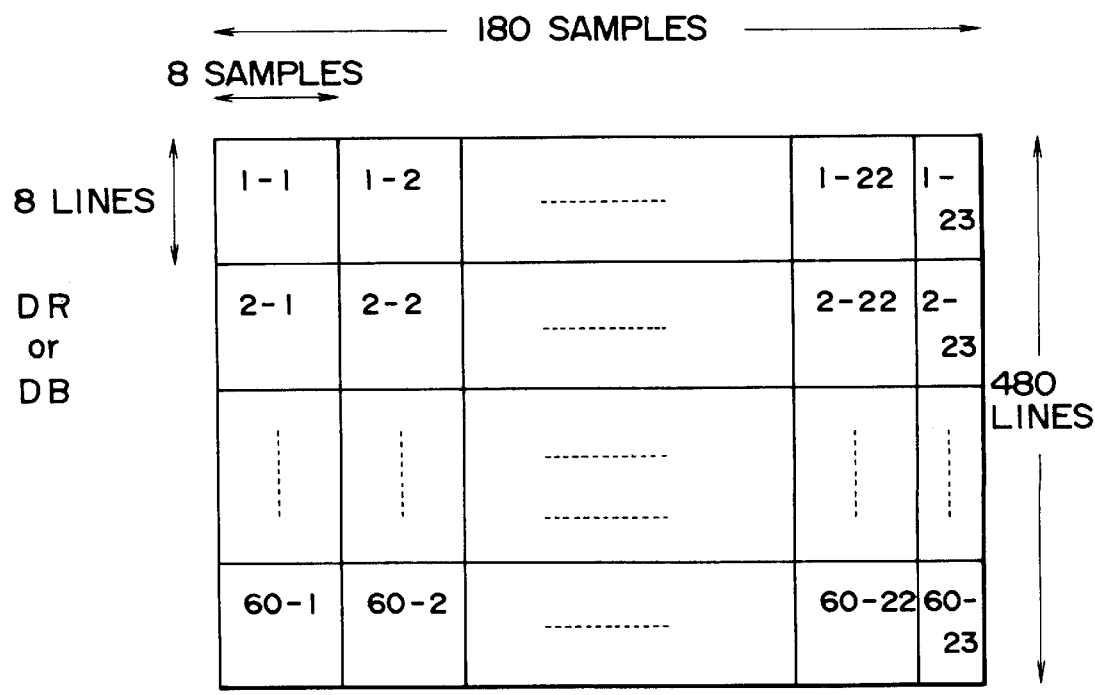

However, as for a color difference signal, since the block at the right end portion in B in FIG. 10 has only four samples in a horizontal direction, the two adjoining blocks in a vertical direction are assembled to form one block. A total number of 8100 blocks are formed by DY, DR and DB per one frame through the aforesaid blocking process. The block constituted by 8 samples in a horizontal direction and 8 lines in a vertical direction is defined as a DCT block.

Then, these blocked data are shuffled in accordance with a predetermined shuffling pattern, thereafter DCT converted in a unit of DCT block and subsequently quantization and a variable length coding are carried out. The quantization step is set for every 30 DCT blocks and the value of this quantization step is set such that a total amount of output data in which 30 DCT blocks are quantized and coded in variable length is less than a predetermined value. That is, the video data is set to have a fixed length for every 30 DCT blocks. Data corresponding to 30 DCT blocks is defined as a buffering unit.

The data of which length is fixed as described above is applied with a framing together with the video-associated data (hereinafter called as "VAUX data") for every data corresponding to one track thereof and thereafter an error correcting code is added.

Figure 11:
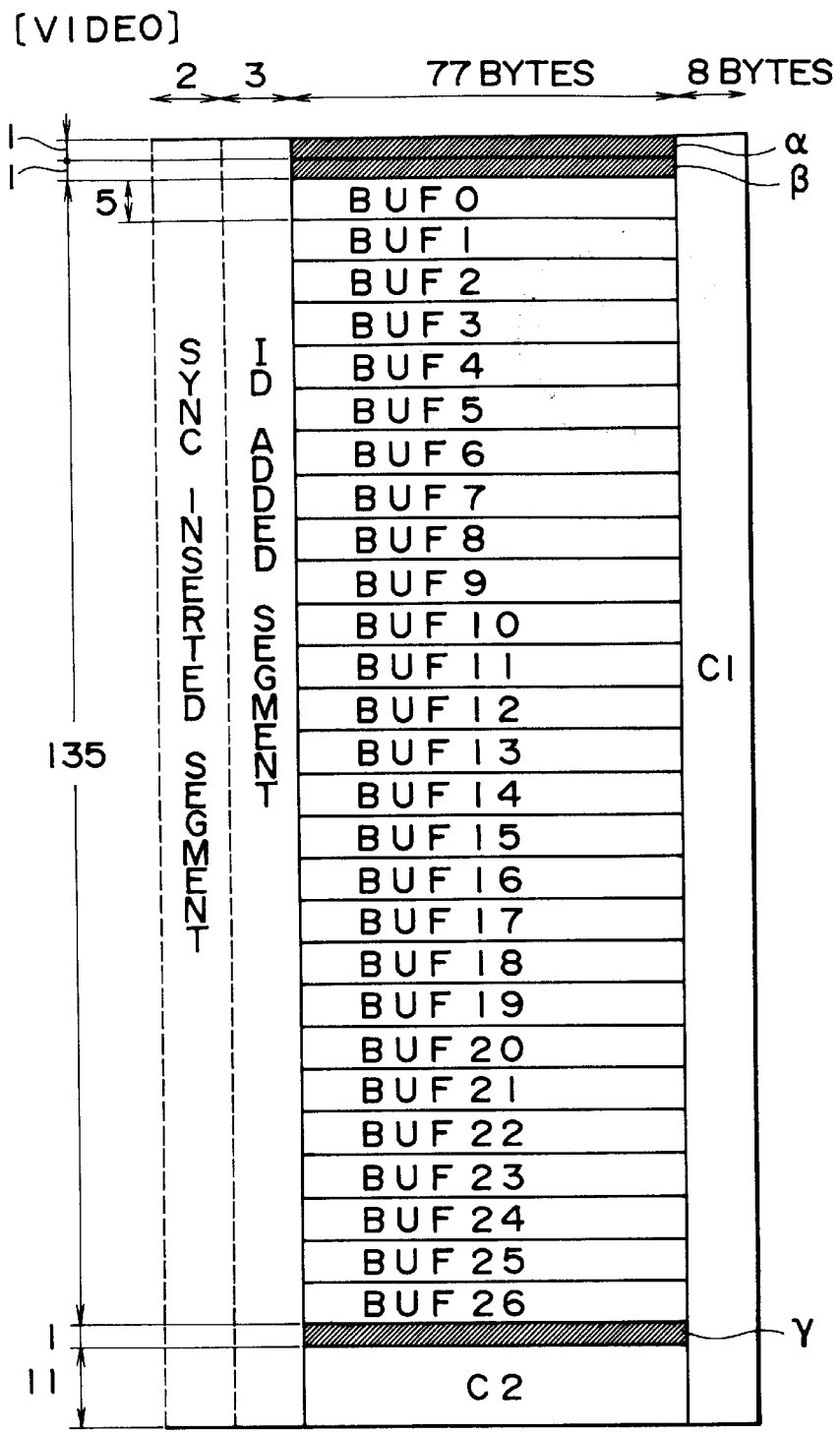
FIG. 11 is a view for illustrating a framing format of a video to which an error correcting code is added.

In FIG. 11 is illustrated a format of state in which this framing is applied to add the error correcting code.

In this figure, each of BUF0 to BUF26 expresses one buffering unit. One buffering unit has a configuration in which it is divided into 5 blocks in vertical direction as shown at A of FIG. 12, each of the blocks has an amount of data of 77 bytes. One byte at the extremity end of each of the blocks is provided with an area Q for storing parameters concerning quantization.

Video data is stored in an area of 76 bytes subsequent to the quantization data. As shown in FIG. 11, VAUX data α and β corresponding to two blocks within the aforesaid buffering unit are arranged above the 27 buffering units SDET in a vertical direction, VAUX data γ corresponding to one block is arranged below the buffering units, and a horizontal parity C1 of 8 bytes and a vertical parity C2 corresponding to 11 blocks are added to these framing processed data.

Figure 12A:
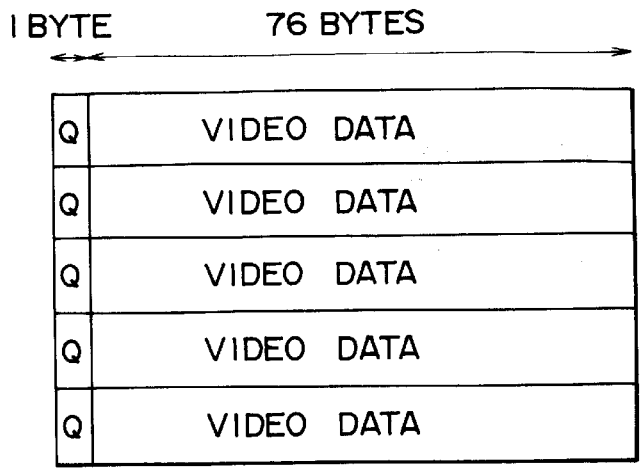
FIG. 12 is a view for illustrating a configuration of a buffering unit and 1SYNC block of a video.
Figure 12B:
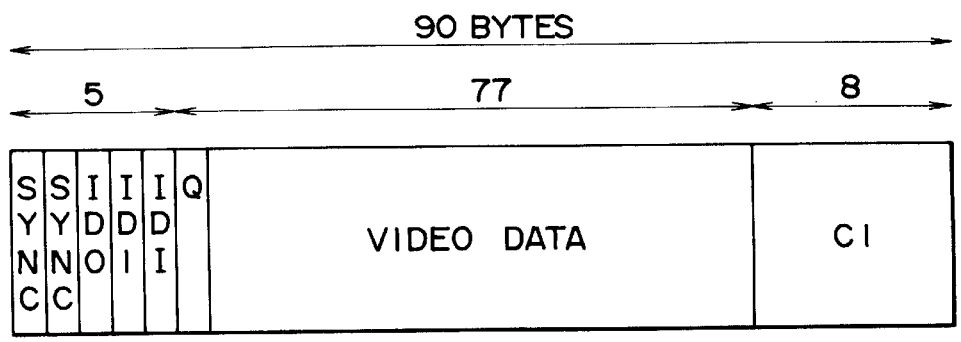
Figure 12C:
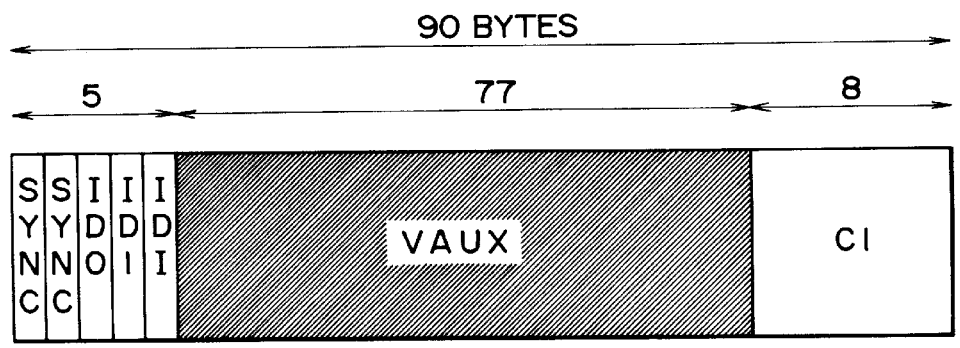

In this way, the signals added with the parities are read out in each of the block units, ID signal of 3 bytes is added to the extremity end of each of the blocks and further a SYNC signal of 2 bytes is inserted into a recording modulation circuit. With such an arrangement as above, a signal of 1SYNC block having an amount of data of 90 bytes as indicated at B of FIG. 12 is formed as a block of video data and further a signal of 1SYNC block as indicated at C of FIG. 12 is formed for a block of VAUX data. Signals for every 1SYNC block are recorded in sequence in a tape.

In the aforesaid framing format, since 27 buffering units expressing a video data corresponding to one track have data corresponding to 810 DCT blocks, data of one frame (corresponding to 810 DCT blocks) are recorded while being divided for 10 tracks.

(4) Sub-code area

Figure 13:
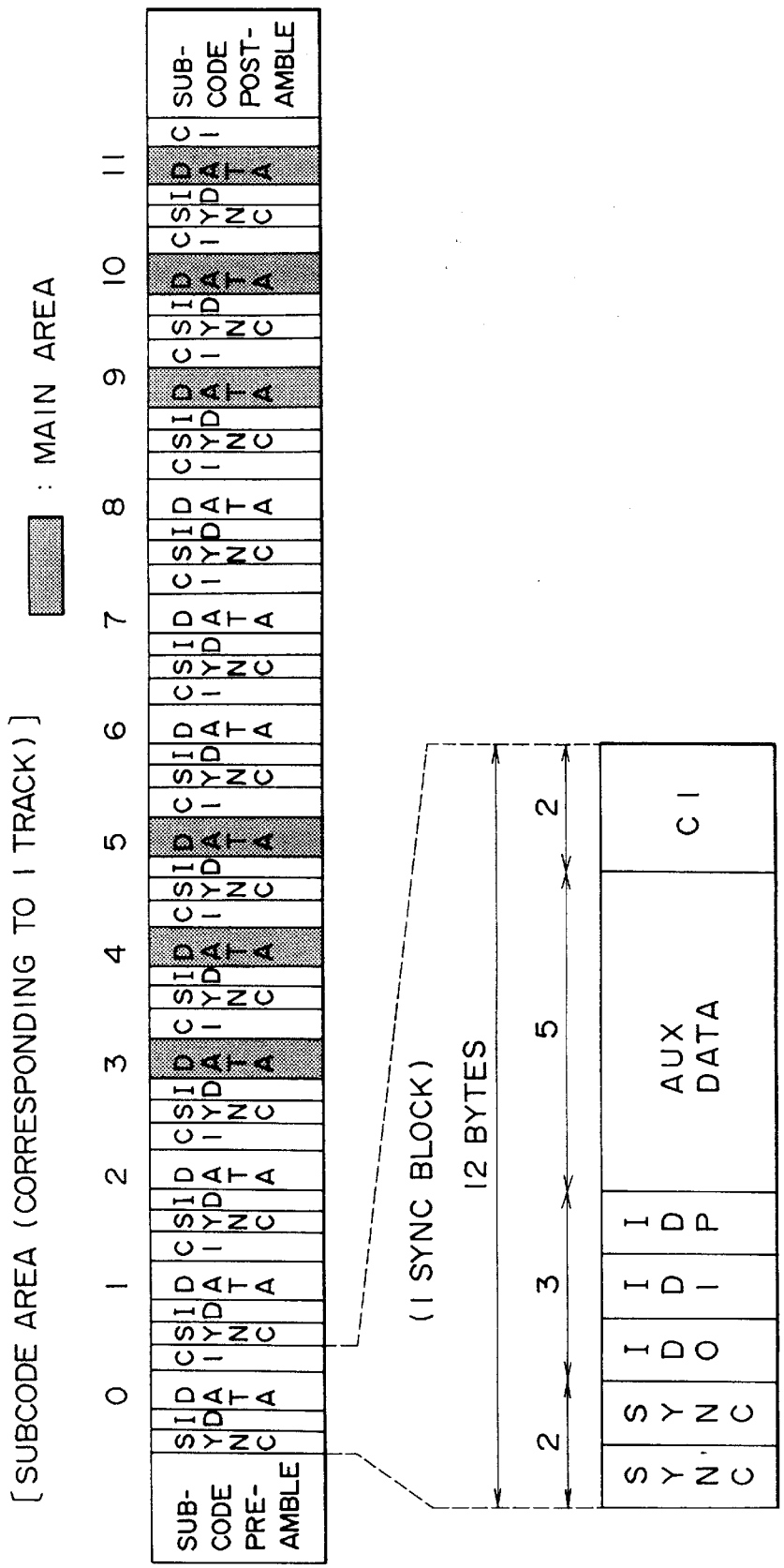
FIG. 13 is a view for illustrating a structure of a sub-code area corresponding to one track.

This sub-code area is an area arranged to record information for use in performing a high-speed search and its expanded view is shown in FIG. 13. As shown in this figure, the sub-code area includes 12 SYNC blocks having a data length of 12 bytes, and both pre-amble and post-amble are arranged before and after them.

The pre-SYNC and the post-SYNC are not provided as in the audio area and the video area. Each of 12 SYNC blocks has a data part for recording the associated data (AUX data) of 5 bytes. In addition, as the parity for protecting the associated data of 5 bytes, only the horizontal parity C1 of 2 bytes is used and the vertical parity is not used.

Each of SYNC blocks constituting an audio area, a video area and a sub-code area described above is applied with a conversion of 24/25 during a recording modulation (a recording modulation system in which a tracking control pilot frequency component is applied to a recording code by converting data for every 24 bits of recording signal into 25 bits), so that an amount of recorded data in each of the areas becomes the number of bits indicated in FIG. 7.

(5) Structure of ID part

As apparent from the configuration of each of the SYNC blocks shown in FIGS. 9, 12 and 13 above, the SYNC blocks recorded in the audio area, the video area and the sub-code area have a common configuration in view of the fact that they have the ID part of 3 bytes comprised of ID0, ID1 and IDP (a parity for protecting ID0 and ID1) after the SYNC signal of 2 bytes. ID0 and ID1 within the ID part have a configuration of data as shown in FIG. 14 at the audio area and the video area.

That is, the SYNC numbers in tracks ranging from the pre-SYNC in the audio area to the post-SYNC in the video area are stored in ID1 in a binary number. Then, the track number within one frame is stored in the lower 4-bits in ID0.

A sequence number of 4-bits as shown at A in this figure at each SYNC block of AAUX+audio data and video data is stored in the upper 4-bits of ID0. In turn, at the pre-SYNC block, the post-SYNC block and the sync block of the parity C2 in the audio area, the ID data AP1 with 3 bits for defining the data structure in the audio area is stored, and further at the pre-SYNC block, the post-SYNC block and the SYNC block of the parity C2 in the video area, the ID data AP2 of 3-bits for defining the data structure in the video area is stored (refer to B in this figure.) Values of these AP1 and AP2 are "000" in the digital VTR of the present preferred embodiment.

The aforesaid sequence numbers record the 12 different kinds of numbers ranging from "0000" to "1011" and checking of the sequence numbers enables an operator to check if the data obtained during the speed converting and reproducing operation is within the same frame.

Figures 15, 16:
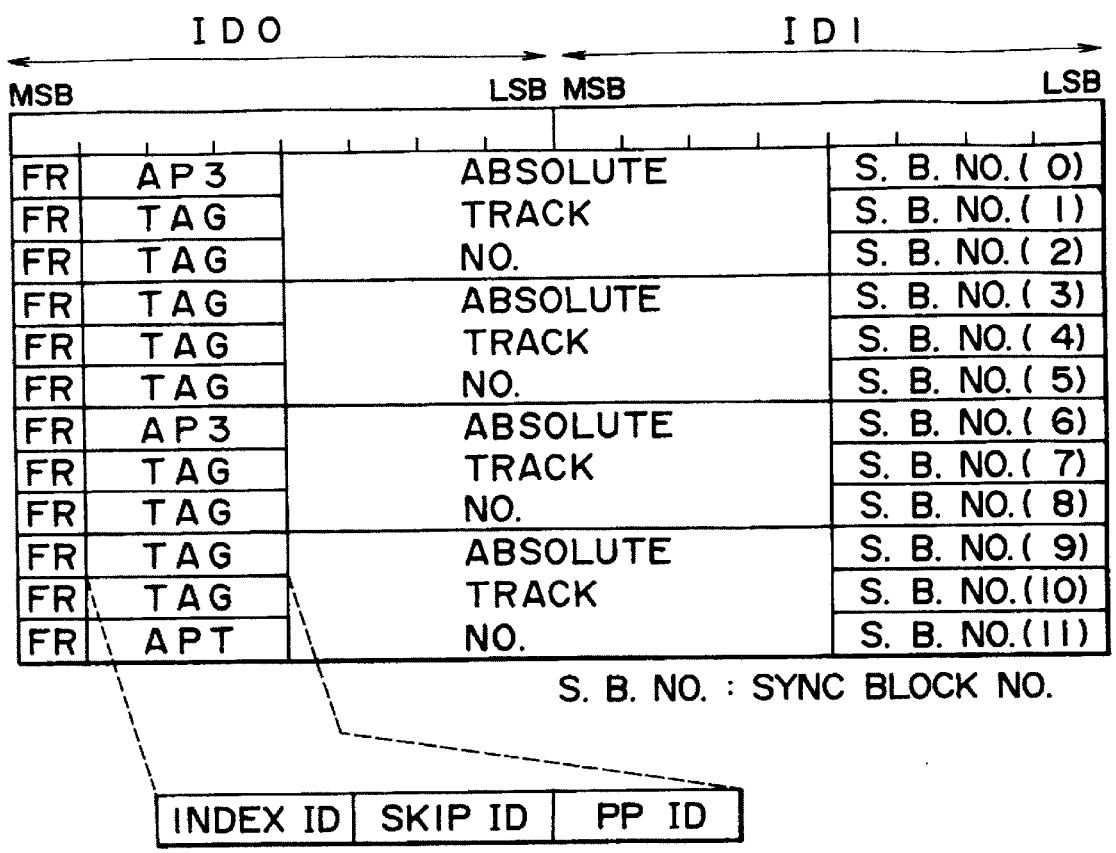
FIG. 15 is a view for illustrating a constitution of ID part of SYNC block at a sub-code area.
FIG. 16 is a view for illustrating a basic constitution of a pack.

In turn, the structure of the SYNC block in the sub-code area is defined as shown in FIG. 15. This figure indicates the structure of each of the ID parts ranging from the SYNC block numbers 0 to 11 in one track in the sub-code area and the uppermost digit bit in ID0 has an FR flag.

This flag indicates whether or not this is a former half 5 tracks in the frame, wherein it takes a value of "0" at the former half 5 tracks and a value of "1" in the later half 5 tracks, respectively. The ID data AP3 for defining the data structure of the sub-code area in the SYNC block having the SYNC block numbers "0" and "6" are recorded in the subsequent 3 bits, and at the same time the ID data APT for defining the data structure on the track is recorded in the SYNC block of the SYNC block number "11", and a TAG code is recorded in another SYNC block. In addition, the value of the aforesaid AP3 is "000" in the digital VTR of the preferred embodiment.

In addition, the aforesaid TAG code is comprised of three kinds of ID signals for use in searching operation as shown at an expanded view in this figure, i.e. INDEX ID for use in searching INDEX, SKIP ID for use in cutting a non-required scene such as a commercial and the like, and a PP ID (Photo/Picture ID) for use in searching a still picture which are performed in the prior art, respectively.

In addition, the least significant 4-bits of ID0 and the most significant 4-bits of ID1 are applied for recording absolute track numbers (consecutive track numbers from the leading end of the tape). Provided that as shown in this figure, one absolute track number is recorded by using a total number of 24 bits corresponding to three SYNC blocks. The SYNC block numbers of the sub-code area are recorded in the least significant 4-bits of ID1.

(6) MIC

As described above, the associated data is recorded in each of the areas defined on the tape in the digital VTR of the preferred embodiment. However, in addition to the above, a circuit board having some memory ICs (MICS) installed therein is set in a cassette having a tape stored therein and the associated data is also stored in the memory ICs. When this cassette is installed in the digital VTR, the associated data written into the memory ICs is read out so as to assist an operation and a handling of the digital VTR. These features are already disclosed in EP Laid-Open Nos. 0572925 and 0595558 of the present applicant (their corresponding U.S. applications are pending).

(7) Structure and type of the pack

As described above, as the areas for recording the associated data in the digital VTR of the preferred embodiment, AAUX area of the audio area on the tape, VAUX area of the video area and AUX data recording area of the sub-code area are used and additionally the recording area of MIC mounted in the tape cassette is used. Then, each of these areas is constructed in a unit of a pack having a fixed length of 5 bytes.

A structure and a type of each of these packs will be described later. The pack has a basic structure of 5 bytes as shown in FIG. 16. The initial byte (PC0) in 5 bytes is defined as an item for indicating the content of data (also called as a pack header). Then, a format of the subsequent 4 bytes (PC1 to 4) is defined in correspondence with the item and an optional data is arranged in response to this format.

The item data is divided into upper 4-bits and lower 4-bits, respectively, wherein the upper 4 bits are defined as a large item and the lower 4 bits are defined as a small item, respectively. The large item in the upper digit 4 bits is applied as information showing application of subsequent data, for example, and the pack is divided by the large item into 10 kinds of groups of a control "0000", a title "0001", a chapter "0010", a part "0011", a program "0100", AAUX "0101", VAUX "0110", a camera "0111", a line "1000" and a soft mode "1111", respectively, as shown in FIG. 17.

As described above, each of the groups of pack indicated by the large item is further differential by a small item into 16 packs (a practical content of the subsequent data, for example, is expressed by this), resulting in that packs of maximum 256 types can be defined by using these items.

The large items "1001" to "1110" in FIG. 17 denote the non-defined portions left for addition. Accordingly, the code of the item data not defined yet is used to define a new item data (a pack header), thereby it is possible to record optionally a new data in the future. Reading the header enables an operator to understand the data stored in the pack, so that a position on the tape for recording the pack can be optionally set.

A practical example of the pack will be described in reference to FIGS. 18 and 19, respectively. The pack indicated at A in FIG. 18 belongs to the group of AAUX in FIG. 17 as apparent from the value of the item, is called an AAUX SOURCE pack and is used for recording the associated data concerning the audio sound. That is, as shown in the figure, there are recorded a flag (LF) for indicating whether or not an audio sample frequency is locked with a video signal, the number of audio samples per one frame (AF SIZE), the number of audio channels (CH), mode information such as stereo/manual etc. of each audio channel (PA and AUDIO MODE), information about a television system (50/60 and STYPE), a presence or absence of emphasis (EF), a time constant of emphasis (TC), a sample frequency (SMP) and a quantization information (QU).

In AAUX SOURCE CONTROL pack shown at B in FIG. 18 are recorded SCMS data (its upper bits express a presence or a non-presence of a copyright and its lower bits express whether or not the tape is an original tape), a copy source data (expressing whether or not it is an analog signal source), a copy generation data, a cipher (a password), a type data (CP), a cipher data (CI), a flag indicating whether or not it is a recording start frame (REC ST), a flag for indicating whether or not it is a recording final frame (REC END), recording mode data such as an original recording/after recording/insert recording and the like (REC MODE), a flag for indicating a direction (DRF), a reproducing speed data and a genre category of recording data.

In AAUX REC DATA pack indicated at C in FIG. 18 are recorded a flag "DS" for indicating whether or not it is a summer time, a flag "TM" for indicating a presence or a non-presence of time difference of 30 minutes, a data "TIME ZONE" for expressing a time difference, and data of day, weekdays, month and year, respectively.

In AAUX REC TIME pack indicated at D in FIG. 18 is recorded a recording time data of a frame of hour(s)minute(s)second(s) in SMPTE time code designation.

In AAUX REC TIME BINARY GROUP pack indicated at E in FIG. 18 is recorded a binary group data of SMPTE time code.

In AAUX CLOSED CAPTION pack indicated at A in FIG. 19 is stored data concerning a language and a type of a main audio and a second audio of EDS (Extended Data Service) using a format of CLOSED CAPTION signal transmitted during a vertical blanking period of a television signal. These data contents are as follows:

MAIN and 2ND AUDIO LANGUAGE:
000=Unknown
001=English
010=Spanish
011=French
100=German
101=Italian
110=Others
111=None
MAIN AUDIO TYPE:
000=Unknown
001=Mono
010=Simulated Stereo
011=True Stereo
100=Stereo Surround
101=Data Service
110=Others
111=None
2ND MAIN AUDIO TYPE:
000=Unknown
001=Mono
010=Desriptive Video Service
011=Non-program Audio
100=Special Effects
101=Data Service
110=Others
111=None The case that CLOSED CAPTION pack is recorded in AAUX main area, the types of a main audio sound and second audio sound are responded to information. In turn, in the case that CLOSED CAPTION pack is ont recorded in AAUX main area and in place of it a packhaving no information is recorded, the types of the main audio sound and the second audio sound are responded to information of AUDIO MODE in AAUX SOURCE pack. A detail of AAUX CLOSED CAPTION will be described later.

Each of the packs shown at B to E in FIG. 19 and A, B in FIG. 20 belongs to a group of VAUX in FIG. 17 as apparent from the value of the item data and further they are used for recording associated data about video image.

Recorded contents of these packs will be described, wherein in VAUX SOURCE pack indicated at B in FIG. 19 are recorded a channel number of a recording signal source, a flag (B/W) for indicating whether or not a recording signal is a monochrome signal, a code (CFL) expressing a color flaming, a flag (EN) for indicating whether or not CFL is effective, a code for indicating whether or not a recording signal source is one of camera/line/cable/tuner/soft tape and the like (SOURCE CODE), a data concerning a system of television signal (50/60 and STYPE) and a data concerning discrimination of UV broadcasting/satellite broadcasting and the like (TUNER CATEGORY).

In VAUX SOURCE CONTROL pack indicated at C in FIG. 19 are recorded:

SCMS data (upper bits expressing a presence or a non-presence of a copyright and the lower bits expressing whether or not the tape is an original tape);

a copy source data (expressing whether or not the data is an analog signal source);

a copy generation data, cipher (a password) type data (CP);

a cipher data (CI);

a flag for indicating whether or not it is a recording start frame (REC ST); and a recording mode data such as an original recording/after recording/insert recording and the like (REC MODE), and further a data concerning an aspect ratio and the like (BCSYS and DISP);

a flag (FF) concerning whether or not only the field signal of an odd number or an even number field in two consecutive repetitive outputs;

a flag (FS) concerning whether or not a signal of a field 1 is outputted during a period of the field 1 and concerning an output of a signal of a field 2;

a flag (FC) concerning whether or not the video image data in a frame is different from the video image data in a previous frame;

a flag (I1) concerning whether or not it is an interface, a flag (ST) concerning whether or not the recording video image is a still image;

a flag (SC) concerning whether or not the recording video image is a still image; and a genre of the recording content.

In VAUX REC DATA pack indicated at D in FIG. 19 is recorded a data concerning a recording date, and in VAUX REC TIME pack indicated at E in FIG. 19 is recorded data concerning a recording time.

In a pack of VAUX REC TIME BINARY GROUP indicated at A in FIG. 20 is recorded a data about a group of binary of a time code.

In VAUX CLOSED CAPTION pack indicated at B in FIG. 20 is recorded CLOSED CAPTION signal transmitted during a vertical blanking period of a television signal. A detail of this pack will be described later.

As a special example of the pack, the pack with item codes being all 1 is defined as a pack of non-information (No Information pack: hereinafter called as "NO INFO pack").

As apparent from the foregoing, the digital VTR of the preferred embodiment is made such that a structure of the associated structure is a structure which is common to each of the areas as described above, so that softwares for recording and reproducing these data can be made in common, resulting in that their processing may be simplified. In addition, since a timing between a recording and a reproducing is kept constant, it is not necessary for a surplus memory such as RAM to be arranged for adjusting time and further also in the case that a new type of machine is to be developed, its software can be easily developed.

Even in the case that an error occurs during a reproducing operation, for example, such a pack configuration enables a subsequent pack to be easily taken out. Due to this fact, there is no opportunity that a large amount of data are not damaged by a transmittance of error.

In the case that a text data is stored in the aforesaid MIC, a structure of a pack is made as a structure having a variable length pack in which all the text data to be recorded are stored exceptionally in one pack, thereby an amount of consumption in the storing area of MIC is saved.

(8) Structure of an associated data recording area

Then, there will be described practical structures of AAUX area where various associated data are recorded with packs, VAUX area, a data area in a sub-code area and a recording area of MIC mounted in a tape cassette.

(1) AAUX area

At AAUX area, one pack is constructed in AAUX area having 5 bytes in a format of lSYNC block indicated at B in FIG. 9. Accordingly, AAUX area is composed of 9 packs per one track. Data in one frame is recorded in 10 tracks in the digital VTR of 525/60 system, so that AAUX area corresponding to one frame is expressed as shown in FIG. 21.

One section in this figure expresses one pack. numbers 50 to 55 described in the section are set such that the item code in the pack of the section is expressed with hexadecimal form (number 50 in this figure expresses the aforesaid AAUX SOURCE pack). These six kinds of packs are called a main pack, and the area where these main packs are recorded is called an AAUX main area. Areas other than this area are defined as AAUX optional areas where any optional pack can be selected from various packs and recorded.

(2) VAUX area

Figure 22:
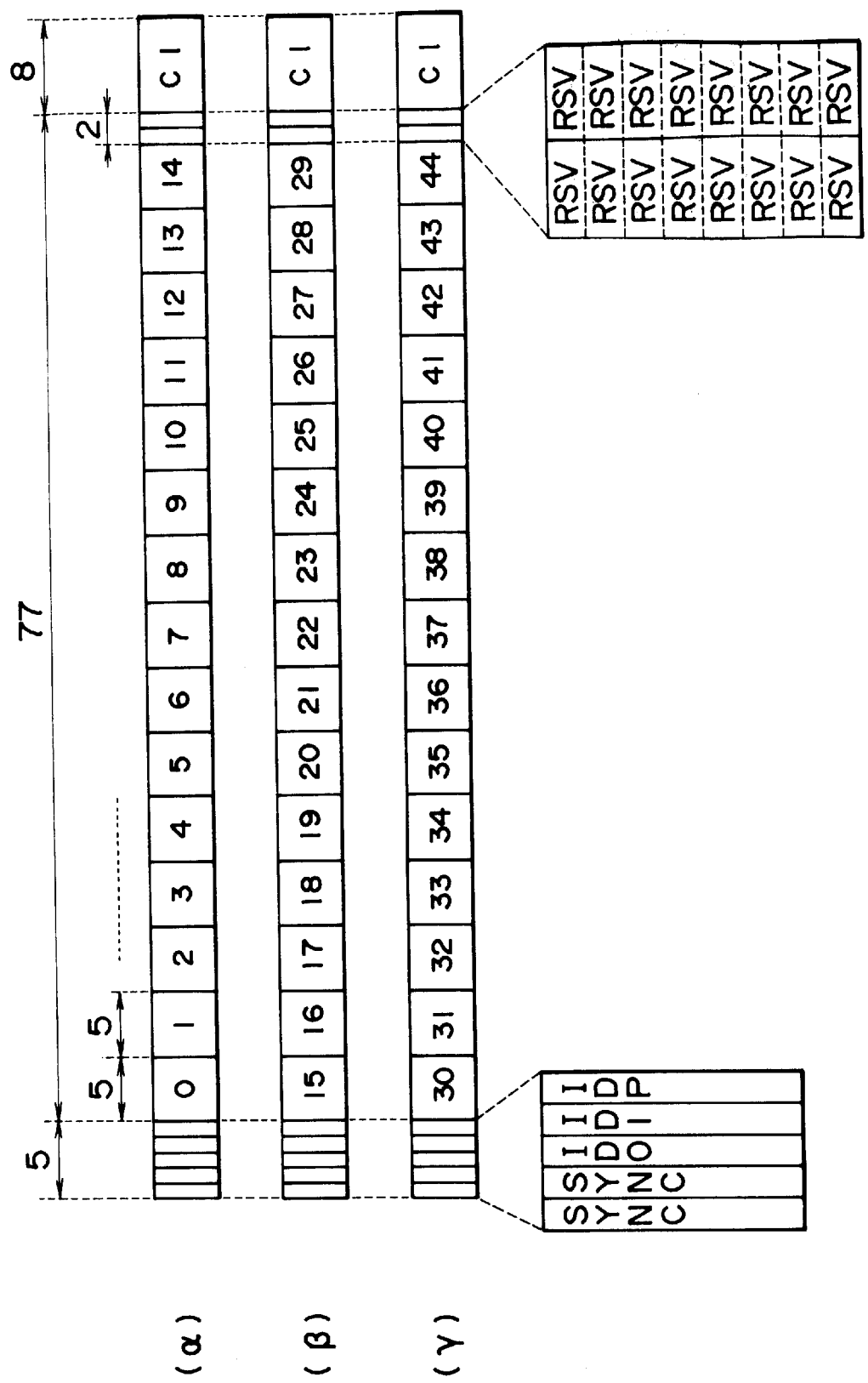
FIG. 22 is a view for illustrating a constitution of VAUX zone corresponding to one track.

As to the VAUX area, VAUX area in one track is comprised of three SYNC blocks α, β, γ as shown in FIG. 11, wherein the number of packs is 15 per 1 SYNC block and 45 in one track as shown in FIG. 22. In addition, the area of 2 bytes just before the error code C1 in 1 SYNC block is used as a preliminary recording area.

Figure 23:
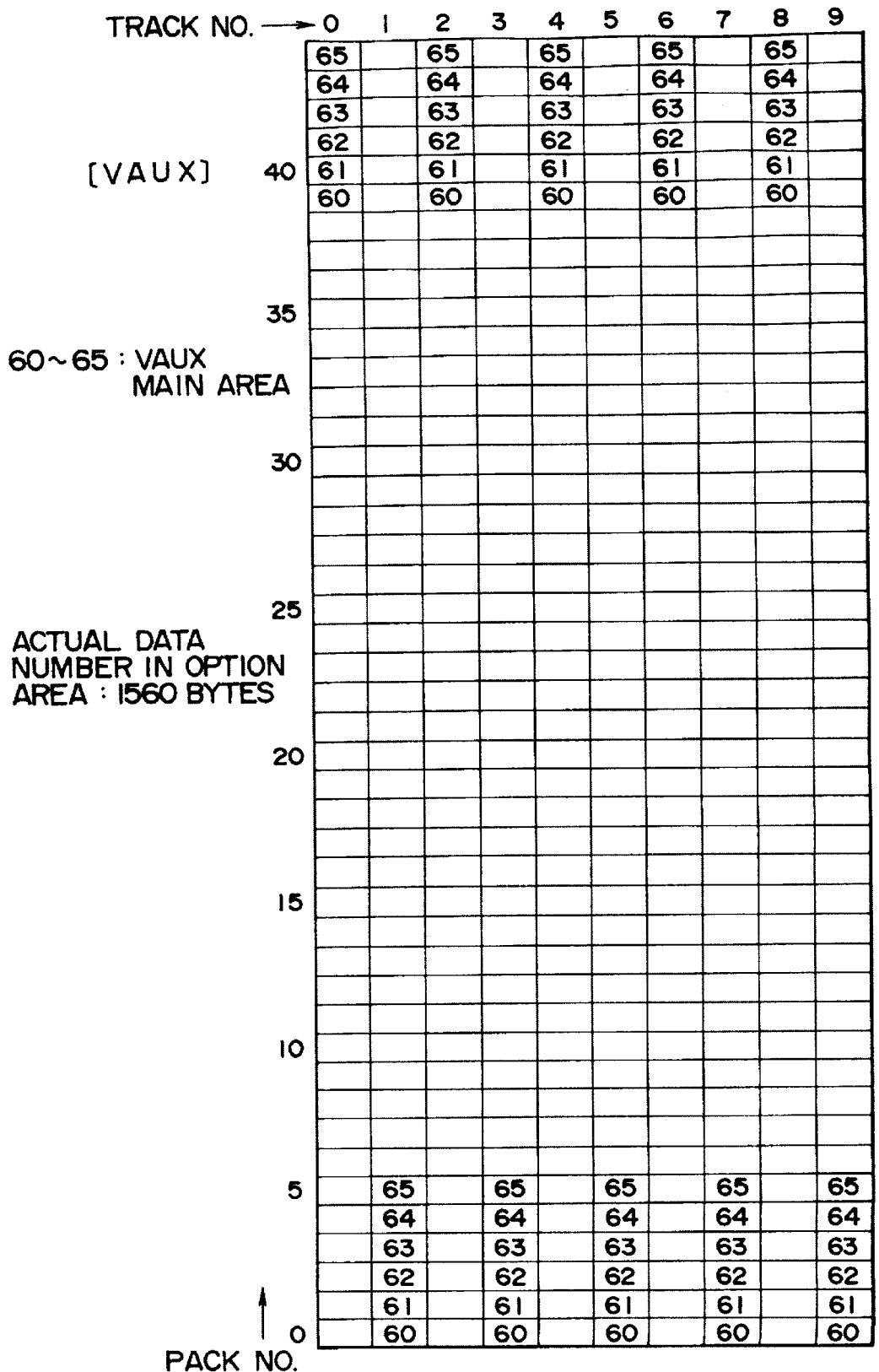
FIG. 23 is a view for illustrating a constitution of VAUX zone corresponding to one frame.

A pack configuration of VAUX area corresponding to one frame is set as shown in FIG. 23. The pack having item codes 60 to 65 in hexadecimal format in this figure is a VAUX main pack constituting VAUX main area, and the packs indicated at B to E in FIG. 19 and A, B in FIG. 20 correspond to them. Other packs constitute a VAUX optional area.

(3) Data area in sub-code area

As shown in FIG. 13, the data area in the sub-code area is written by every 5 bytes into each of SYNC blocks with SYNC block numbers 0 to 11, and packs with SYNC block numbers 3 to 5 and 9 to 11 constitute the main area and other packs constitute an optional area.

In the sub-code area, data corresponding to one frame is repeatedly recorded in a format shown in FIG. 24. In this figure, alphabets of capital letters express pack of main area and data such as a time code and a recording data and the like required for performing a high-speed search are recorded. Alphabets of small letters express a pack of optional area and in this area, an optional pack can be selected and an optional data can be recorded.

In addition, FIG. 24 shows a recording pattern in 525/60 system. In FIG. 25 is shown as a reference a recording pattern of sub-code data corresponding to one frame in 625/50 system. As shown in this figure, one frame in 625/50 system is composed of 12 tracks, a sub-code in one track is constructed by twelve SYNC blocks in the same manner as that of 525/60 system and only the number of tracks is different.

The main area in each of the areas described above is characterized in that a pack having associated information concerning a common basic data about all tapes is recorded. In turn, the optional associated data can be freely written by a software tape maker or a user and the like in the optional area. As the associated information, for example, there are various character information, character broadcasting signal data, a television signal data in optional line within a vertical blanking period or an effective scanning period, a computer graphics data and the like.

(4) Recording area of MIC

In FIG. 26 there is shown a data structure of a recording area of MIC. This recording area is also divided into a main area and an optional area, and all the areas are described in a pack structure except the leading one byte and non-used area (FFh). As described above, only the text data is of a pack structure of variable length and others are recorded in a pack structure having the same 5 byte fixed length as that of each of the areas of VAUX, AAUX and the sub-code.

At the leading address 0 in MIC main area are recorded APM3 bits of ID data defining a data structure of MIC and BCID (Basic Cassette ID) 4 bits. The value of APM IS "000" in the digital VTR of the preferred embodiment. In addition, BCID is a basic cassette ID and is the same content as that of ID board for ID acknowledgement in non MIC cassette (a tape thickness, a tape type and a tape grade). The ID board causes a MIC reading terminal to play the same role as that of a recognition hole of the prior art 8-mm VTR, resulting in that it does not become necessary to punch a hole in a cassette half body as found in the prior art.

Three packs of CASSETTE ID pack, TAPE LENGTH pack, and TITLE END pack are recorded in sequence subsequent to the address 1. At CASSETTE ID pack are recorded a tape thickness information and a memory information about MIC. In TAPE LENGTH pack is recorded a cassette tape length by the number of tracks in reference to a tape maker, and a remained amount of tape can be immediately calculated in reference to the data and an absolute track number indicating a recording final position stored in a subsequent TITLE END pack as well as this data. In addition, this recording final position information provides a convenient use for reproducing a midway with a cam coder, stopping it and returned to the original final recording position or performing a reservation with a timer.

The optional area is comprised of an optional event. The main area was a fixed area having 16 bytes ranging from an address 0 to an address 15. In contract, the optional area is a variable area having an address 16 and its subsequent address. A length of the area is changed in response to its length and in the case that the event is deleted, remaining events are filled in the addresses subsequent to the address 16 and kept there. All data not required after a filling operation are written with FFh and they are applied as non-used areas. The optional area is optional as its literal meaning shows and then mainly TOC (Table of Contents) or a tag information indicating a point on the tape and a text data such as a title concerning a program and the like are recorded.

When MIC is read out, a next pack header appears every 5 bytes or every a variable length byte (a text data) in response to the content of the pack header. However, when FFh in the non-use area is read out as the header, this corresponds to the pack header of NO INFO pack, resulting in that the control micro-computer can detect that there is no information subsequent to this header.

The optional area is comprised of a common option and a maker option. A text data, for example, is inputted to the common option. The maker optional area is provided with "a maker code" pack having a large item of a soft mode "1111" and a small item of "0000" and subsequently it is further provided with a specific content for every maker. As a recording and writing into the optional area, the content of the common option is recorded in advance and subsequently the maker option is recorded.

Accordingly, as this "maker code" pack is discriminated, the content before it is a common content and the content subsequent to it is discriminated as a specific content for every maker. It is also found that one of or both of the content of the common option, or the "maker code" pack and the specific content for every maker is not present.

[2] Recording circuit of a digital VTR

In the digital VTR of the preferred embodiment, a recording is carried out for the tape and MIC in response to the recording format described above. Both configuration and operation of the recording circuit of the digital VTR for performing such a recording as above will be described as follows.

Figure 27:
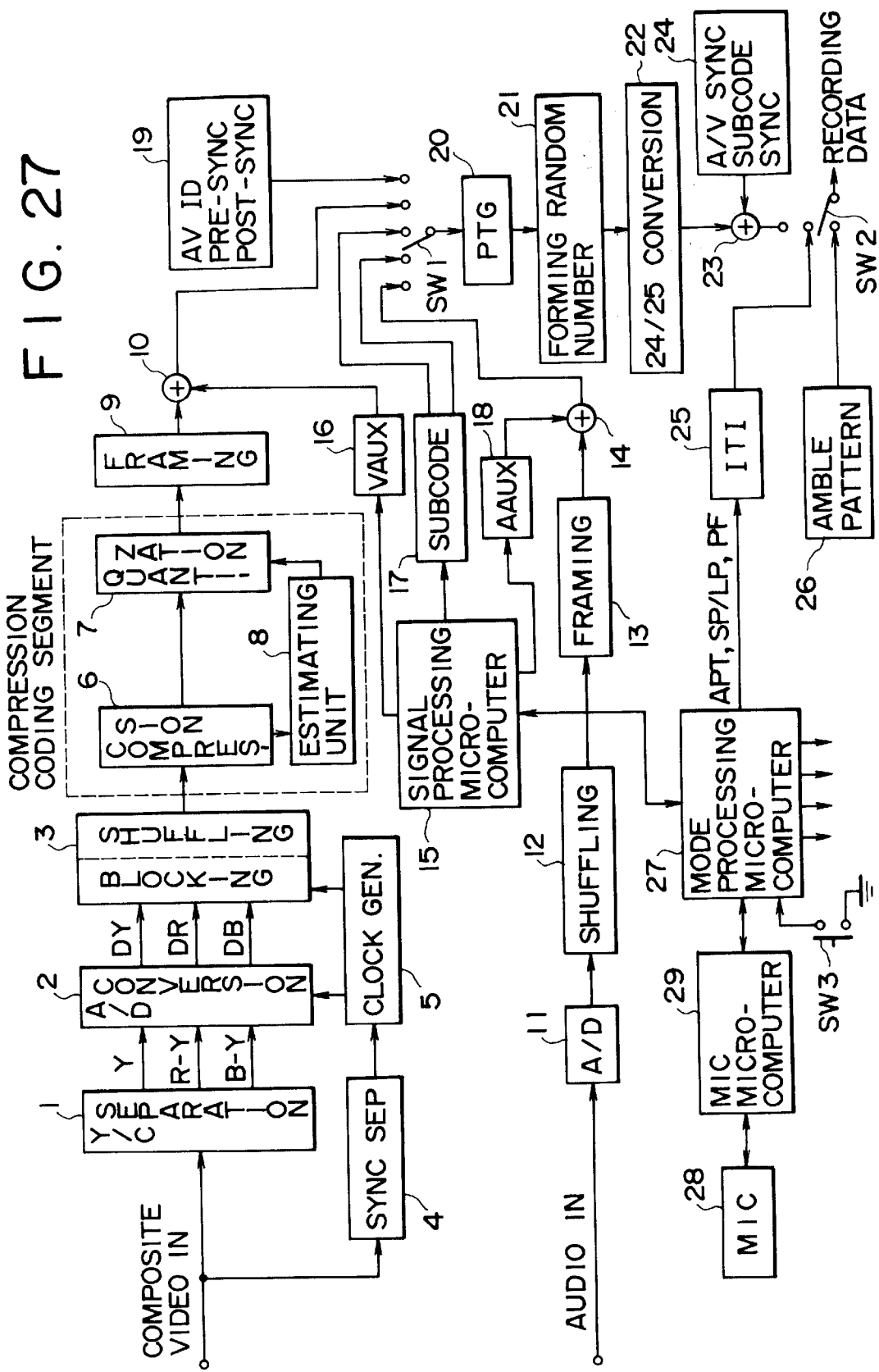
FIG. 27 is a view for illustrating a recording circuit of a digital VTR.

One example of the constitution of the recording circuit is shown in FIG. 27. In this figure, the inputted composite video signal is separated by a Y/C separation circuit 1 into each of component video signals of Y, B-Y and R-Y, respectively, and supplied to an A/D converter 2. In addition, the composite video signal is supplied to a synchronous separation circuit 4 and the synchronous signal separated there is supplied to a clock generator 5. The clock generator 5 generates a clock signal for the A/D converter 2 and the blocking shuffling circuit 3.

The component signal inputted to the A/D converter 2 in 525/60 system is converted such that the Y signal is A/D converted at a sampling frequency of 13.5 MHz, the color difference signal is A/D converted at a sampling of 13.5/4 MHz and in turn the component signal in 625/50 system is converted such that the Y signal is A/D converted at a sampling frequency of 13.5 MHz and the color difference signal is A/D converted at a sampling frequency of 13.5/2 MHz, respectively. Only the data DY, DR, DB with effective scanning period of these A/D conversion outputs are supplied to the blocking shuffling circuit 3.

In this blocking shuffling circuit 3, the effective data DY, DR, DB are processed by blocking with one block of 8 samples in a horizontal direction and 8 lines in a vertical direction, and further an efficiency of compression of the video image data is increased with a total number of 6 blocks, i.e. 4 DY blocks, one DR block and one DB block being applied as a unit, a shuffling for dispersing an error at the time of reproduction is carried out, thereafter the data is supplied from a compression coding part.

The compression coding part is comprised of a compression circuit 6 for carrying out a DCT (a dispersion cosine conversion) in respect to the block data of 8 samples in a horizontal direction and 8 lines in a vertical direction, an estimating device 8 for estimating whether or not a result of conversion can be compressed to a desired amount of data, and a quantization device 7 for finally determining a quantization step in response to a result of judgment and performing a data compression using a variable length coding. An output of the quantization device 7 is changed in the framing circuit 9 into a frame of the format described in reference to FIG. 11.

The mode processing micro-computer 27 in FIG. 27 is a micro-computer providing a man-machine interface with a user and operates in synchronization with a frequency of vertical synchronization signal of a video signal. In addition, the signal processing micro-computer 15 operates more near the machine and operates in synchronization with the number of revolutions of the drum 9,000 r.p.m and 150 Hz.

A pack data in each of the areas of VAUX, AAUX, and sub-code is basically generated by the mode processing micro-computer 27, an absolute track No. included in TITLE END pack and the like is generated by the signal processing micro-computer 15, thereafter the value is fitted to a predetermined location. The time code data stored in the sub-code is also generated by the signal processing micro-computer 15.

These results are given to IC16 for VAUX, IC17 for the sub-code and IC18 for AAUX which are interfaces interlinking between the micro-computer and the hardware. IC16 for VAUX provides a synthesizing with an output of a framing circuit 9 by a synthesizer 10 in a proper timing. IC17 for the sub-code may generate AP3, SID of ID of the sub-code and the pack data SDATA of the sub-code.

In turn, the input audio signal is changed by the A/D converter 11 into a digital audio signal. In addition, during an A/D conversion of the video signal and the audio signal, although not shown in this figure, it is necessary that a front stage of the sampling circuit is provided with an LPF corresponding to the sampling frequency. A/D converted audio data receives a data dispersion processing by the shuffling circuit 12, thereafter the data is changed into a frame of format in the framing circuit 13 described in reference to FIG. 9. At this time, IC18 for AAUX generates a pack data and fixes them at predetermined locations in SYNC block of audio by the synthesizer 14 at a proper timing.

Then, a recording circuit for the pack data will be described in reference to VAUX. In FIG. 28 is illustrated an entire flow. In this case, since AAUX is similar to VAUX, seperate discussion therefore is omitted. At first, the pack data to be stored in VAUX is generated in the mode processing micro-computer 27. This is converted into a serial data by the P/S converter circuit 118 and sent to a signal processing micro-computer 15 in accordance with a communication protocol for the micro-computer. The data here is returned back to the parallel data by the S/P converter circuit 119 and stored in the buffer memory 123. The header part at the extremity for every 5 bytes in the sent pack data is extracted by the pack header sensing circuit 120 and it is checked whether or not the pack is one requiring the absolute track number. If required, a switch 122 is changed over and the data of 23 bits is stored from the absolute track number generating circuit 121 by steps of 8 bits. All the storing areas are fixed locations of PC1, PC2, PC3 of the pack to be stored in each of the pack structures as already described above.

In this case, the circuit 119 is a serial I/O contained in the micro-computer, wherein the circuits 120, 121 and 122 are composed of some micro-computer programs, the circuit 123 is a RAM contained in the micro-computer. In this way, a processing in the pack structure is satisfactory within the processing time of the micro-computer without assembling it in a hardware, so that a cost-effective micro-computer is used.

In this way, data stored in the buffer memory 123 is read out in sequence under an instruction from a writing side timing controller 125 of IC 16 for VAUX. At this time, the switch 124 is changed over with the former half 6 packs being applied for a main area and its subsequent 390 packs being applied for an optional area.

FIFO 126 for the main area has a capacity of 30 bytes, and FIFO 127 for the optional area has a capacity of 1950 bytes (525/60 system) or 2340 bytes (625/50 system).

Figure 29A:
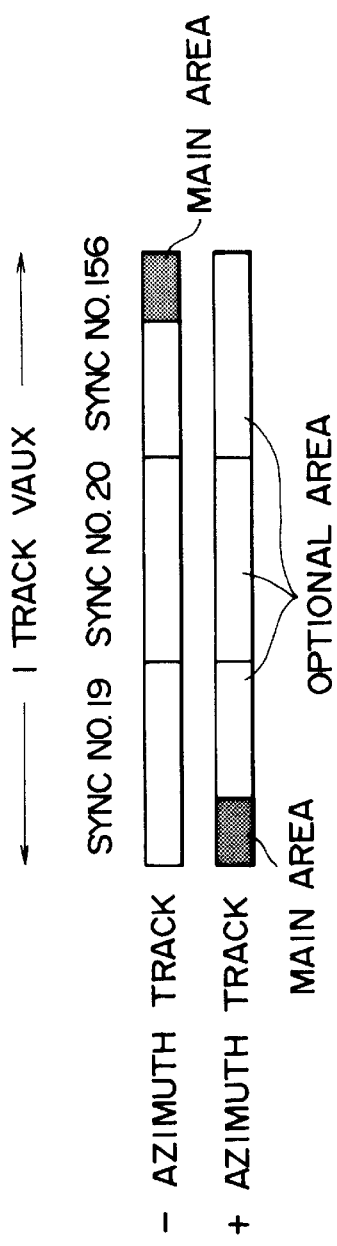
FIG. 29 is a view for illustrating a main area on a recording track.
Figure 29B:
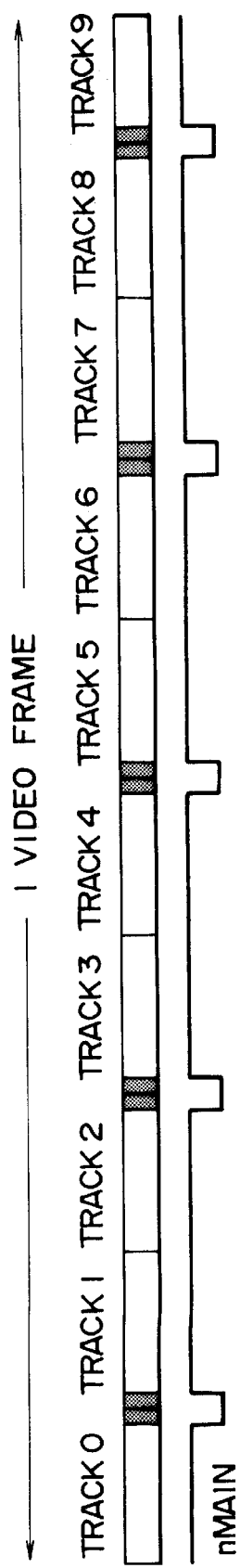

As shown at A in FIG. 29, VAUX is stored at locations of SYNC Nos. 19, 20 and 156 within the track.

In the case that the track numbers in the frame are 1, 3, 5, 7 and 9, the main area is present at the former half part of SYNC number 19 and in turn in the case that the track numbers within the frame are 0, 2, 4, 6 and 8, the main area is present at the latter half part of SYNC No. 156 under—azimuth. These states are totally arranged within one video frame as shown at B in FIG. 29. As described above, the time when a timing signal nMAIN="L" corresponds to the main area. Such a signal as above is generated by the reading side timing controller 129, the switch 128 is changed over and then its output is transferred to the synthesizing device 10.

In this case, when nMAIN="L" occurs, the data of FIFO 126 for the main area is read out repeatedly by 10 times (525/60 system) or by 12 times (625/50 system). When nMAIN="H" occurs, FIFO 127 for the optional area is read out. This is only once read in one video frame.

In FIG. 30 is mainly illustrated a VAUX pack data generating part within the mode processing micro-computer. At first, the circuit is roughly divided into one for the main area and the other for the optional area.

The circuit 131 is a circuit for collecting and generating data for the main area. Such data as shown in this figure is received from a digital bus or a tuner and at the same time data group as indicated at 139 within it are generated. This is assembled in the bit byte structure of the main pack, the pack header is added by the switch 132 and then it is inputted to the P/S converter circuit 118 through the switch 136.

To the data collecting and generating circuit 133 for the optional area are inputted TELE TEXT data or a program title and the like from the tuner, for example, so as to generate the pack data storing these data.

A VTR set individually determines in what optional area the data is recorded. The pack header is set by the circuit 134, added by the switch 135 and inputted to the P/S conversion circuit 118 through the switch 136. Also in this case, the circuit 118 is a serial I/O contained in the micro-computer, and the circuits 131 to 137 are comprised of micro-computer programs.

In FIG. 31 is mainly illustrated a generating part for AAUX pack data of the mode processing micro-computer. Its operation is similar to that of the generating part for VAUX pack data. Thus, major differences will be described.

As the program titles coming from the tuner, there may come some titles of music programs coming from an audio PCM broadcasting in addition to the title of the TV program such as BTAT-003. In addition, the sampling frequency and the number of quantization bits and the like of the so-called digital audio sounds of A-mode and B-mode are determined in advance from the tuner.

In addition, in order to make AAUX CLOSED CAPTION pack, it is necessary that CLOSED CAPTION signal within a vertical blanking period of the video signal is received from the tuner and the data concerning the audio sound is extracted from the decoder 150. Then, AAUX CLOSED CAPTION pack is generated and at the same time data which is requisite and essential for reproducing an audio signal is inputted into AAUX SOURCE pack and AAUX SOURCE CONTROL pack.

At the generating device 19 in FIG. 27 are generated each of IDs of AV (Audio/Video), a pre-SYNC and a post-SYNC.

In this case, AP1 and AP2 are also generated and inputted to the predetermined IDs. An output from the generator 19, ADATA (an audio data), VDATA (a video data), SID and SDATA are changed over by the first switching circuit SW1 at a proper timing.

Then, an output of the first switching circuit SW1 is added with a predetermined parity at the parity generating circuit 20, and supplied to random number forming circuits 21 and 24/25 converter circuit 22. In this case, the random number forming circuit 21 changes the input data into random numbers in order to eliminate a DC component of data.

In addition, the 24/25 converter circuit 22 performs a processing in which 1 bit is added for every 24 bits of data to apply a pilot signal component and a pre-coding processing suitable for a digital recording (a partial response class IV).

These data attained in this way is supplied to the synthesizing device 23, where SYNC patterns of audio, video and sub-code generated by the generating device 24 for A/V SYNC and sub-code SYNC are synthesized.

The output from the synthesizer 23 is supplied to the second switching circuit SW2. ITI data outputted by the ITI generating device 25 and amble pattern outputted by the amble pattern generator 26 are also supplied to the second switching circuit SW2.

To the ITI generating device 25 is supplied each of data of APT, SP/LP and PF from the mode processing microcomputer 27. The ITI generating device 25 fits these data at predetermined locations of TIA and supplies them to the second switching circuit SW2.

The mode processing micro-computer 27 performs a mode monitoring of an entire digital VTR. A third switching circuit SW3 connected to this micro-computer is a group of switches for instructing a recording and a reproducing operation with external switches of a main body of the VTR. In these switches is also included a recording mode setting switch of SP/LP. A result of setting with the switch group is detected by the mode processing micro-computer and further given to the signal processing micro-computer 15, the MIC micro-computer 29 and the mechanism control microcomputer (not shown) through an inter-micro computer communication.

Figure 32:
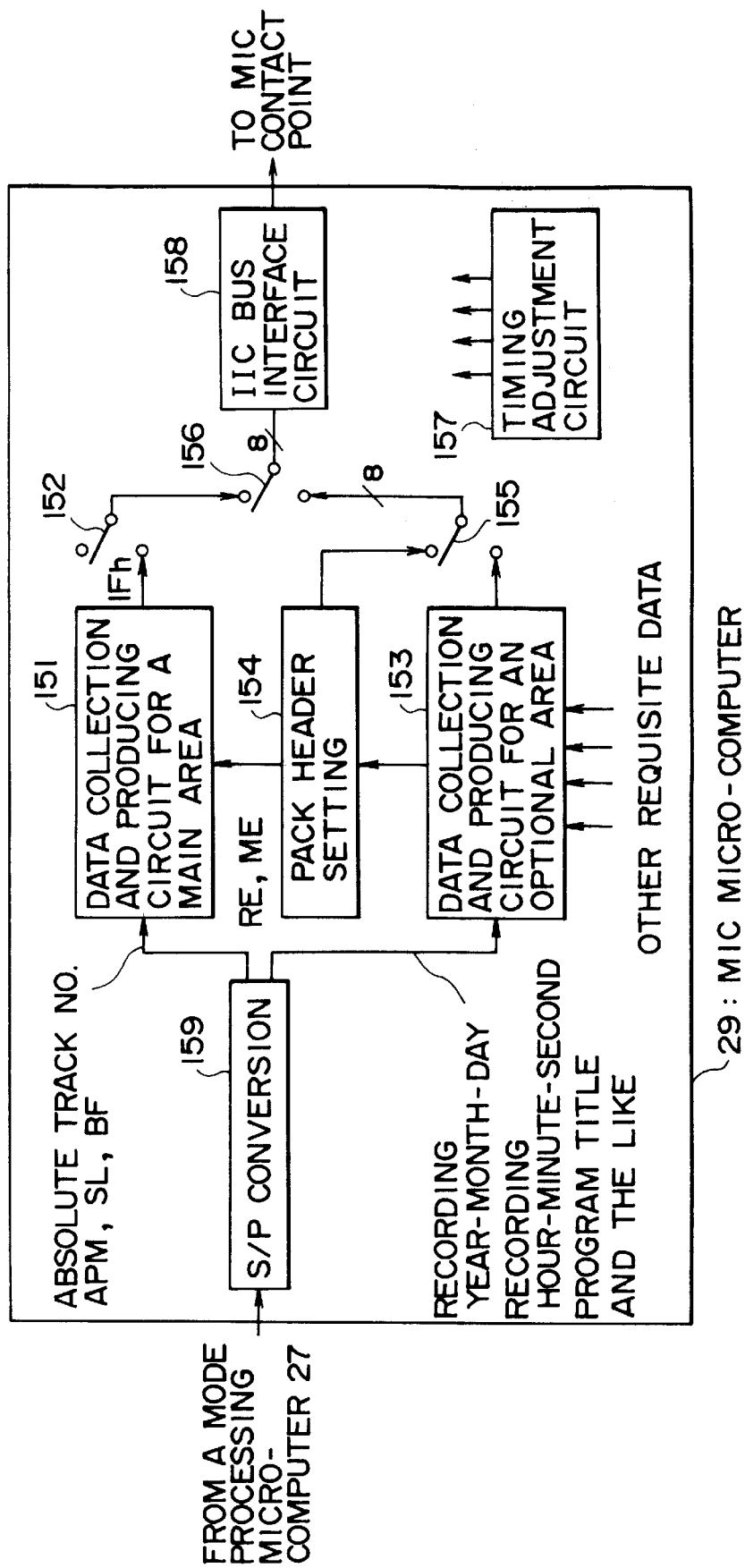
FIG. 32 is a view for illustrating a production of MIC data.

In FIG. 32 is shown a data generating part of the MIC micro-computer 29. A serial data came from the mode processing micro-computer 27 is converted into a parallel data by the S/P converter circuit 159 and processed in the micro-computer.

The items in the main area shown in FIG. 26 to be revised at the VTR are APM at an address 0, ME flag in CASSETTE ID pack, and TITLE END pack. In these items, RE (Recording Proofed Events Exists) flag and ME (MIC Error) flag are generated within the MIC micro-computer, although data of others is received from the mode processing microcomputer.

In these items, the absolute track number, SL, BF flags are generated by the signal processing micro-computer as shown in FIG. 28 and are received through the mode processing micro-computer 27.

The data obtained in this way are assembled in response to an operation of MIC 28 and written into MIC 28. The switch 152 supplies the pack header 1Fh when TITLE END pack is written, and the switch in a state other than this is changed over to the lower side.

Various information are recorded in the optional area of MIC. For example, if the data is a timer recording reservation event, a recording year-month-day, a recording hour-minute-second and a program title and the like are sent from the mode processing micro-computer 27.

These information are assembled and written by the MIC micro-computer as required. Finally, data are set by the circuit 158 on the IIC format which is the MIC communication protocol and written into a MIC 28. In this figure, the components other than the circuits 158, 159 are microcomputer programs, although actually data in the circuits 151, 153 are stored in the RAM of the micro-computer.

In the case of MIC, such a product as an easy type MIC writing unit can be devised. As this unit, various kinds of types acting as a viewer may be applied, although the circuit is constituted such that the S/P conversion circuit 159 is eliminated from FIG. 32.

As the viewer, there may be considered to have a function for seeing TOC (Table of Contents) in the MIC, although as apparent from FIG. 32, there is also another data during a writing operation which can not be attained in its single form. For example, it is useless to say that a recording start position is tried to be inputted under a timer recording reservation and this can be available only after the viewer is set to a VTR.

Returning again to FIG. 27, the switching circuit SW2 is changed over at a predetermined timing, thereby an amble pattern and the ITI data are added to the output of the synthesizer 23. The output of the second switching circuit SW2 is amplified by a recording amplifier (not shown) and recorded in a magnetic tape (not shown) by a magnetic head (not shown).

The aforesaid continuous recording operation is carried out under a cooperation relation with a mechanism controlling micro-computer or the signal processing microcomputer 15 and ICs concerning each of the parts mainly around the mode processing micro-computer 27.

[3] Reproducing circuit of a digital VTR

Then, referring to FIGS. 33 to 36, a reproducing circuit in the digital VTR of the preferred embodiment will be described.

Figure 33:
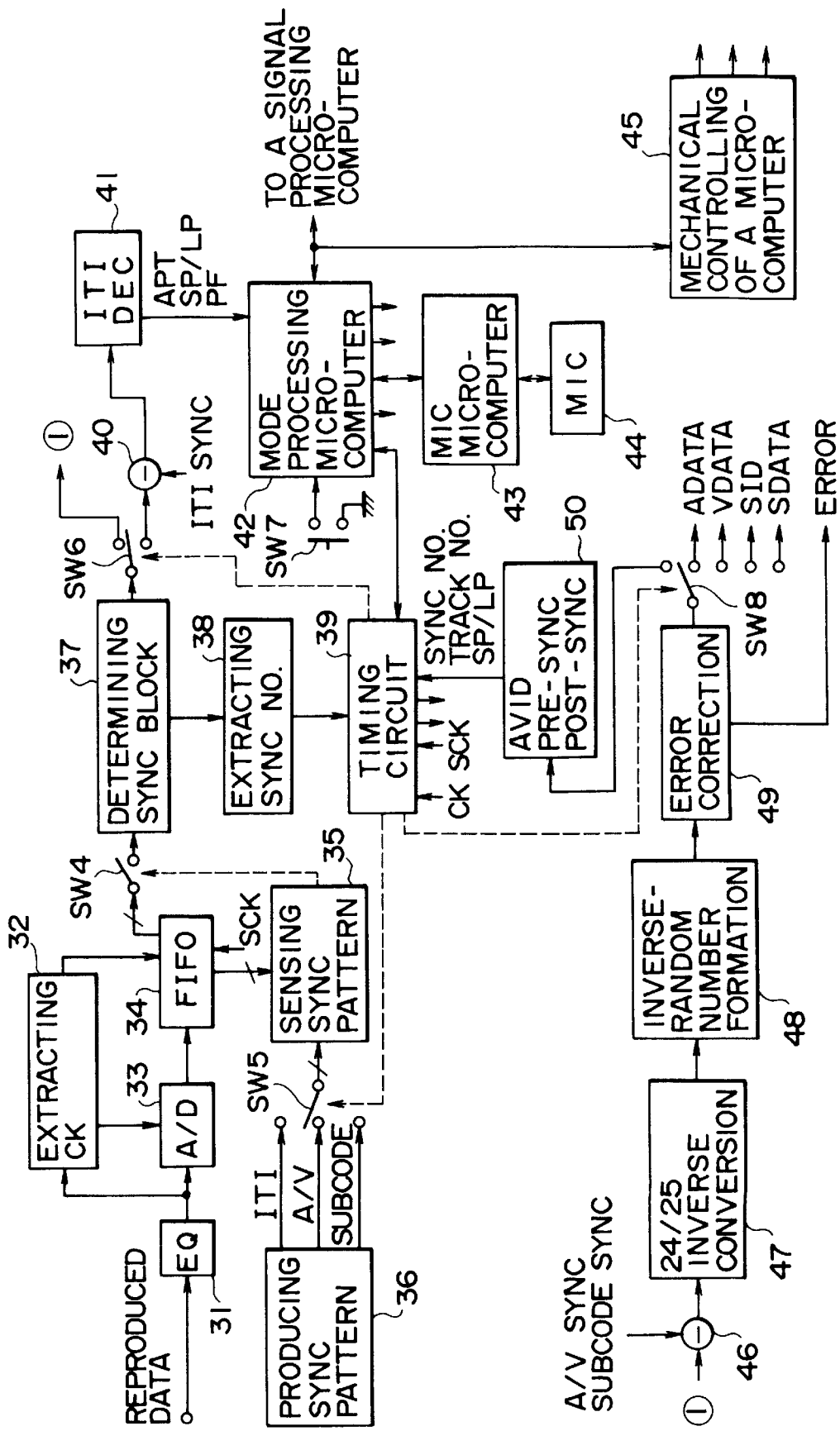
FIG. 33 is a view for illustrating a constitution of a part of a reproduction circuit of a digital VTR.

In FIG. 33, a fine signal reproduced from a magnetic tape (not shown) by a magnetic head (not shown) is amplified by a head amplifier (not shown) and added to an equalizer circuit 31. The equalizer circuit 31 performs an inverse processing of an emphasis processing (for example, a partial response class IV) carried out for improving an electromagnetic conversion characteristic between a magnetic tape and a magnetic head during a recording operation.

A clock CK is extracted from the output of the equalizer circuit 31 by a clock extracting circuit 32. This clock CK is supplied to the A/D converter 33 and then the output of the equalizer circuit 31 is changed into a digital value. 1 bit data attained in this way is written into FIFO 34 with the clock CK.

This clock CK is a time unstable signal including a jitter component of a rotary head drum. However, the data before its A/D conversion also contains a jitter component, so that its sampling itself does not show any problem.

However, in the case that the video data and the like are extracted from this component, they may not be taken out unless the data is stable in view of its time and so a time axis adjustment is carried out by applying FIFO 34. That is, although the writing is carried out with an unstable clock, the reading is performed with a stable clock SCK obtained from a self-exciting oscillator 51 using a crystal oscillator shown in FIG. 34. As a depth of the FIFO 34, it has a surplus capacity in which it is not read out faster than an inputting speed of the input data.

The output of each of the stages in FIFO 34 is added to a SYNC pattern sensing circuit 35. SYNC patterns in each of the areas are changed over by a timing circuit 39 through the fifth switching circuit SW5 and given.

The SYNC pattern sensing circuit 35 is of a fly-wheel configuration, wherein SYNC pattern is once detected, it is checked if the same SYNC pattern comes after a predetermined SYNC block length. If this is right by more than three times, for example, it is assumed to be true so as to prevent an erroneous sensing. A depth of FIFO 34 requires a value corresponding to this value.

Upon sensing SYNC pattern in this way, since an amount of shift is determined in which one SYNC block can be taken out by extracting a certain portion from the output of each of the stages in FIFO 34, the fourth switching circuit SW4 is closed in response to the value above, and a required bit is taken into a SYNC block ascertaining latch 37.

With such an arrangement as above, the inputted SYNC number is taken out at SYNC number extracting circuit 38 and supplied to the timing circuit 39. It can become apparent that on what location in the track is being scanned by the head in reference to the read SYNC number, so that the fifth switching circuit SW5 and the sixth switching circuit SW6 are changed over.

The sixth switching circuit SW6 is changed over to a lower side when the head is scanning the ITI area, ITISYNC pattern is removed through a subtractor 40 and added to an ITI decoder 41.

Since the ITI area is recorded under its coded form, this area is decoded to enable each of data of APT, SP/LP, PF to be taken out. These data are given to a mode processing micro-computer 42 to which a seventh switching circuit SW7 for use in setting a SP/LP mode is connected. The mode processing micro-computer 42 determines an entire operation mode of the digital VTR and performs an entire system control of the set in cooperation with the mechanism control micro-computer 45 or the signal processing micro-computer 60.

To the mode processing micro-computer 42 is connected the MIC micro-computer 43 for monitoring APM and the like. Information obtained from the MIC 44 within the cassette (not shown) provided with MIC is given to the MIC micro-computer 43 through a MIC contact point switch (not shown) and then the MIC is processed under a cooperation of the mode processing micro-computer 42. There is also an occasion that a certain set causes the MIC micro-computer to be eliminated and the MIC processing is carried out by the mode processing micro-computer 42.

When the head is scanning the audio area, video area or sub-code area, the sixth switching circuit SW6 is changed over to an upper side. After extracting SYNC pattern in each of the areas through the subtractor 46, it is passed through the 24/25 inverse conversion circuit 47, it is added to the inverse random number formation circuit 48 and then returned back to an original row of data. The data taken out in this way is added to the error correction circuit 49.

At the error correction circuit 49, an error data is detected and corrected with a parity added at its recording side and the data having error not removed from it at most is outputted together with an error flag. Each data is changed over by the eighth switching circuit SW8 and outputted. AV ID, pre-SYNC and post-SYNC extracting circuit 50 extracts a SYNC number, a track number stored in an A/V area, a pre-SYNC and a post-SYNC and each of SP/LP stored in the pre-SYNC, respectively. These signals are given to the timing circuit 39 and used for generating various timings. In addition, at the aforesaid extracting circuit 50, AP1 and AP2 are also extracted, they are supplied to the mode processing micro-computer 42 so as to perform a checking operation of them. In the case that AP1 and AP2=000 are set, the circuit normally operates and if other values than the aforesaid one are present, it performs an alarm processing and the like.

As to the SP/LP, the mode processing micro-computer 42 performs a comparison study of it with one obtained from ITI. SP/LP information is written by three times in a TIA area in the ITI area, wherein a reliability of it is improved by a decision of majority only there. As the pre-SYNC, the audio signal has 2 SYNC and the video signal has 2 SYNC, and a total number of 4 SP/LP information are written. Also in this area, a decision of majority is set so as to improve a reliability. Then, finally in the case that both of them are not coincided to each other, one in the ITI area is preferentially employed.

Figure 34:
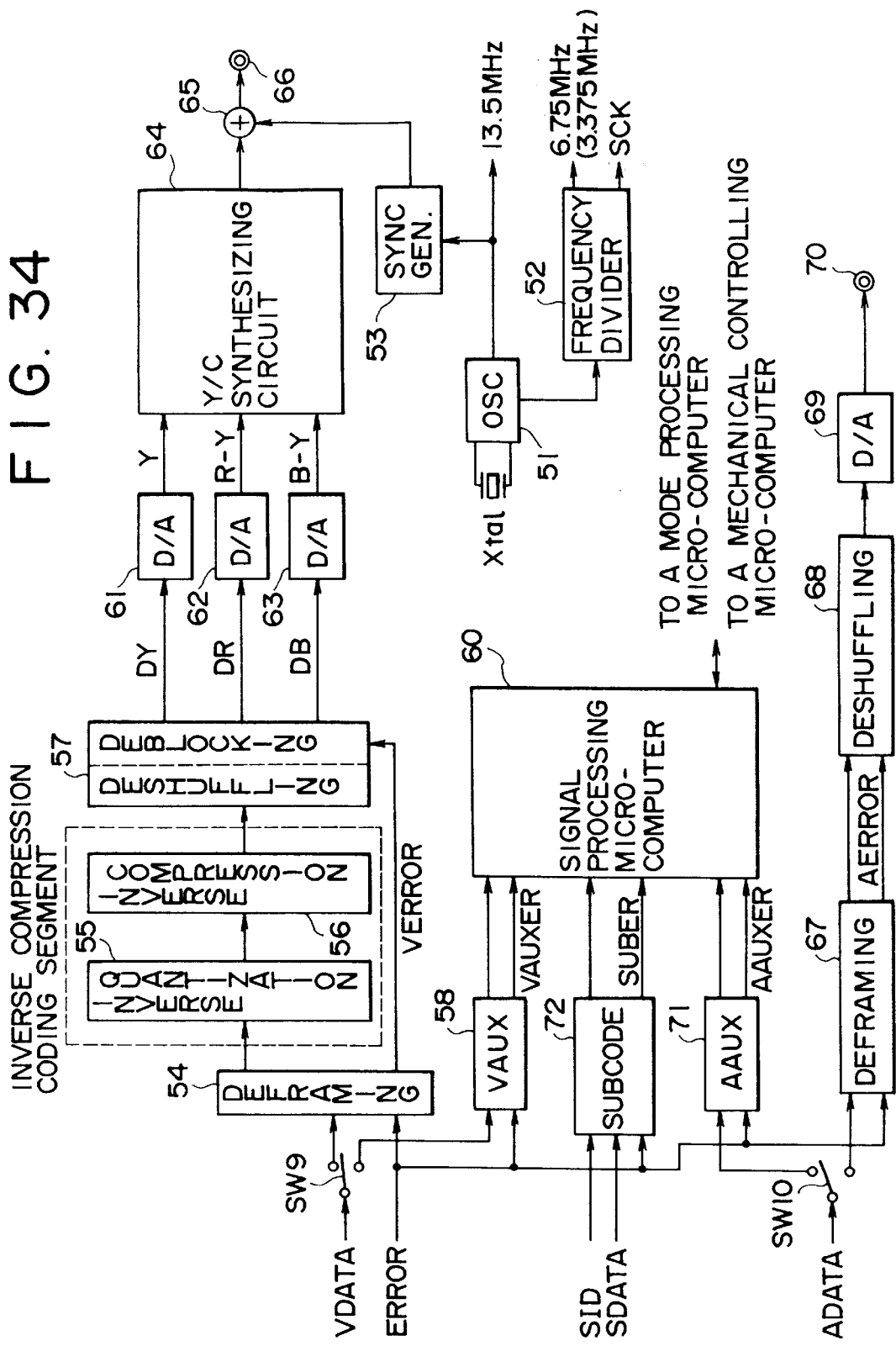
FIG. 34 is a view for illustrating a constitution of another part of a reproduction circuit of a digital VTR.

VDATA outputted from the eighth switching circuit SW8 is divided into a video data and VAUX data by a ninth switching circuit SW9 shown in FIG. 34. Then, the video data is given to the deframing circuit 54 together with the error flag.

The deframing circuit 54 operates to perform an inverse conversion of the framing at the recording side, wherein it holds a feature of data inputted there. In the case that a certain data still has an error which is not yet removed, the circuit understands how this influences other data, so that the circuit performs a transmittance error processing operation there. Under such a condition as above, the error flag becomes a VERROR flag containing a new error flag. This deframing circuit 54 may also perform a processing in which even if the data contains error, the data which is not important in reproducing the video image is processed with a certain modification so as to eliminate the error flag.

The video data is returned back to the data before its compression through the inverse quantization circuit 55 and the inverse compression circuit 56. The data is returned back to its original video space by the deshuffling and deblocking circuit 57. The video image can be modified on the basis of the VERROR flag only after data is returned back to the actual video space. In other words, the processing is carried out such that the video data before one frame is always stored in the memory in advance and the video block showing a certain error is replaced with a previous video block.

Subsequent to the deshuffling operation, the data is divided into three systems of DY, DR and DB, respectively. The data is then returned back to each of analog components of Y, R-Y and B-Y by the D/A converters 61 to 63. As the clock at this time, both an output from the oscillation circuit 51 and another output divided in its frequency by the frequency divider 52 are used. That is, Y is 13.5 MHz, R-Y and B-Y have 6.75 MHz or 3.375 MHz, respectively.

Three signal components obtained in this way are synthesized at the Y/C synthesizing circuit 64, and further synthesized with a composite synchronous signal obtained from the synchronous signal generating circuit 53 and outputted from the terminal 66 as the composite video signal.

ADATA outputted from the eighth switching circuit SW8 is divided into an audio data and AAUX data by the tenth switching circuit SW10 shown in FIG. 34. Then, the audio data is given to the deframing circuit 67 together with the error flag.

The deframing circuit 67 is a circuit where an inverse conversion of a framing at the recording side is carried out, and it understands the feature of the data inputted there. In the case that a certain data has still an error not yet removed, the circuit understands how this error influences other data, so that the circuit performs a transmittance error processing. For example, in the case of sampling of 16 bits, one data has a unit of 8 bits and thus one error flag becomes AERROR flag including a new transmittance error.

The audio data is returned back onto an original time axis by a subsequent deshuffling circuit 68. At this time, the correcting operation for the audio data is carried out on the basis of the previous AERROR flag. That is, a processing such as holding of a previous value replacing with a sound just before error is carried out. In the case that the error period is too long and the repairing is not effective, a countermeasure such as muting is performed to eliminate sound itself.

After performing such a countermeasure as above, the data is returned back to an analog value by the D/A converter 69 and outputted from an analog audio output terminal 70 while getting a proper timing for a sychronization with the video data.

Each of VAUX and AAUX divided by the ninth switching circuit SW9 and the tenth switching circuit SW10 is processed with a pre-processing such as a decision of majority and the like at IC58 for VAUX and IC72 for AAUX while referring also to the error flag, respectively.

ID data SID and the pack data SDATA in the sub-code area outputted from the eighth switching circuit SW8 are given to the IC72 for the sub-code, also where a pre-processing occurs such as a decision of majority. The data applied with these pre-processings are given to the signal processing micro-computer 60, and finally their final reading operation is carried out. Each error which can not be removed in the pre-processing is given to the signal processing micro-computer 100 as VAUXER, SUBER and AAUXER, respectively.

The IC72 for the sub-code extracts AP3 and APT, they are delivered to the mode processing micro-computer 42 through the signal processing micro-computer 60 and checked. The mode processing micro-computer 42 ascertains the value of APT in response to APT got from ITI and APT obtained from the sub-code and at the same time if this value is not "000", the micro-computer performs an alarm processing and the like. In addition, in the case of AP3=000, the micro-computer performs normally and in the case of other values, it performs an alarm processing and the like.

The error processing for the pack data will be supplemented here, wherein each of the areas has a main area and an optional area. In the case of 525/60 system, the same data is written in the main area by ten times. Accordingly, even if some of the data have a certain error, the data can be supplemented and realized, resulting in that the error flag at this time does not become an error any more. Provided that the data is once written in the optional area other than the sub-code, so that the errors are left as they are as VAUXER and AAUXER.

The signal processing micro-computer 60 performs a transmitted error processing or a data repairing processing by estimating a cooperative relation of the pack of each of data. The result judged in this way is given to the mode processing micro-computer 42 so as to be applied as a material for determining an operation of the entire set.

IC58 for VAUX and the reproducing circuit for the pack data in the signal processing micro-computer 60 will be described in reference to VAUX. AAUX is quite similar to that of the former except the data amount in the optional area and so a separate discussion thereof is omitted. In this case, there will be described an example of the configuration in which the decision of majority is not applied as its pre-processing but the simple processing system is applied where the data is not written into the memory if the error occurs.

Figure 35:
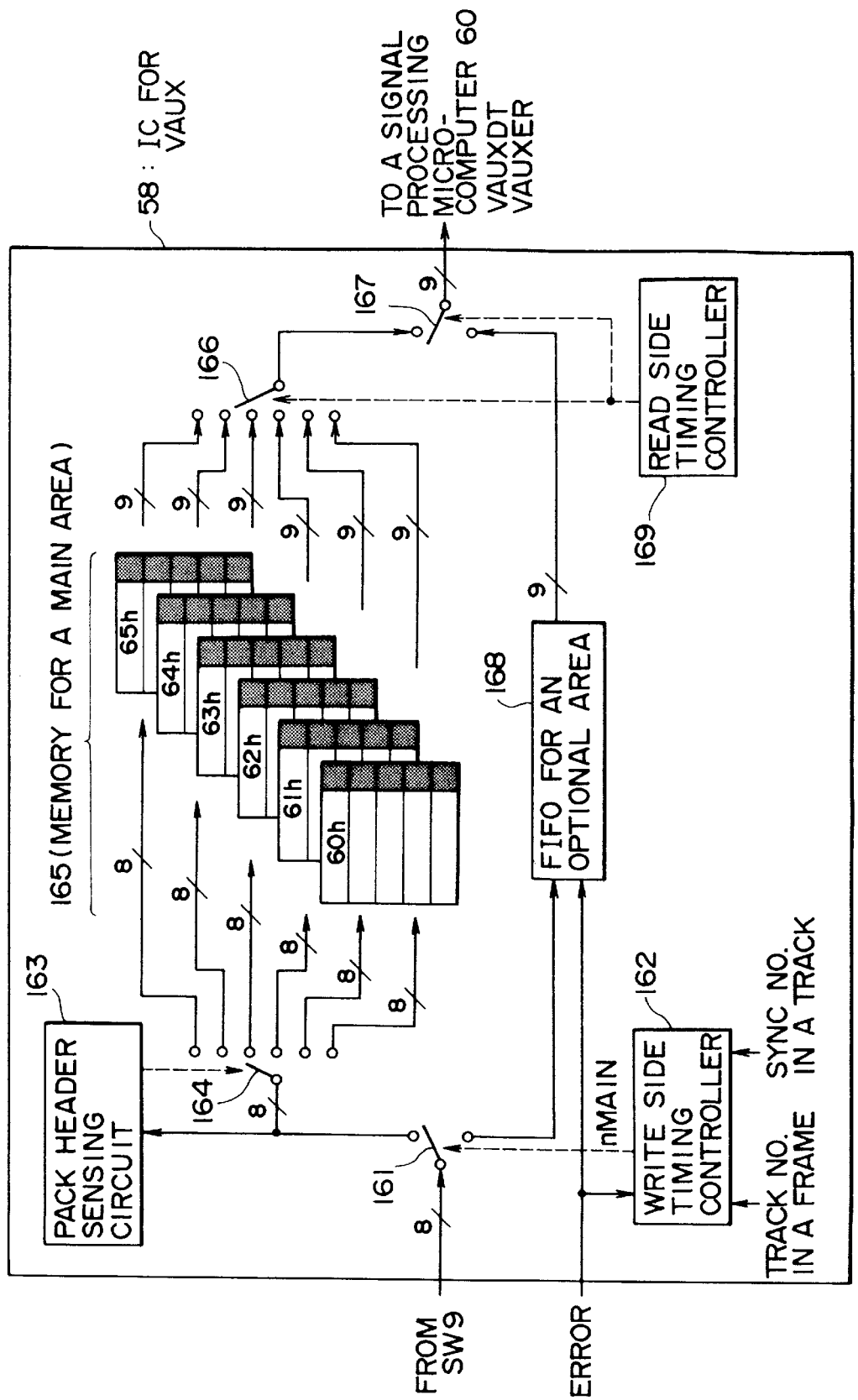
FIG. 35 is a view for illustrating a processing of a reproduction pack data in IC for VAUX.

In FIG. 35 is illustrated an example of the circuit of IC58 for VAUX. At first, VAUX pack data came from the switching circuit SW9 is divided into a memory 165 for the main area and the FIFO 168 for the optional area by changing-over the switch 161 by the writing side timing controller 162 at a timing of nMAIN="L" shown in FIG. 29.

As to the pack data in the main area, its header is read by the pack header sensing circuit 163 and the switch 164 is changed over. Then, only when the error is not found, the data is written into the memory 165 for the main area. The memory 165 is comprised of 9 bits and the shaded portions correspond to error flag storing bits.

As an initialization of the memory 165 for the main memory, all the contents in 1 video frame are set to all 1 (=no information). If it has an error, no operation is carried out, and if it has no error, the data is written and at the same time 0 is written at the error flag. Since the same pack is written in the main area by 10 times or 12 times per one frame, a location where 1 is placed at the final time of 1 video frame is acknowledged finally as an error.

Since the optional area is basically once written, the error flag is written into the FIFO 168 for the optional area together with the data as it is. These data are transmitted to the signal processing micro-computer 60 through the switches 166 and 167 changed over by a reading side timing controller 169.

Figure 36:
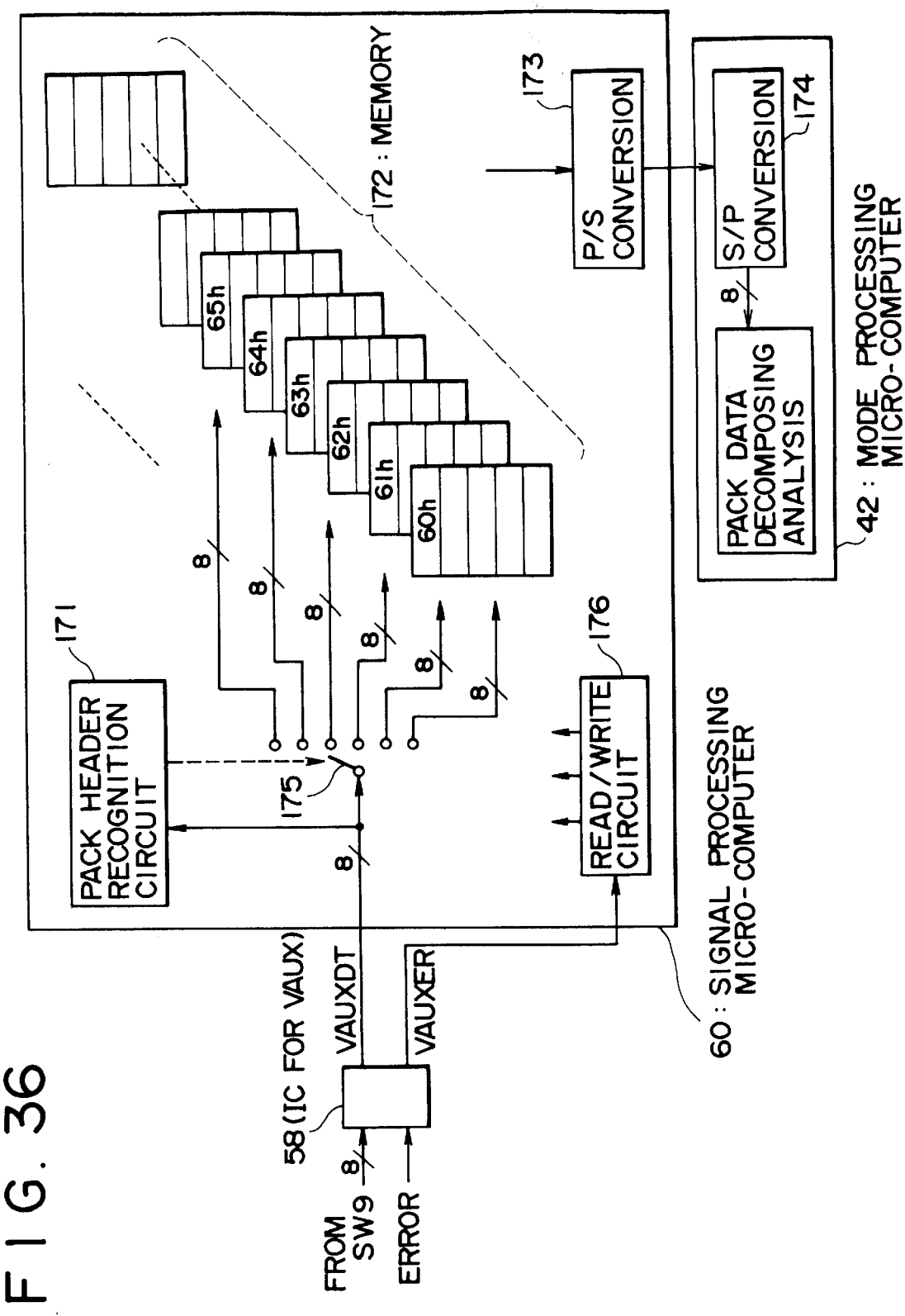
FIG. 36 is a view for illustrating a processing of a reproduction pack data in a view for illustrating a processing of a reproduction pack data in a signal processing micro-computer.

Referring to FIG. 36, a processing operation in the signal processing micro-computer 60 will be described. At the signal processing micro-computer 60, an analysis is carried out in reference to the pack data and error flag transmitted there. In this figure, the pack data (VAUXDT) transmitted from the IC58 for VAUX is divided by the pack header discriminating circuit 171, and stored in the memory 172. In this case, no special discrimination is carried out for the main area and the optional area.

In the case of pack in the main area, no writing is performed when the error flag "1" is placed at VAUXER in the same manner as that the IC58 for VAUX. With such an arrangement as above, the correction can be carried out at a value before at least one video frame. Since it can be considered that the content in the main area has a quite strong relation with the value before 1 video frame, no special problem occurs even if this processing is alternatively applied.

In turn, in the case of the optional area, since it can be assumed that it has no specific relation with the value before 1 video frame, an error transmittance operation is carried out with a unit of pack. If there is an error in a pack data of fixed length of 5 bytes, this method is basically carried out by changing it into NO INFO pack with all data being FFh, although it becomes necessary to set an individual accommodation for the pack. For example, in the case of TELE-TEXT data pack having TELETEXT data stored therein, it is possible to perform it easily to replace with TELETEXT pack header even if the pack header has an error due to a relation in which some packs continue to be present. In addition, if the pack header has no error even if the data part has a certain error, the pack is not changed into NO INFO pack. This means that a recovery of TELETEXT data is also applied for a parity check of a TELETEXT decoder and even if it is apparent that there is an error, the data is kept as it is.

That is, in the digital VTR of the preferred embodiment, seperate discussion is omitted for the reproducing circuit in FIG. 34, although the pack data featuring a large amount of data and a series of data sequences such as text data, TELETEXT data and the like is delivered from the signal processing micro-computer 60 to an exclusive data processing so as to perform a high efficient error correction and at the same time the load on the mode processing micro-computer 42 is reduced.

The data adjusted by the operation in the signal processing micro-computer 60 contains no error flag. They are changed into serial data through the P/S conversion circuit 178, and sent to the mode processing micro-computer 42 in accordance with the communication protocol between the micro-computers. They are returned back to the parallel data through the S/P conversion circuit 174 and then a pack data decomposition analysis is carried out. This decomposition analysis processing is basically an inverse processing against that shown in FIGS. 30 and 31, so that seperate discussion thereof is omitted.

The circuits 171, 176 and the switch 175 are composed of programs of a micro-computer, wherein the memory 172 is a memory within the micro-computer, and the circuits 173 and 174 are serial I/Os within the micro-computer.

In the decomposition analysis of the pack data in the mode processing micro-computer 42, the pack data is analyzed in accordance with the decided pack header, and each of various kinds of control information and displaying information obtained as a result of analysis is supplied to the control circuit and the displaying circuit and the like.

In addition, the reproducing processing at the MIC micro-computer 43 is basically an inverse processing against that shown in FIG. 32, so seperate discussion thereof is omitted.

A summary of the digital VTR of the preferred embodiment has already been described mainly in reference to the case of 525/60 system. However, the digital VTR of the preferred embodiment is not limited to this system, but it can be immediately applied to 625/50 system of another SD (Standard Density), 1125/60 system and 1250/50 system of HD (High Density), respectively.

Also the data formats within 1 track in any system are common to each other and their differences consist in a difference in the number of tracks constituting 1 frame. That is, in the 625/50 system, 1 frame is comprised of 12 tracks and in turn in 1125/60 system, 1 frame is comprised of 20 tracks and in 1250/50 system,1 frame is comprised of 24 tracks, respectively.

2. Application ID System

With the foregoing, a summary of the digital VTR in the preferred embodiment has been described. However, this digital VTR is basically designed such that it is is not limited to a commercial digital VTR of a video compression recording system and it can be easily incorporated into various kinds of digital signal recording and reproducing devices other than the above device. ID data APT, AP1 to AP3 and APM which appeared in the description of the aforesaid digital VTR assisting in enabling incorporation of the VTR into various digital signal recording devices, and these ID data are totally defined as an application ID.

The aforesaid application ID is not an ID for deciding an example of application of the digital VTR, but merely an ID for deciding a data structure of area in the recording medium. APT and APM have the following meanings as described above.

APT: To define the data structure on a track

APM: To define the data structure of MIC

That is, at first, the data structure on a track in the digital signal recording and reproducing device is defined in reference to the value of APT. That is, the track subsequent to ITI area is divided into several areas as shown in FIG. 37 in response to the value of APT, and the data structures such as the positions on these tracks, SYNC block configuration, and ECC configuration for use in protecting data against error are uniformly defined. In addition, each of the areas has an application ID for use in deciding the data structure of each of the areas.

Application ID of an area (n): To decide a data structure in an area (n)

The application ID on the tape has a step-wise structure as shown in FIG. 38. That is, an area on the track is defined by APT acting as the original application ID, and each of the areas has some definitions of AP1 to APn. The number of areas is defined by APT. Although two layers are illustrated in FIG. 38, if required, one additional layer can be added below it. As described above, values of APT, APT1 to APTn are specified, the constitution of practical signal processing of the digital signal recording and reproducing device and application of this device are defined.

APM of the application ID within MIC has only one layer and its value which is the same as that of APT is written by the digital signal recording and reproducing device.

A cassette, mechanism, servo-system, ITI area generating and sensing circuit and the like in the commercial digital VTR can be utilized by this application ID system to make a group of quite different products such as a data streamer or a multi-track digital audio tape recorder. Even if one area is defined, its content can be defined further by the application ID in that area, so that quite a wide range of products can be realized in providing a video data under a value of a certain application ID, a video audio data or a computer data under another value of application ID.

A practical example of the case in which the value of the application ID is specified will be described. At first, a state with APT=000 is illustrated in FIG. 39A. At this time, area 1, area 2 and area 3 are defined on the track. Then, their positions on the track, SYNC block configuration, ECC configuration for protecting the data against error, gaps for assuring each of the areas or the over write margin for assuring superposed caption are decided. Further, in each of the areas is present the application ID for deciding the data structure of each of the areas. Their definitions are as follows:

AP1: To decide the data structure of the area 1

AP2: To decide the data structure of the area 2

AP3: To decide the data structure of the area 3

A state in which the application ID in each of the areas has a value of 000 is defined as follows.

AP1=000: To employ data structure of audio, AAUX of a video compression recording system commercial digital VTR AP2=000: To employ data structure of video, VAUX of a video compression recording system commercial digital VTR AP3=000: To employ data structure of ID, a sub-code of a video compression recording system commercial digital VTR That is, in the case that the video compression recording system commercial digital VTR is realized, there become APT, AP1, AP2, AP3=000, respectively. At this time, APM is also set to 000.

3. Data recording and reproducing in a vertical blanking period

Then, a data recording and blanking in a vertical blanking period which is the subject matter of the present invention will be described in detail.

[1] Kind of data in vertical blanking period

FIG. 40 is a view for analyzing an output of tuner for a present television signal. From the tuner are outputted audio pilot signals for use in discriminating composite video signals, audio signals, stereo signals and bilingual broadcasting and the like.

In these signals, the composite video signals are comprised of video data, two-dimensional/one-dimensional converting data (H.SYNC, H.BLK, V.SYNC, V.BLK) and system data. As system data, there are closed caption (hereinafter abbreviated as "CC"), EDS, WSS, VBID and the like.

The important data in these data are system data for the composite video signals. In these system data are included not only information (video associated information) about the video, but also information about audio (audio associated information), wherein their contents should be recorded together with video and audio. In the analog VTR, 1 field becomes 1 track and the vertical blanking period is recorded and reproduced as it is.

However, in the digital VTR, the two-dimensional/one-dimensional conversion data having the system data therein are already removed, so that the system data can not be reserved as they are. An operation in which the inputted data is recorded as it is and the inputted signal is outputted as it is is called as "a transparent recording". In the digital VTR, this transparent recording can not be carried out unless a certain supplemental recording means is employed.

In FIG. 41 is shown a major system data. In general, a frequency which can be recorded and reproduced in an analog VTR is 1 MHz or less.

Accordingly, CC, EDS, VBID and WSS in FIG. 41 can be recorded and reproduced and other signals than these show blurred wave forms. In view of this meaning, the analog VTR cannot perform any transparent recording. Although the character multiplex broadcasting or TELETEXT cannot be recorded and reproduced, they are not originally applied as signals under an assumption of recording or reproducing operation, their objects consist in an operation that a decoder interprets them to display the character data on a television screen and transmits a character broadcasting program (a stock price and the like) which is quite different from the video of the composite video signal (however, a caption broadcasting is partially performed).

Further, inter-station control signals or work signals are used for performing adjustment between the stations, and they are applied in special application signals, so that they should not be enabled to be recorded by the analog VTR. In addition, since the macro-vision signals are used for guarding against a copying operation, they may not be recorded.

The present inventors filed the corresponding inventions (Jap.Pat.Appln.Nos.Hei 5-277633 and 5-339481) in which macro-vision signals, inter-station control signals and work signals are processed by using a LINE pack in order to assure a transparent characteristic in respect to the system data in the digital VTR. To the contrary, the present invention provides means for assuring a transparent characteristic in respect to system data having a frequency of 1 MHz or less such as CC, EDS, WBID, WSS and the like in the aforesaid system data which can be stored by the analog VTR.

It is of course possible that CC, EDS, VBID, WSS and the like are recorded by using the LINE pack previously filed in the patent application. However, their storing area is VAUX optional area shown in FIG. 23. The optional area is literally option, so that it may be applicable that there are certain sets not corresponding to the data.

In turn, in the case that it is assumed that there is provided a manner of use in which an analog VTR and a digital VTR are mixedly connected to each other, a transparent characteristic is lost unless CC, EDS, VBID, WSS and the like which can be kept at least by the analog VTR are reserved without fail.

Since the copy guarding signal such as SCMS is also included in these signals, even if this signal is stored in the optional area by using the LINE pack, the set not to be corresponded cannot restore it. That is, there is a possibility that a copy-free state may occur.

Accordingly, it is necessary that these system data are stored in the main area of VAUX so as to cause all the digital VTRs to correspond to them. The present invention realizes this feature.

Referring now to FIG. 42, main areas of VAUX, AAUX will be supplementary described. As described above, within the main area of VAUX is stored the pack data with the pack header being 60h to 65h. In addition, within the main area of AAUX is stored a pack data with the pack header being 50h to 55h.

Each of the packs having the pack headers of 60h, 61h, 50h and 51h is called as SOURCE pack and SOURCE CONTROL pack, respectively, and each of them is a pack having some data requisite and necessary for restoring video data or audio data and some data about laws of a copy guard and the like. Accordingly, referring to these 4 packs only, it becomes possible to reproduce a video signal and an audio signal.

In turn, each of the packs having pack headers of 62h, 63h, 64h; and 52h, 53h, 54h is called as REC DATE pack, REC TIME pack, BINARY GROUPE pack, respectively, and they may be eliminated data such as recording year, month and day, recording time and the like. For example, in the case of recording with VTR having no clock therein, the recording year, month, day or recording time are not apparent, NO INFO pack (FFh) is recorded.

In the preferred embodiment, the aforesaid CC,EDS, VBID, WSS and the like are transparent recorded by using CC pack having the pack headers of 65h and 55h, and transparent pack having the pack headers of 56h and 66h.

[2] Recording with CC pack

Figure 43:
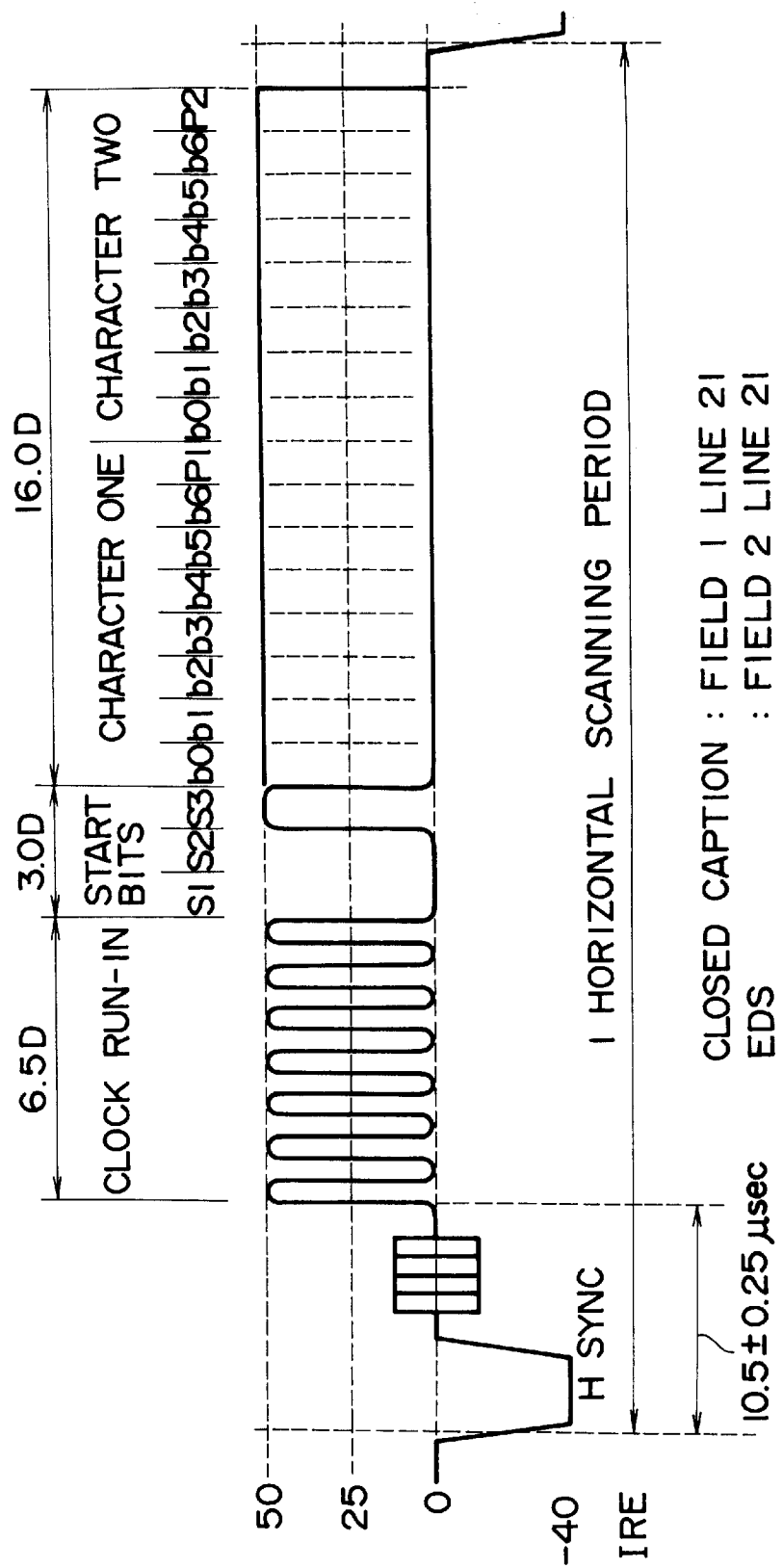
FIG. 43 is a view for indicating a CC signal.

At first, VAUX CC pack is stored as it is in such a manner that a data part of 16 bits except a clock-run-in (6.5 cycle) and a start bit (2 cycle "L" and 1 cycle "H") subsequent to the clock-run-in of CC signal shown in FIG. 43 is stored under a format shown at B in FIG. 20.

CC signals are inserted into a first field and a second field of a video signal. Provided that it is sometimes found that EDS data is inserted into the second field. That is, one VAUX CC pack can store original data of CC signal and EDS data.

CC signal is already legalized in U.S. as means for assisting physical-handicapped persons and it is a legal-must provision that all television sets with 14" or more sold in U.S have this decoder installed therein.

Accordingly, it is necessary that CC signal is stored in the main area of VAUX and all digital VTRs accommodate for it. As the pack header of VAUX CC pack, 65h is given as described above. The storing location is as shown in FIG. 23. The signal itself is not present in other countries than U.S, so that NO INFO pack (FFh) is stored at this signal location.

Since this pack header 65h means the line 21 in the first field and the second field, a line ID required in the LINE pack is not needed in the pack. During a reproducing operation, the data in this pack is inserted into the line 21 of the video signal so as to recover the original CC signal. With such an operation as above, the television set having the reproduced video signal inputted therein can decode this signal by the internal decoder and provide a caption service and the like.

Figure 44:
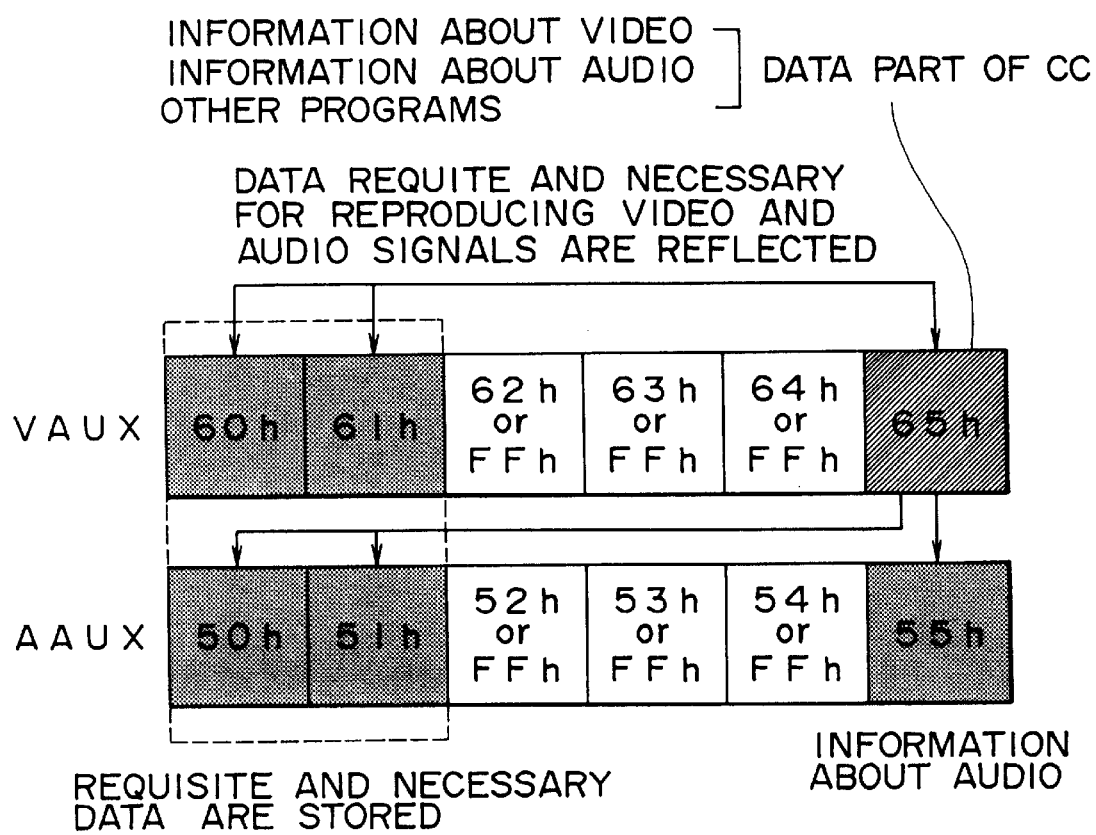
FIG. 44 is a view for illustrating a CC pack.

Referring now to FIG. 44, a writing rule of the CC pack will be described. In the following description, the CC signal shall contain EDS data unless otherwise specified.

CC signal contains data requisite and necessary for reproducing video signal and audio signal and other data not requisite and necessary for them. VAUX CC pack store them as they are. Then, in the case of recording former data, it is reflected against the pack having the pack headers of 60h, 61h, 50h, 51h, i.e. SOURCE pack of VAUX and AUX, and SOURCE CONTROL pack. In addition, AAUX CC pack stores signals of CC signal in which information about audio is decoded.

In order to record the signal in the CC pack, at first, it is discriminated whether or not this CC signal is present in the video signal. This operation detects the line 21 and checks whether or not there is a clock-run-in having a period of 32 fH after passing 10.5 μsec or more from a descending of its horizontal synchronous signal. If there is the clock-run-in, the CC signal is present. Then, data of 16 bits is extracted. The circuit constructed for the above-described operation is stored in the tuner corresponding to the CC signal.

This data is composed of 2 sets of ASCII codes of 7 bits (b0 to 66 of Character One and Character Two) and its MSB is a parity (P1, P2). In the case of decoding the CC signal, this parity is checked and in the case that this is recorded by the VTR of the preferred embodiment, no special operation is performed and this is stored as 2-byte data as shown at B in FIG. 20 as it is, because of the fact that an actual decoding is carried out by a television set.

In this paragraph, a case in which the tape recorded in U.S is brought into Japan and reproduced there will be studied. VTR exported to Japan has no accommodation of CC signal. However, as shown in FIG. 41, the CC signal has information about an aspect ratio. With such an arrangement as above, a wide-type television set sold in U.S. performs an automatic changing-over of the aspect ratio.

In turn, a wide-type television set of Japan performs an automatic changing-over of aspect ratio through VBID, so that information about the aspect ratio is essential. To the contrary, if this information is stored only in the CC pack, a VTR exported to Japan cannot understand it, so that an automatic changing-over of aspect ratio cannot be carried out.

Thus, in the VTR of the preferred embodiment, when data is stored in VAUX CC pack as shown in FIG. 44, it is a duty that data requisite and necessary for reproducing video signal and audio signal are extracted and reflected against the pack having the pack headers of 60h, 61h, 50h and 51h.

In this way, for example, since the aspect ratio reflects against the pack having a pack header of 61h without fail, even if the VTR cannot understand VAUX CC pack, it can restore VBID data from information of the aspect ratio stored in the pack having the pack header of 61h. Accordingly, the wide-type television of Japan can change over automatically the aspect ratio in reference to this VBID.

With such an arrangement as above, it is possible to prevent video or audio signals from being accidentally prohibited to be reproduced or unnatural audio signal from being reproduced.

In this case, VAUX CC pack will be summarized, wherein the CC signal contains data requisite and necessary for reproducing the video signals and the audio signals as well as other data not requisite and necessary, although VAUX CC pack stores them as they are.

In the case that the former is recorded, it is reflected against the pack having the pack header of 60h, 61h, 50h, 51h without fail. During the reproducing operation, the set capable of decoding this VAUX CC pack can utilize all data within the set.

Although the VAUX CC pack can not be decoded, the set which can be acknowledged as VAUX CC pack can be restored to the 21st line of the video signal. In addition, the set which cannot acknowledge the decoding of VAUX CC pack is ignored and the vertical blanking information required by the set may be restored from the pack data having the pack header of 60h, 61h, 50h and 51h. With such an arrangement as above, it becomes possible to get a compatibility in all types of VTR sets.

Then, information about the audio signal inserted into the vertical blanking period will be described. As shown in FIG. 41, information about the audio signal should be stored in the audio area as AAUX data. Then, in the preferred embodiment, AAUX CC pack is defined and information about the audio signal within the vertical blanking period is stored. As the pack header, 55h is given as already described.

The configuration of the pack is set as illustrated in FIG. 19A, wherein its storing locations are set as shown in FIG. 21. Information requisite and necessary for reproducing the audio signal and information not requisite and necessary for reproducing the audio signal are stored in this AAUX CC pack. However, as described above, information requisite and necessary for reproducing the audio signal is reflected against 50h, 51h.

The set which can understand this AAUX CC pack during the reproducing operation can utilize all information about audio signal. Then, the set which cannot understand it does not show any problem if it understands the packs having the pack headers of 50h, 51h.

Since information about the audio signal is stored in the VAUX CC pack as it is, it has a surplus characteristic and it is preferable that information about the audio signal is reproduced from the audio area in view of the signal processing. In addition, as a result that only the video area is after-recorded, even if information about audio signal stored in VAUX CC pack is lost, information about audio signal is left in AAUX CC pack, so that it is possible to reproduce audio signal.

Figure 45:
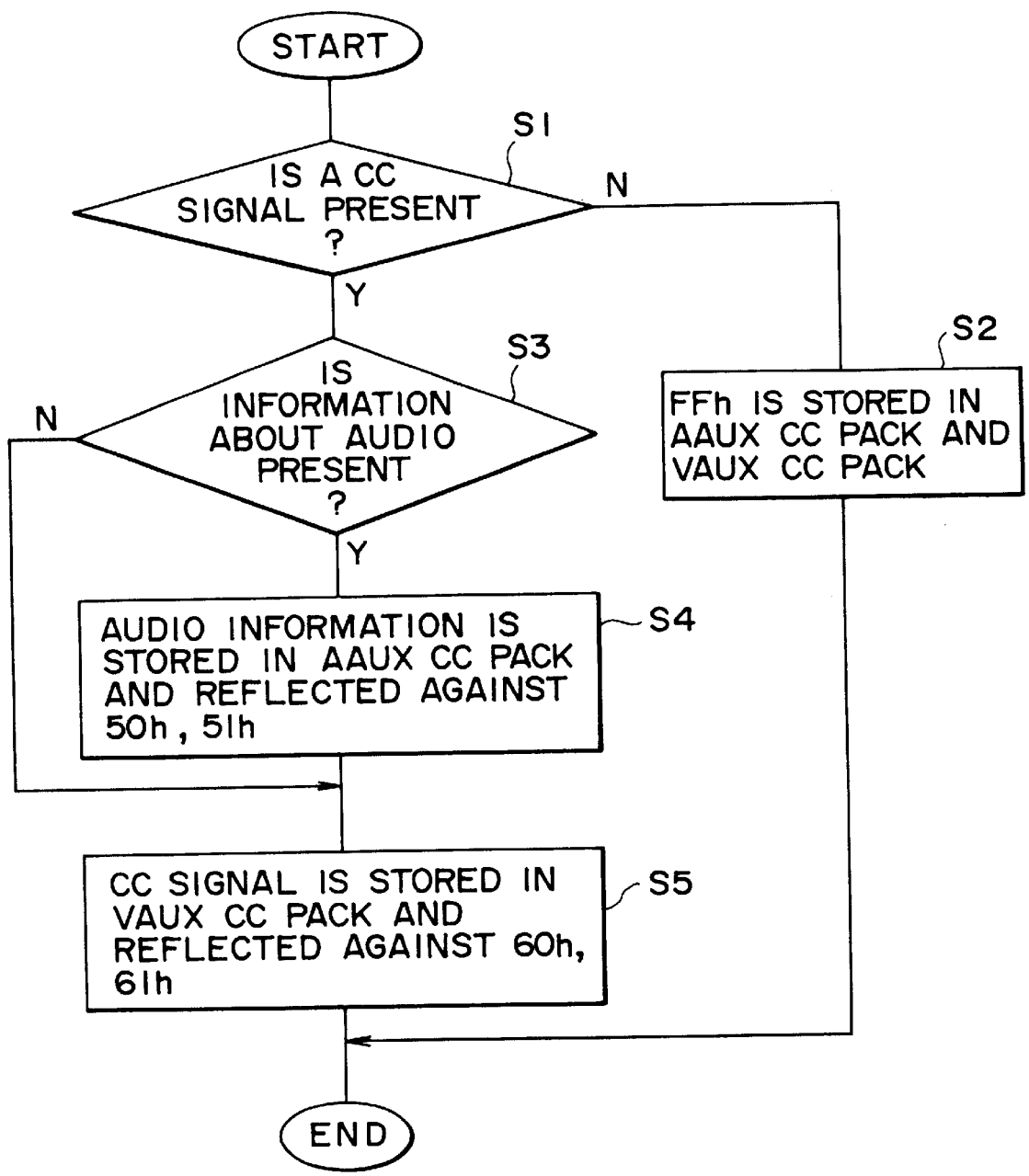
FIG. 45 is a flow chart of an operation in which a CC signal is recorded in a CC pack.
Figure 46:
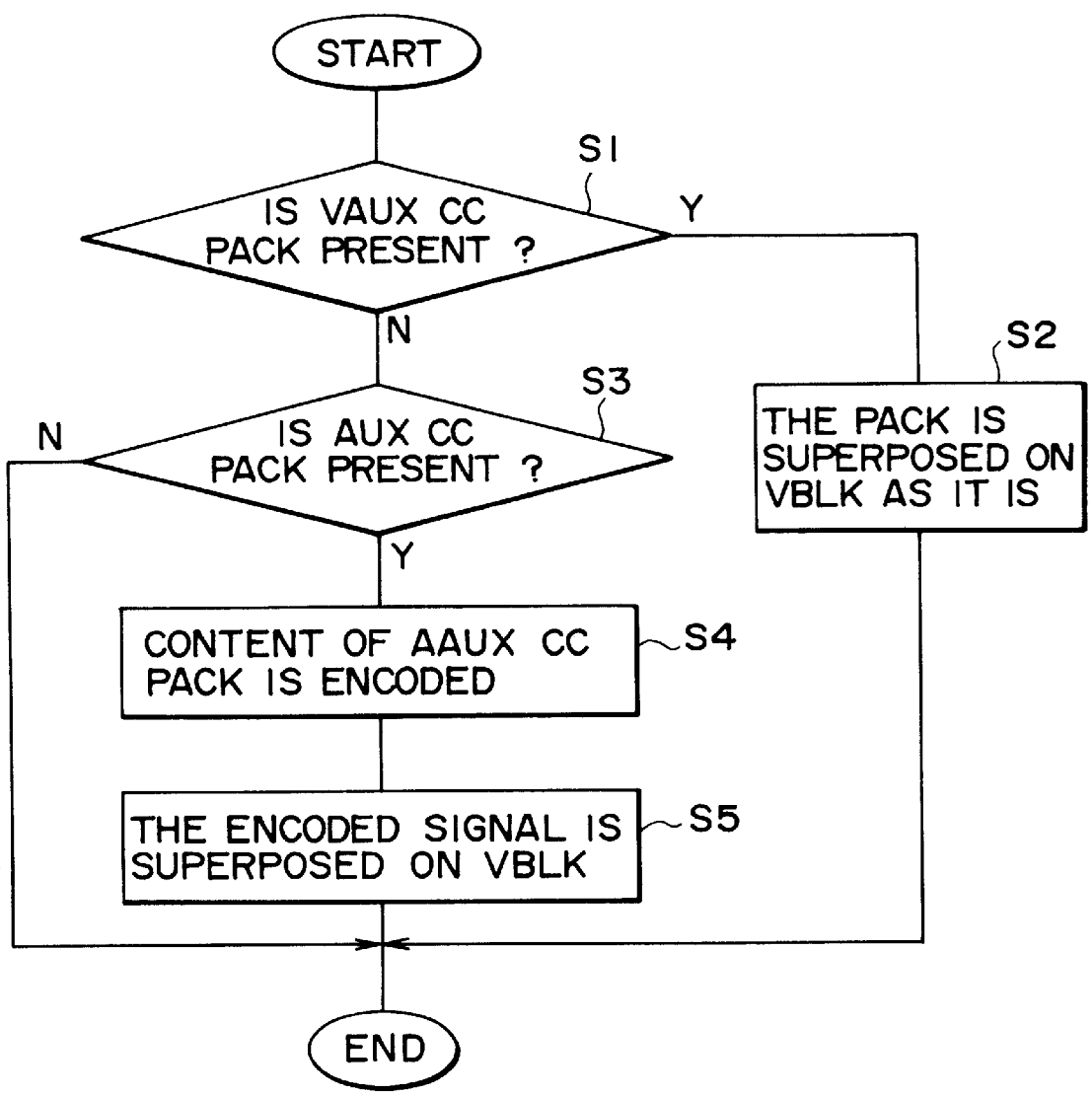
FIG. 46 is a flow chart of a reproducing operation in which a CC signal is recorded in a CC pack.

One example of operation in the case that a recording and a reproducing are performed in VAUX CC pack and AAUX CC pack is illustrated in FIGS. 45 and 46. At first, during the recording operation, a presence or a non-presence of the CC signal is discriminated (S1). As described above, this detects the line 21 of the video signal and after elapsing of 10.5 μsec. or more from the descending of the horizontal synchronous signal, it is checked if there is a clock-run-in of 32 fH period. If there is the clock-run-in of 32 fH period, the CC signal is present.

If the CC signal is not present, FFh is stored in AAUX CC pack and AAUX CC pack so as to get NO INFO pack. In turn, if there is a CC signal, it is judged if information about audio signal is present in it (S3).

If information about audio signal is present, it is stored in AAUX CC pack, and is reflected against AAUX SOURCE pack and AAUX SOURCE CONTROL pack (S4). In addition, the CC signal itself is stored in VAUX C pack and is reflected against VAUX SOURCE pack and VAUX SOURCE CONTROL pack (S5).

In turn, if information about audio signal is not present, the CC signal is stored in VAUX CC pack, and is reflected against VAUX SOURCE pack and VAUX SOURCE CONTROL pack (S5).

Then, during the reproducing operation, a presence or a non-presence of VAUX CC pack is judged (S1). If it is present, its content is superposed on the line 21 of the video signal as it is (S2). In turn, if VAUX CC pack is not present, it is judged if AAUX CC pack is present or not. If AAUX CC pack is present, its content is encoded to the CC signal (S4) and superposed on the line 21 of the video signal (S5). If AAUX CC pack is not present, the processing is finished.

Although not shown in the reproducing circuit of FIGS. 33 to 36, the pack data decomposing and analyzing part in the mode processing micro-computer 42 adds the clock-run-in and the like to the data part of the CC signal read out of the VAUX CC pack and superposes it to the line 21 of the reproducing video signal. In addition, when VAUX CC pack is not present, but AAUX CC pack is present, the CC signal is encoded in response to its content and superposed to the line 21 of the video signal.

In this paragraph, a case in which information about audio signal in the EDS data of the CC signal is recorded and reproduced will be described more practically.

As already described in reference to the AAUX CC pack at (1) in FIG. 19, the EDS data has information about language and kind of a major audio and a second audio as information about the audio signal.

In the preferred embodiment, this information is decoded and recorded under a format indicated at A in FIG. 19. At this time, this information is reflected against AUDIO MODE of AAUX SOURCE pack. In FIG. 47 is illustrated one example of a cooperative relation between the stored pack in AAUX CC pack and AUDIO MODE of AAUX SOURCE pack.

This results in that a transparent characteristic about the CC signal and EDS data in FIG. 41 can be assured.

[3] Recording with a transparent pack

Then, means for counter measuring against VBID, WSS and the vertical blanking data which may appear as a new data will be described.

In the present invention, in order to store these data as they are, a VAUX transparent pack is defined. The pack header is 66h. In addition, in order to store information about audio signal, a AAUX transparent pack is defined. The pack header is 56h (the transparent pack is called as "TR pack" hereinafter).

In FIG. 1 is indicated an assembly of these TR packs. The recording position is the same as that of the CC pack. Rules in respect to 60h, 61h, 50h and 51h are also the same as those of the CC pack.

In FIG. 2 is shown an arrangement in which a compatibility between the sets is set in view of TR pack corresponding VTR and TR pack non-corresponding VTR. In this way, even in the case of TR pack non-corresponding VTR, the CC pack is most preferentially accommodated in a region defined by a law such as U.S.

In FIG. 3 is indicated VAUX TR pack. In this way, various signals are discriminated in reference to data type 4 bits.

In this case, a character X denotes a signal name which may probably appear in the future. This is an example in which the contents of the first field and the second field are different from each other. The data part is prepared for a maximum 28-bit area. This is because the clock of 1 MHz or less as shown in FIG. 41 has such the number of bits as above. Then, the bits near the horizontal synchronous signal are applied as LSB and the data are filled in sequence.

FIG. 4 shows an example in which 20 bits of VBID are filled and another example in which 14 bits of WSS are filled.

Then, in FIG. 5 is indicated AAUX TR pack. Its configuration is the same as that of VAUX TR pack shown in FIG. 3.

In this case, a point to be noted consists in the fact that 0000 to 0010 of the data type are missing numbers. It is announced that VBID, WSS, EDTV2 do not contain information about audio signal. Accordingly, this pack is not required, so that data is stored in VAUX TR pack, although AAUX becomes NO INFO pack. At this time, if the data type in VAUX TR pack and the data type in AAUX TR pack are differently assigned from each other, their accommodation is inconvenient, so that the data not required have missing numbers.

Then, a method for arranging the TR pack and the CC pack on the track will be described. In FIGS. 21 and 23, 1 frame 10 tracks are applied as pairs of 2 tracks. Then, the main areas of two locations in this track pair have the same content without fail. In this way, since five kinds of TR packs or CC packs per one frame can be recorded, it is possible to increase more the number of packs to be recorded than the case in which the same pack is recorded in 10 tracks.

Any kind of data can be written in this pack in any type of manner, although the CC pack is written in the final track pair without fail. In this way, the TR pack can be eliminated and even if the tape having the TR pack and the CC pack merged to each other comes to the set for writing only the CC pack on 10 tracks, only the CC pack can be picked up without fail.

That is, in the set in which only the CC pack is written with 10 tracks, if the reproduced CC pack data has no error, it is written into the memory 165 for the main area in FIG. 35, and if it has an error, a processing of no writing data is carried out in a unit of 1 frame (10 tracks).

At this time, in the case that the CC pack data reproduced from a previous track in 1 frame unit in the memory 165, the data is superposed on it. Accordingly, if the CC pack data reproduced from the tenth track, this is employed as the CC pack data of that frame. As the tape having the TR pack and the CC pack mergedly recorded from each other as shown in FIG. 6 comes into the device, it is employed as the pack data of that frame if the CC pack reproduced from the tenth track has no error.

As described above, it is possible to keep a compatibility with the set corresponding only to the CC pack by fixing the position where the CC pack is written. In addition, a degree of preference of the CC pack can be increased by fixing the writing position of the CC pack to the final track pair. In this case, the arrangement of track pair is used for countermeasuring against the clogging of one channel.

Figure 6:
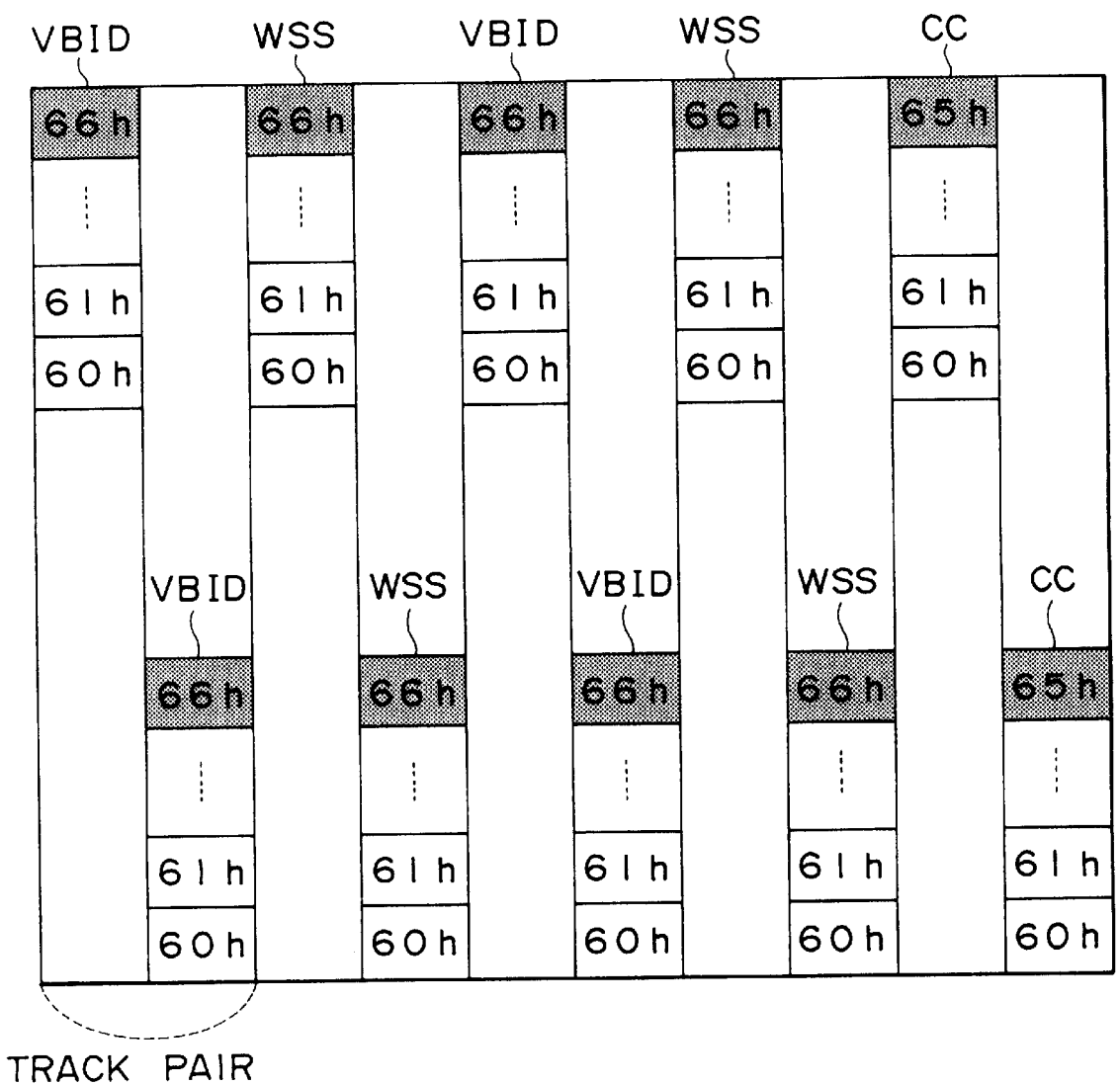
FIG. 6 is a view for illustrating one example of track formats recorded by CC, VBID and WSS corresponding VTRs.

FIG. 6 is a format of a tape in which a recording is performed by the corresponding VTR at CC, VBID and WSS, respectively. At this time, the data such as aspect ratio requisite and necessary for reproducing a video signal are reflected against the pack of the pack headers of 60h, 61h.

In the case that the tape recorded in this way is reproduced by the CC, VBID corresponding VTRs, only the CC data and the VBID data can be read out and superposed on a predetermined position during a vertical blanking period of the video signal. The WSS data can be restored from the pack data of 60h, 61h if required and superposed on the predetermined position of the vertical blanking period of the video signal. AAUX TR pack is similar to that described above, seperate discussion thereof is omitted.

What is claimed is:

1. A video signal recording apparatus for digitally recording on a storage medium a video signal comprising an image signal, an audio signal, at least one video-associated information signal, and at least one audio-associated information signal, wherein said video-associated information signals and said audio-associated information signals are included in a vertical blanking period of said video signal and wherein said storage medium includes a first recording area, a second recording area, and a third recording area, said apparatus comprising:

image encoding means for encoding said image signal to produce a coded image signal;

audio encoding means for encoding said audio signal to produce a coded audio signal;

collection means for collecting said video-associated information and said audio-associated information, for formatting said video-associated information to produce a multiple of video-associated information packs and for formatting said audio-associated information to produce a multiple of audio-associated information packs, said video-associated information packs being formatted so as to include all of said video-associated information signals that are below a predetermined frequency; and recording means for digitally recording said coded image signal in said first recording area, for digitally recording said coded audio signal in said second recording area, and for digitally recording said video-associated information packs and said audio-associated information packs in said third recording area, said recording being performed such that said video-associated information signals that are below said predetermined frequency and included in said video-associated information packs are recorded transparently;

wherein said third recording area is comprised of a video-associated information main area for storing video-associated information which is discernable by all systems capable of receiving said video signal, and a video-associated information optional area for storing video-associated information which is discernable only by selected systems capable of receiving said video signal;

wherein the video-associated information stored in said video-associated information main area includes a plurality of different types of vertical blanking interval information and an indication of an aspect ratio of said image signal is included in each type of vertical blanking interval information; and wherein said packs containing said video-associated information signals that are below said predetermined frequency are recorded in said video-associated information main area.

2. The apparatus according to claim 1, further comprising:

reproducing means for reproducing said coded image signal from said first recording area, for reproducing said coded audio signal from said second recording area, and for reproducing said audio-associated information pack from said third recording area;

image decoding means for decoding said coded image signal to produce a decoded image signal;

audio decoding means for decoding said coded audio signal to produce a decoded audio signal; and unpacking means for unpacking said audio-associated information pack to produce an unpacked audio-associated information.

3. The apparatus according to claim 2, further comprising means for detecting said remainder information in said unpacked audio-associated information and for superimposing said remainder information in said generated vertical blanking period.

4. The apparatus according to claim 1, wherein said main zone is positioned within said third recording area such that reproducing apparatus which is not operable to detect said remainder information may detect said necessary information.

5. The apparatus according to claim 1, wherein a frame is recorded on a plurality of track pairs and wherein said recording means records said sub-zone on a final track pair of said frame.

6. A video signal recording apparatus for digitally recording on a storage medium a video signal comprising an image signal, an audio signal, at least one audio-associated information signal and at least one video-associated information signal, wherein said audio-associated information signals and said video-associated information signals are included in a vertical blanking period of said video signal and wherein said storage medium includes a first recording area, a second recording area, and a third recording area, said apparatus comprising:

image encoding means for encoding said image signal to produce a coded image signal;

audio encoding means for encoding said audio signal to produce a coded audio signal;

collection means for collecting said audio-associated information and said video-associated information, for formatting said audio-associated information to produce a multiple of audio-associated information packs and for formatting said video-associated information to produce a multiple of video-associated information packs, said video-associated information packs being formatted so as to include all of said video-associated information signals that are below a predetermined frequency; and recording means for digitally recording said coded image signal in said first recording area, for digitally recording said coded audio signal in said second recording area, and for digitally recording said audio-associated information packs and said video-associated information packs in said third recording area, said recording being performed such that said video-associated information signals that are below said predetermined frequency and included in said video-associated information packs are recorded transparently;

wherein said third recording area is comprised of a video-associated information main area for storing video-associated information which is discernable by all systems capable of receiving said video signal, and a video-associated information optional area for storing video-associated information which is discernable only by selected systems capable of receiving said video signal;

wherein the video-associated information stored in said video-associated information main area includes a plurality of different types of vertical blanking interval information and an indication of an aspect ratio of said image signal is included in each type of vertical blanking interval information; and wherein said packs containing said video-associated information signals that are below said predetermined frequency are recorded in said video-associated information main area.

7. The apparatus according to claim 6, further comprising:

reproducing means for reproducing said coded image signal from said first recording area, for reproducing said coded audio signal from said second recording area, and for reproducing said audio-associated information pack and said video-associated information pack from said third recording area;

image decoding means for decoding said coded image signal to produce a decoded image signal;

audio decoding means for decoding said coded audio signal to produce a decoded audio signal; and unpacking means for unpacking said audio-associated information pack to produce an unpacked audio-associated information and for unpacking said video-associated information pack to produce an unpacked video-associated information.

8. The apparatus according to claim 7, wherein a reproduced video signal comprises said decoded image signal, said decoded audio signal, and a generated vertical blanking period; and said apparatus further comprises means for superimposing said unpacked audio-associated information and said unpacked video-associated information in said generated vertical blanking period.

9. The apparatus according to claim 6, wherein said
collection means formats said audio-associated information without inserting a corresponding line number into said audio-associated information pack.

10. The apparatus according to claim 6, wherein said collection means formats said video-associated information without inserting a corresponding line number into said video-associated information pack.

11. A video signal recording apparatus for digitally recording on a storage medium a video signal comprising an image signal, an audio signal, at least one audio-associated information signal and at least one video-associated information signal, wherein said audio-associated information signals and said video-associated information signals are included in a vertical blanking period of said video signal and wherein said storage medium includes a first recording area, a second recording area, a third recording area and a fourth recording area, said apparatus comprising:

image encoding means for encoding said image signal to produce a coded image signal;

audio encoding means for encoding said audio signal to produce a coded audio signal;

collection means for collecting said audio-associated information and said video-associated information, for formatting said audio-associated information to produce a multiple of audio-associated information packs and for formatting said video-associated information to produce a multiple of video-associated information packs, said video-associated information packs being formatted so as to include all of said video-associated information signals that are below a predetermined frequency; and recording means for digitally recording said coded image signal in said first recording area, for digitally recording said coded audio signal in said second recording area, for digitally recording said video-associated information packs in said third recording area, and for digitally recording said audio-associated information packs in said fourth recording area, said recording being performed such that said video-associated information signals that are below said predetermined frequency and included in said video-associated information packs are recorded transparently;

wherein said third recording area is comprised of a video-associated information main area for storing video-associated information which is discernable by all systems capable of receiving said video signal, and a video-associated information optional area for storing video-associated information which is discernable only by selected systems capable of receiving said video signal;

wherein the video-associated information stored in said video-associated information main area includes a plurality of different types of vertical blanking interval information and an indication of an aspect ratio of said image signal is included in each type of vertical blanking interval information; and wherein said packs containing said video-associated information signals that are below said predetermined frequency are recorded in said video-associated information main area.

12. The apparatus according to claim 11,
wherein said third recording area is comprised of a main video zone and a video sub-zone;
wherein said video-associated information includes a necessary video information and a remainder video information;
wherein said video-associated information pack includes a necessary video portion corresponding to said necessary video information and a remainder video portion corresponding to said remainder video information;
wherein said recording means records said necessary video portion in said main video zone; and
wherein said recording means records said remainder video portion in said video sub-zone.

13. The apparatus according to claim 12,
wherein said fourth recording area is comprised of a main audio zone and an audio sub-zone;
wherein said audio-associated information includes a necessary audio information and a remainder audio information;
wherein said audio-associated information pack includes a necessary audio portion corresponding to said necessary audio information and a remainder audio portion corresponding to said remainder audio information;
wherein said recording means records said necessary audio portion in said main audio zone; and
wherein said recording means records said remainder audio portion in said audio sub-zone.

14. The apparatus according to claim 13,
wherein said main video zone is positioned within said third recording area such that another reproducing apparatus which is not operable to detect said remainder video information may detect said necessary video information; and
wherein said main audio zone is positioned within said fourth recording area such that said another reproducing apparatus which also is not operable to detect said remainder audio information may detect said necessary audio information.

15. The apparatus according to claim 14, wherein a frame is recorded on a plurality of track pairs and wherein said recording means records said audio sub-zone on a final track pair of said frame.

16. The apparatus according to claim 14, wherein a frame is recorded on a plurality of track pairs and wherein said recording means records said video sub-zone on a final track pair of said frame.

* * * * *